(12) United States Patent
Fosgard

(10) Patent No.: US 12,654,963 B2
(45) Date of Patent: Jun. 16, 2026

(54) SYSTEM AND METHOD FOR INTERMODAL MATERIALS DELIVERY

(71) Applicant: TULIPS CORPORATION, Milwaukie, OR (US)

(72) Inventor: Eric Fosgard, Milwaukie, OR (US)

(73) Assignee: TULIPS CORPORATION, Milwaukie, OR (US)

( * ) Notice: Subject to any disclaimer, the term of this patent is extended or adjusted under 35 U.S.C. 154(b) by 0 days.

(21) Appl. No.: 18/574,721

(22) PCT Filed: Jun. 29, 2021

(86) PCT No.: PCT/US2021/039641
§ 371 (c)(1),
(2) Date: Dec. 27, 2023

(87) PCT Pub. No.: WO2023/277884
PCT Pub. Date: Jan. 5, 2023

(65) Prior Publication Data
US 2024/0343508 A1 Oct. 17, 2024

(51) Int. Cl.
*B65G 67/24* (2006.01)
*G01C 21/34* (2006.01)
*G06Q 10/0833* (2023.01)
(52) U.S. Cl.
CPC ............. *B65G 67/24* (2013.01); *G01C 21/34* (2013.01); *G06Q 10/0833* (2013.01)
(58) Field of Classification Search
None
See application file for complete search history.

(56) References Cited

U.S. PATENT DOCUMENTS 10,192,189 B2 1/2019 Bhatt
10,657,486 B1 5/2020 Wolter et al.
(Continued)

FOREIGN PATENT DOCUMENTS

CN 108764800 B 11/2018
CN 211470673 U 9/2020
WO WO2017/045717 A1 3/2017

OTHER PUBLICATIONS

Yunzhu He and Zhongzhen Yang, Parcel Delivery by Collaborative Use of Truck Fleets and Bus-Transit Vehicles, Journal (Fall 2018), pp. 399-428, vol. 57, No. 4, Transportation Journal, https://doi.org/10.5325/transportationj.57.4.0399, China.
(Continued)

*Primary Examiner* — Lail A Kleinman
(74) *Attorney, Agent, or Firm* — Howard Russell

(57) ABSTRACT

Systems and methods for the intermodal delivery of materials comprising, specially-adapted transit stations (TULIPS stations) where already-going-there (AGT) transit and other vehicles may be automatically determined, positioned, unloaded and loaded via gantry crane with materials to be delivered that were temporarily-stored at at least one of the specially-adapted stations. Carriers may dock within a transit vehicle and may also be suitable for securably storing materials therein, such as where a plurality of carriers stop at a storage hub, such as a TULIPS station, located substantially near and/or along the delivery path. The station may include a charging station for the carriers, and serves as a portable warehouse for both materials and carriers. When adequately charged, carriers may deliver materials to their final destinations. Or, the materials may be transferred to a load transporter to facilitate first—and/or last-mile delivery.

12 Claims, 37 Drawing Sheets

(56) References Cited

U.S. PATENT DOCUMENTS

| | | | | |
|---|---|---|---|---|
| 10,726,723 | B1 * | 7/2020 | Madden | G08G 1/148 |
| 11,443,268 | B2 * | 9/2022 | Fosgard | G01S 13/02 |
| 2011/0017693 | A1 | 1/2011 | Thomas et al. | |
| 2018/0018605 | A1 * | 1/2018 | Light-Holets | G06Q 10/06 |
| 2021/0103880 | A1 * | 4/2021 | Wu | B66F 9/0755 |
| 2021/0276597 | A1 * | 9/2021 | Yu | B60W 60/00256 |
| 2022/0036310 | A1 | 2/2022 | Heinla | |

OTHER PUBLICATIONS

Geyao Cheng, Deke Guo, Jianmai Shi, and Yudong Qin, When Packages Ride a Bus: Towards Efficient City-Wide Package Distribution, Symposium, Dec. 11, 2018, p. 4, col. 1 3rd Full Paragraph, 2018 IEEE 24th International Conference on Parallel and Distributed Systems (ICPADS), China.

Anna Trentini and Nicolas Mahlene, Toward a Shared Urban Transport System Ensuring Passengers & Goods Cohabitation, Journal, Jul. 21, 2010, p. 4, vol. 3, No. 2, TeMA: Journal of Landuse, Mobility and Environment, Italy.

* cited by examiner

1470b

1470a

1470d

1470c

SYSTEM AND METHOD FOR INTERMODAL MATERIALS DELIVERY

TECHNICAL FIELD

This patent application generally relates to materials delivery, and more specifically to smart systems and methods for the intermodal delivery of materials via public mass transit and associated adapted station stops adapted for the same and using substantially autonomous carriers and transit vehicles.

BACKGROUND ART

For various reasons, it may be desirable to deliver materials across and between various locations. Conventional systems and methods for materials delivery have included the use of delivery trucks, cargo bikes, drones, and robotic cars. However, such systems and methods have not been designed to optimize the underutilized capacity of existing transit and parking infrastructures, to thereby make delivery more cost-effective, economical, and ecofriendly. For example, U.S. Pat. No. 7,991,505B2, to Lert, Jr. et al., for Materials-Handling System Using Autonomous Transfer and Transport Vehicles, issued Aug. 2, 2011, teaches "[m]ethods and apparatus for selecting and combining packages in an outbound container by employing autonomous transfer and transport vehicles which move on a network of roadways . . . " U.S. Patent Publication No. 2015/0006005A1, to Yu et al., for Autonomous Unmanned Road Vehicle for Making Deliveries, published Jan. 1, 2015, discloses "[a] n autonomous unmanned road vehicle and how it can be used to make deliveries." U.S. Patent Publication No. 2015/0227882A1, to Kushal Mukesh Bhatt, for Mobile Pickup Locations, published Aug. 13, 2015 teaches "[a] mobile pickup location . . . that may be associated with a vehicle such as a public bus." And, U.S. Pat. No. 9,256,852B1, to Jussi Myllymaki, for Autonomous Delivery Platform, issued Feb. 9, 2016, teaches "[a] n autonomous road vehicle is operative to receive destination information, and to drive to a destination based on the destination information."

However, the foregoing disclosures have presented systems and methods that have been expensive and complicated, have required significant intermediate user intervention, and have not sufficiently taken advantage of existing transit and parking infrastructures, as well as prepaid transit movement-especially during off-peak hours—to more efficiently and autonomously facilitate materials delivery to and between end users. Thus, it would be desirable to reduce operation and maintenance costs, as well as bypass construction costs, that have been associated with the at least partially autonomous delivery of materials, by optimizing the underutilized capacity of transit and parking infrastructures.

Of course, public mass transit stations where buses, trains, and the like are made available for boarding and un-boarding of passengers are well known in the art, and the use of human transit vehicles to deliver packages on the exterior of buses is also taught recently in the art. See US Patent Application Publication No. 2017/0011340 to Gabbai, for Public Transport Infrastructure Facilitated Drone Delivery. And while it is also not uncommon to store passengers' packages and luggage underneath a mass-transit type bus, or on a train, the integration of a more conventional materials delivery service with mass transit vehicles is less known, if known at all.

U.S. Pat. No. 9,004,840 to Kinugawa et al., for Article Transport Facility with Intermediate Transfer Device, describes an intermediate transfer device located upwardly of an article delivering and receiving portion and downwardly of a ceiling transport vehicle-essentially a gantry crane—and it further discloses a system for gripping and movement, both laterally, up and down, and rotational movement, of a package, together with locking mechanism to hold packages in place on what is referred to as a station.

U.S. Pat. No. 10,192,189, to Bhatt, for Mobile Pickup Locations, describes a locker system in a particular location, such as at a store or on a bus, with keycode capability which allows persons to employ a mobile application to access packages securely in the locker, for example while on the bus. Whereas this system therefore implicitly contemplates transport of packages on buses, there is no teaching in this patent about how to automate loading of such packages into the locker on the bus, but rather the container is presumably manually loaded, or in another embodiment an entire pre-loaded container, loaded with packages and providing the aforementioned locker access capability, is attachable to the bus, whether the interior of the bus or the exterior of the bus. But Bhatt provides no disclosure of automated loading or unloading of such containers or packages from the bus.

US Patent Application Publication 2020/0385207, to Godwin et al., for Package Receiving and Delivery System, teaches a system for parcel delivery using package Pickup and Receiving Stations (PRS), wherein parcels directed to a recipient within an area serviced by the PRS may be delivered in bulk to the PRS by a parcel carrier, that is for example with a gantry loaded into a loading bay as described in Paragraph [0036], whereupon the PRS may then attend to final delivery to each parcel's recipient, preferably using an automated ground vehicle.

Publication WO 2017/045717, to Liang, et al., for Method and Transport Control Node for Transportation of a Package, teaches the placement of a package on a bus for delivery to another bus stop that is conveniently close to the ultimate delivery location for the package.

U.S. Pat. No. 10,657,486, to Wolter, et al., for Container for Crowdsourced Delivery, teaches a locked smart container enabling crowd-sourced delivery of items, e.g., via Uber or a bus, using application data or other public transportation information.

While the aforementioned prior art references teach limited use of a public transport system, such as a transit bus or a train, to deliver materials, such as packages or containers, there is lacking in the prior art an automated station adapted for seamless transfer of materials between delivery vehicles and buses, or trains, i.e., for intermediate transport from materials delivery hubs through such mass transit stations (e.g., through specially-adapted bus stops or train stops) throughout a particular geographic location, such as a city, as state, or a country, to an ultimate transit station for interconnection with last mile delivery solutions as further described herein.

SUMMARY OF INVENTION

The present teachings disclose a smart delivery system that may include at least one substantially autonomous carrier configured to deliver at least one material along a delivery path, from at least a first location, such as an origin zone, to a second location, such as a destination zone. The delivery path may include a plurality of intermediate transfer locations, including a third location, a fourth location, and so on. The carrier may utilize a mode of transit, such as a commuter train, a cargo train, a commuter bus, or a semi-trailer mode of transit, to facilitate its movement during a transit leg of the delivery path. The carrier may also navigate safely along the delivery path based on environmental data obtained via a plurality of sensors. Additionally, the delivery system may include a computer server configured to communicate delivery data with a carrier transceiver, the delivery data including a parcel quantity, a means of parcel identification, and/or a parcel destination. The server may also be configured to communicate transit data with the carrier transceiver, the transit data including a transit vehicle location and/or a transit link location. The delivery system may further include a computing device with a memory and a processor configured to communicatively connect with the server, process the delivery data and transit data to compute the delivery path based on that data, and re-compute the delivery path in real time based on the environmental data.

In some embodiments, the delivery system may additionally include at least one transit link where the carrier, or carriers, may removably dock with a transit vehicle that is stopped at the transit link. Such a transit link may, for example, include stops, stations, and/or connections for light rail, bus, trolley, streetcar, paratransit, and ferry transit. In some embodiments, the delivery system may further include at least one load transporter suitable for receiving material from the carrier, or carriers, to thereby transport the material during a transporter leg of the delivery path. Some embodiments may include more than one transporter leg, such as where a load transporter facilitates delivery for both the first and last mile of delivery—or even an intermediate portion of the delivery path. Such a load transporter may, for example, include cargo bikes, cargo trikes, delivery trucks, and private vehicles. In some embodiments, the delivery system may include a storage hub located substantially near and/or along the delivery path and suitable for storing a plurality of carriers. In some embodiments, the storage hub may include a charging station suitable for charging the carriers. In some embodiments, the storage hub and/or the plurality of carriers (such as Autonomous Vehicles (AVs), Autonomous Ground Vehicles (AGVs), Zero Occupant Delivery Vehicles, etc.), may be controllable by a centralized server that is suitable for, and capable of, configuring and/or otherwise organizing the plurality of carriers to optimize space and/or maximize security.

The present teachings also disclose a delivery method, comprising the steps of selecting an at least substantially autonomous carrier, or carriers, suitable for delivering at least one material from an origin zone to a destination zone, determining a suitable delivery path for the carrier, or carriers, to deliver the at least one material from the origin zone to the destination zone, and selecting a transit vehicle suitable for facilitating movement of the at least one carrier along a transit leg of the delivery path. In some embodiments, the transit vehicle may be selected based on a plurality of vehicle values, including at least an economic value, an environmental value, and a public welfare value. In some embodiments, the delivery method may also include the step of providing delivery data to a server having a processor, the delivery data including a material size, a material weight, a pickup point, and/or a pickup time. In some embodiments, the delivery method may further comprise a step of providing transit data to the server, the transit data including a transit schedule, a transit vehicle location, a transit link location, a transit route, and/or a transit ridership level. In some embodiments, the delivery path may be determined based on at least one of the vehicle values, the delivery data, and/or the transit data. In some embodiments, the delivery method may include a step of dispatching the carrier during a time of day when the transit ridership level is low. In some embodiments, the delivery method may include a step of enabling the carrier to board the transit vehicle, either to deposit material, or alternatively for the duration of a transit leg of the delivery path. In some embodiments, the delivery method may include a step of transferring the at least one material from the carrier to a load transporter for a transporter leg of the delivery path.

The present teachings further disclose substantially autonomous parcel carrier, comprising a carrier body configured to contain a parcel to be delivered from an origin zone to a destination zone and along a substantially pre-determined delivery path, and to removably dock with a transit vehicle to thereby enable the carrier to travel along a transit line for a transit leg of the delivery path. Additionally, the carrier may comprise a carrier transceiver configured to communicatively connect with at least a server, receive delivery data from the server, including a parcel quantity and/or a means of parcel identification. The carrier transceiver is also configured to receive transit data from the server, including a transit vehicle location, a transit link location, and/or a transit schedule; and further configured to transmit carrier data to the server as the carrier travels along the delivery path, including, without limitation, at least a carrier location. The carrier may also include a navigation control operatively connected to the carrier transceiver, including a memory and a processor configured to receive environmental data via a plurality of sensors. The processor may also be configured to compute the delivery path based on the delivery data, the transit data, and/or the environmental data; and to re-compute the delivery path in real time based on the environmental data. The processor may further be configured to determine at least one safety parameter based on the environmental data, including, without limitation, at least a safe travel speed.

In some embodiments, the carrier body may include at least one compartment configured to enable removal of the parcel upon providing suitable parcel access data to the carrier. In some embodiments, the plurality of sensors may include a LIDAR sensor, a RADAR sensor, and/or a camera sensor suitable for detecting potential impacts, theft, and/or vandalism. In some embodiments, LIDAR, RADAR, camera, and/or other sensors may be used for detecting the presence of, or position of, vehicles, space on vehicles for materials, and materials to be unloaded and loaded, for allocating resources related to unloading and loading. In some embodiments, the carrier may include a plurality of lights configured to indicate a direction of travel, a change in the direction of travel, and/or a deceleration of the carrier. In some embodiments, at least one wheel of the carrier may be configured to removably engage with a railway, thereby enabling the carrier to travel along the railway during a transit leg of the delivery path. In some embodiments, the carrier body may have a width, a height, and a length suitable to clear an opening of the transit vehicle so that the carrier is securably positionable inside the transit vehicle.

Thus, the various aspects of the invention disclosed teach a novel approach to delivery designed to increase the efficiency of and reduce the costs associated with delivering and storing materials along a delivery path, using an at least substantially autonomous carrier. Further, as contemplated by an aspect of the invention disclosed herein, the delivery path may take an unexpected direction by merging with a transit line, such as a light rail line, for at least a portion of the delivery path. For example, a fleet of carriers may be dispatched along the delivery path during periods off-peak transit ridership, at later times in the evenings, and during weekends to optimize the underutilized space on a light rail transit vehicle. The same fleet of carriers may also alight from the transit vehicle at any transit link, recharge at any suitable parking facility located along or near the delivery path, and/or store materials at the parking facility—thereby creating a portable warehouse there. In conjunction with the carriers, other types of small load transporters, such as a cargo bike, may facilitate delivery of materials to their final destinations, by receiving the materials from the carriers and completing the first—and/or last-mile delivery. Such systems and methods may combine the benefits of transit (e.g., existing infrastructures and prepaid operation costs) with the benefits of ultra-small electric vehicles (e.g., low emissions and no driver costs) to achieve an efficient, economical, and ecofriendly solution to delivering materials.

In accordance with another aspect and embodiment of the disclosure, there is provided a materials storage, movement, and transfer station adapted for use at a transit stop for facilitating simultaneous movement and transfer of materi-als, such as containers, packages, containerized packages, hard goods, soft goods, products, whether packaged or not packaged, raw materials, processed materials, and the like, on any of a plurality of transit and materials delivery vehicles and between intermediate such stations and last mile delivery solutions for materials, while being adapted for avoiding interference with passenger traffic on transit vehicles.

Certain embodiments of such a station are referred to herein as a TULIPS station. TULIPS stands for seamless Transferring of people and materials/packages, Unloading, and Loading of materials, using the Interconnecting with materials carriers, AVs, transit vehicles, etc. via the Internet-of-Things communication to do so, in a station that deter-mines Positioning of vehicles and materials, and which Stores the materials/packages at pre-positioned locations at the station temporarily such that the accessing, unloading, loading, and storage of materials/packages is accomplished without interference of passenger movement or traffic of mass transit systems. Thus, in an embodiment, a TULIPS station in accordance with one or more aspects of the disclosure generally comprises a position system and an unloading and loading system.

In an embodiment, the station comprises a system for tracking, and communicating routing of materials traffic relative to the station and with established transit routing and schedule information, a structure for temporary storage of materials closely adjacent the transit stop without interfering with normal passenger movement, a system for determining positioning of vehicles relative to the station to facilitate movement of materials traffic between said structure and the commuter vehicles, and a system for unloading and loading of materials between the commuter vehicles and the struc-ture during regular transit stops of the commuter vehicles without interfering with normal passenger movement.

The station's system for determining positioning of vehicles in relation to the station further preferably com-prises a determining system to determine a type of vehicle approaching the station, whether the approaching vehicle is to be internally loaded, externally loaded, top loaded or side loaded, and whether it is non-autonomous (for example a human-operated crowdsourced vehicle wherein the driver is using an application for guidance to pick up and deliver materials, or an individual picking up materials such as a personal package), autonomous, or partially autonomous. As used here, partially autonomous may also mean condition-ally autonomous or highly autonomous, so that part of the determining system is to classify the vehicle in terms of its capabilities relating to such things as autosteering, autob-raking, collision avoidance, etc. The station's system further comprises a guidance system for guiding the vehicle to an available lane and location to accommodate unloading and loading mechanisms to safely and accurately access mate-rials. The guidance system comprises communicating a signal for the vehicle to come to a complete stop at a designated spot relative to the station while the determining system determines available space for materials to be loaded onto or within the vehicle. While such determining may entail logic to determine material size and corresponding availability of location space for materials on the transit materials delivery vehicle, at a minimum it entails determi-nation of space available, for example on the top of the vehicle, for a standard-sized container for carrying a plural-ity of materials. Positioning is thus preferably aided with data received from the vehicle to be positioned, but it may be further augmented with sensing capabilities of the station without departing from the system as claimed.

In accordance with an embodiment of this aspect of the disclosure, the station's system for unloading and loading materials further comprises a computer-controlled robotic materials unloading and loading system comprising: com-municating with the vehicle to open the vehicle for materials access (assuming a materials boarding hatch of some kind to allow access to within the vehicle, typically from above or a side of the vehicle, for the robotic system), deactivating materials locking mechanisms to allow unloading of the materials or container from the vehicle, robotic means to unload and load materials from and to the vehicle, activating locking mechanisms to secure loaded materials to the vehicle, communicating with the vehicle to close the vehicle for materials access, and signaling to the vehicle that it is free to leave the station.

Further, a system for robotic unloading and loading of materials in connection with an embodiment of the station of this aspect of the disclosure may preferably comprise a computer-controlled gantry crane unloading and loading system. Such a gantry crane unloading and loading system further comprises: deactivating materials locking mecha-nisms to allow unloading from the vehicle: gantry crane means to unload and load materials from the vehicle: activating locking mechanisms to secure loaded materials onto the vehicle; and signaling to the vehicle that it is free to leave the station. Unloading and loading is thus preferably aided with data received from the vehicle to be unloaded and loaded, but it may be further augmented with sensing capabilities of the station without departing from the system as claimed.

While the term "materials" as used herein may include hard goods, soft goods, products, whether packaged or unpackaged, raw materials, processed materials, and pref-erably materials in the form of containerized packages, it will be appreciated that automated locking and unlocking of the materials onto the top of, or within, a transit vehicle, such as a commuter bus, a long-haul bus, a van, a train, or other transit vehicle, may be accomplished in any of a number of ways known in the art. For example, it will be appreciated that electronically-controlled electromagnets with guides and indented seats, with or without mechanical clamps adapted for clamping on integral bars on a containerized package or other portion of the goods, may be implemented and automatically system-controlled by either the transit vehicle or by receiving a signal from the station In accordance with an aspect and embodiment of the disclosure, there are provided electromagnetic retaining areas for automatically releasably guiding transfer of materials (such as products, packages or containerized packages) into holding areas, or spaces, designated on a transit or other delivery vehicle for securely holding the materials on, or in, the vehicle. And in another embodiment there are provided individual bins atop, or otherwise at side locations, of transit vehicles, capable of being automatically opened (either by the station or the bus, and as further specified below) to receive materials, such as packages, and then closed again to retain the packages. The main criteria for such retention and release subsystems as part of the overall system is to securely hold the packages in relation to the transit vehicle as it travels at sometimes great speeds to its destination and while protecting the materials from adverse weather conditions such as rain or snow to which such may be subjected.

In accordance with another aspect of the disclosure, the transit stop further comprises at least one siding area adapted for unloading and loading of a materials delivery enabled mass transit vehicle, wherein the tracking and communicating routing step, the determining positioning step, the communicating to open step, the deactivating materials locking step, the robotic means to unload and load materials, the activating locking step, the communicating to close step, and the signaling free to leave step are adapted for facilitating movement and transfer of materials on the vehicle while also facilitating transport of passengers on the vehicle.

In accordance with another aspect and embodiment of the disclosure, the siding area is further adapted for picking up, dropping off, and parking of a platooned materials transport vehicle corresponding with a lead transit vehicle. With this aspect of the disclosure, the tracking and communicating routing step, the communicating to open step, the deactivating materials locking step, the robotic means, or alternatively the gantry crane means, to unload and load materials, the activating locking step, the communicating to close step, and the signaling free to leave step, are adapted for facilitating movement and transfer of materials onto or off of a platooned vehicle while also facilitating transport of passengers on a corresponding lead transit vehicle. Thus, there is provided space for both the platooned vehicle and the lead vehicle to stop within sufficiently close proximity to each other to allow for further continuation down the roadway together in platooned fashion using radio link or other communications means.

In accordance with another aspect of the disclosure, there is provided a materials storage, movement, and transfer station integrated into a transit stop having a plurality of lanes and at least one sidewalk, or other walkway, for passengers walking to, from, or by the transit station, for facilitating movement and transfer of materials and passengers on any of a plurality of transit and materials delivery vehicles between intermediate such stations and last mile delivery solutions for materials and while being adapted for avoiding interference with passenger traffic on transit vehicles. The station in accordance with this aspect and embodiment of the disclosure comprises a system for tracking and communicating routing of materials traffic relative to the station and with established transit routing and schedule information, a structure for temporary storage of materials closely adjacent the transit stop without interfering with normal passenger movement, a system for determining positioning of the transit and materials delivery vehicles relative to the station to facilitate movement of materials traffic between the structure and the transit and materials delivery vehicles, and a system for unloading and loading of materials between the structure and the transit and materials delivery vehicles without interfering with normal passenger movement.

Similar to a prior aspect of the disclosure, an embodiment of this aspect of the disclosure provides that the station's system for determining positioning of vehicles in relation to the station further comprises: a determining system to determine a type of vehicle approaching the station, whether the vehicle is internally loaded, or externally loaded, whether the vehicle is top loaded or side loaded, and whether the vehicle is a platooned vehicle, a lead vehicle, a fully autonomous vehicle, or a partially autonomous vehicle. Further, in accordance with this embodiment of this aspect of the disclosure: there may be further provided a guidance system for guiding the vehicle to an available lane and location to accommodate unloading and loading mechanisms to safely and accurately access materials, wherein such a guidance system further comprises communicating a signal for the vehicle to come to a complete stop at a designated spot relative to the station, and wherein the determining system determines available materials space on the vehicle. Among the types of vehicles able to be accommodated by the system and station, there may be supported materials delivery vehicles, transit vehicles adapted also for materials delivery (i.e., combined delivery/commuter transit vehicles), hybrid vehicles (i.e., combined longer-haul delivery/transit-type vehicles), and even crowdsourced individual delivery and/or transit vehicles adapted for receiving packages and/or passengers. In this way the system and station may be adapted for flexible use with any of these types of vehicles, whether mass-transit or more personal/individual vehicles. Positioning is preferably aided with data received from the vehicle to be positioned, but it may be further augmented with sensing capabilities of the station without departing from the system as claimed.

In accordance with an embodiment of this aspect of the disclosure, the station's system for unloading and loading materials further comprises a computer-controlled robotic materials unloading and loading system, the system preferably further comprising: communicating with the vehicle to open the vehicle for materials access, deactivating materials locking mechanisms to allow unloading from the vehicle, robotic means to unload and load materials from the vehicle, activating locking mechanisms to secure loaded materials onto the vehicle, communicating with the vehicle to close the vehicle to materials access, and signaling to the vehicle that it is free to leave the station.

Similar to a prior aspect and embodiment of the disclosure, the station may be provided wherein the system for unloading and loading materials further comprises a computer-controlled gantry crane for unloading and loading system comprising. In such station's system for unloading and loading of materials, the system further comprises: deactivating materials locking mechanisms to allow unloading by the gantry crane from the vehicle, activating locking mechanisms to secure loaded materials onto the vehicle, and signaling to the vehicle that it is free to leave the station. The various robotic arms and gantry crane materials unloading and loading systems may comprise grippers or other electromagnetic means for grabbing and releasing materials/packages/containers. Unloading and loading is preferably aided with data received from the vehicle to be unloaded and loaded, but the process may be further augmented with sensing capabilities of the station without departing from the system as claimed.

In accordance with another aspect of the disclosure providing a station with a plurality of lanes and at least one sidewalk, or other walkway, for passengers, walking to and from a transit vehicle, the station further comprises at least one siding area for picking up, dropping off, and parking of a platooned materials transport vehicle corresponding with a lead transit vehicle, noting that either, or both, a following platooned vehicle and a lead vehicle in a platoon may carry both passengers and materials. The station of this aspect and embodiment of the disclosure provides that the robotic means, or gantry crane, to unload and load materials, the tracking and communicating routing step, the determining positioning step, the communicating to open step (assuming access by the robotic means or gantry crane to the interior of the transit vehicle is required), the deactivating materials locking step, the activating locking step, the communicating to close step (again assuming access to the interior of the vehicle is required), and the signaling free to leave step are adapted for facilitating movement and transfer of materials on a platooned vehicle while also facilitating transport of passengers on a corresponding lead or platooned transit vehicle.

The siding provided at the TULIPS station in accordance with an aspect of the disclosure helps provide for normal passenger movement with transit vehicles scheduled to depart from the station on a regular schedule, say every 10 minutes or so. Thus, transit vehicles may be temporarily sided in order to perform cleaning, maintenance, recharging, refueling, reconfiguring seats, check for loose materials, and unloading and loading of materials in more extensive unloading and loading operations, which might otherwise delay passenger departures if the transit vehicle wasn't otherwise taken temporarily out of service in such a siding operation. Thus, the system and station in accordance with one or more aspects of the disclosure separates arrival of transit vehicles from departure of the transit vehicles with siding areas, and thereby passenger delays are avoided. With the new system and TULIPS station, the arrival may happen hours before the departure giving the system ample time to unload, reconfigure seats, check for loose materials, charging, refueling, and maintenance, as may be necessary.

During unloading and reloading of the transit vehicles, the vehicle may be optionally designated as not yet in service, whereas other arrivals and departures may be capable of being accomplished in real time while passengers actively board and off-board. Nevertheless, depending on the configuration, it may make sense for passengers to pre-board at the siding area before a scheduled departure time. Such helps ensure that passengers do not experience delays in their commute, while transit vehicles, for example other commuter buses, are readily available for consistent departure on schedule. And such enhanced availability of commuter buses provided by the system and TULIPS station confer a separate benefit of enhanced availability and reliability of the transit vehicles as a result of greater usage of such on account of multiple uses of the vehicles both for transit and materials delivery. Otherwise, commuters often have to wait for a transit vehicle that becomes delayed due to traffic, an accident, or a breakdown. In the present system and station, the delayed bus is not necessarily the one being used, and there may be a queue of preloaded buses available without waiting for the delayed bus. Thus, in such a scenario, the route schedule is maintained as the next available pre-loaded bus stands in for the delayed one, and the present disclosure serves to reinforce enhanced availability of vehicles and thereby enhanced service to both passengers and recipients of materials and packages alike.

Further, it may be appreciated that there is the possibility provided of employing a combination bus/truck (e.g., such as for example, a longer-haul type bus for passengers at the front portion of the bus, whereas there may be provided a flat-bed-type portion near the rear of the bus for hauling materials). Such an arrangement as described above and in connection with such a combination bus/truck may increase the frequency of transit vehicles along any line where there is delivery demand. Thus, assuming 75% goods and 25% people on the transit buses, for example, would greatly increase the route frequency for a particular transit route. Further, predictive code may predict where and when a transit/delivery ratio should shift to alter the types, number, and frequency of buses employed based on dynamic inputs of goods to people ratio, depending on the time of day or anticipated ridership increases/declines. Thus, in other words, the introduction of materials delivery into transit systems may enhance ridership since the materials delivery would provide an added source of revenue to the transit system which, in turn, enables it to provide more vehicles and routes for more frequent service to previously underserved areas. Thus, the disclosure encourages what may be thought of as a "double positive feedback loop" wherein increased frequency of vehicles (appealing to both transit riders and materials deliverers) and enhanced revenue to transit systems are mutually encouraged by one another.

Thus, the ability of TULIPS stations in accordance with an aspect and embodiments of the disclosure to accommodate platooned vehicles greatly increases the flexibility and ability of operators to accomplish package delivery and transit objectives while encouraging further enhancement of availability of resources for package delivery and transit purposes. This is because platooning allows ready mixing and matching of types of vehicles which may be inserted or removed into the delivery/transit process at any given TULIPS station, or otherwise, to expand capacity to address specific needs, for example for rush hour needs for additional passenger carrying capacity, or increased need or demand for materials delivery (for example on holidays or otherwise at peak delivery times). Such platooning also allows flexibility and capacity for response to emergency situations (such as weather or other natural disaster types of events). TULIPS stations are therefore proponents of such flexibility and enhanced capacity in that each TULIPS station may incorporate additional loading and siding areas where platooned vehicles may be temporarily stored and at the ready to be put into service, or removed from service, based upon demand. Such accommodation of platooned vehicles at enhanced siding areas in accordance with the disclosure comprises an improvement over prior methods and systems, such as for example articulated buses attempting to flexibly add availability during peak (e.g., rush hour) transit periods, since sided platoon vehicles are readily attached and detached from their lead vehicles, unlike articulated buses, and therefore they are easily interjected and removed from transit schedules on demand.

In accordance with another aspect and embodiment of the disclosure, the station is further comprised of at least one delivery cycling route for delivery cycles. In such an embodiment, the tracking and communicating routing step and the robotic means to unload and load materials are adapted for facilitating movement and transfer of materials and passengers on a plurality of public transit vehicles (e.g., public mass transit buses) adapted to serve also as materials delivery vehicles, together with being adapted for facilitating movement and transfer of materials using delivery cargo cycle vehicles, without interfering with normal passenger movement on the transit and materials delivery vehicles.

In accordance with yet another aspect and embodiment of the disclosure, the station is further comprised of at least one autonomous delivery vehicle unloading and loading area for last-mile materials delivery using autonomous materials delivery vehicles. With this embodiment, the system for unloading and loading of materials (e.g., as with an automated gantry crane or other robotic system), comprises a computer controlled tracking and communicating routing step: a communicating to open step (assuming access to within a portion of a transit vehicle), a deactivating materials locking step, an activating locking step, a communicating to close step (again assuming access to within a portion of the transit vehicle), and the signaling free to leave step are adapted for facilitating simultaneous movement and transfer of materials and passengers on a plurality of transit vehicles and autonomous delivery vehicles without interfering with normal passenger movement.

Further in accordance with this embodiment, there is provided a station further comprising at least one crosswalk and lane for pedestrian, cycle, cargo cycle delivery, and autonomous vehicle delivery traffic access to transit and materials delivery and pickup, wherein the signaling free to leave step is adapted for facilitating interference-free movement and transfer of materials and passengers on a plurality of transit vehicles, delivery vehicles, delivery cargo cycle vehicles, and autonomous delivery vehicles, without interfering with normal passenger movement.

Thus, in accordance with one or more of the foregoing aspects and embodiments of the disclosure, there is provided a materials storage, movement, and transfer station integrated into a transit stop having a plurality of lanes, and wherein there is further provided at least one sidewalk for passengers walking to, from, or by the transit station, and at least one crosswalk for allowing the crossing of vehicle lanes by pedestrian, cycle, cargo delivery cycle, and autonomous delivery vehicle traffic. Such a station is provided for facilitating movement and transfer of materials and passengers on any of a plurality of transit and materials delivery vehicles between intermediate such stations and last mile delivery solutions for materials, wherein the station is adapted for avoiding interference with passenger traffic on transit vehicles. The station comprises: a system for tracking and communicating routing of materials traffic relative to the station and with established transit routing and schedule information, a structure for temporary storage of materials closely adjacent the transit stop without interfering with normal passenger movement, a system for determining positioning of the transit and materials delivery vehicles relative to the station to facilitate movement of materials traffic between the structure and the transit and materials delivery vehicles, and a system for unloading and loading of materials between the structure and the transit and materials delivery vehicles, without interfering with normal passenger movement.

The storage function of the TULIPS station helps enable a more fluid transport and transfer of materials along an intended route, since materials may be temporarily stored close by transit stops and readily accessed with robotic loading and unloading arms and gantry cranes. In this way the system and station further ensure not only efficient delivery of materials, such as, for example, packages, goods and containerized packages, but also more efficient transport of passengers to and from their intended destinations. In this way, materials delivery may be enhanced and made more efficient, since the materials may be delivered whenever there is space and capacity (i.e., when a vehicle is available and already going to a particular needed destination for delivery of an item or items). Thus, still further, items may be grouped together as grouped containerized packages by existing routing and scheduling systems, to be accommodated in the present new system integrating package delivery data with transit data as necessary, for more efficient delivery of materials.

Preferably, the station's system for determining positioning of vehicles in relation to the station further comprises: a determining system to determine a type of vehicle approaching the station, whether internal-loaded or external-loaded: whether top-loaded or side-loaded, and whether materials delivery, transit, mixed delivery/transit, platooned, lead, autonomous, or partially autonomous. Further, preferably, the station's system for determining position of vehicles in relation to the station, and position of materials to be loaded (relative both to the station and the vehicles to be loaded) further comprises a guidance system for guiding the vehicle to an available lane and location to accommodate unloading and loading mechanisms to safely and accurately access and transfer materials. Such guidance system preferably further comprises communicating a signal for the vehicle to come to a complete stop at a designated spot relative to the station, and the determining system further preferably determines available materials space on the vehicle and locations of materials to be loaded. Positioning is preferably aided with data received from the vehicle to be positioned, but it may be further augmented with sensing capabilities of the station without departing from the system as claimed.

The station's system for unloading and loading materials further preferably comprises a computer-controlled materials unloading and loading system comprising: deactivating materials locking mechanisms to allow unloading from the vehicle, automated means to unload and load materials from the vehicle, activating locking mechanisms to secure loaded materials onto the vehicle, and signaling to the vehicle that it is free to leave the station. Unloading and loading is preferably aided with data received from the vehicle to be unloaded and loaded, but the process may be further augmented with sensing capabilities of the station without departing from the system as claimed.

Still further, such a station may comprise a siding area for picking up, dropping off, and parking of a platooned package transport vehicle corresponding with a lead transit vehicle. The station wherein the tracking and communicating routing step, the deactivating materials locking step, the automated means to unload and load packages, the activating locking step, and the signaling free to leave step are adapted for facilitating movement and transfer of materials on a platooned vehicle while also facilitating transport of passengers on a corresponding lead transit vehicle.

Such siding areas as are provided in accordance with certain aspects of the disclosure may further enable in essence a location where the vehicles (whether delivery, transit, mixed delivery/transit and others) interacting with the system and the station may be parked for unloading and loading, as for example with gantry cranes, refueling, charging, pre-boarding, maintenance and the like. This provides that smaller batteries are capable of being used with the system which are able to be more frequently charged, as opposed to a need for larger such batteries which are not as frequently charged. By enabling more frequent charging of smaller batteries, the system reinforces conservation of not only mining of lithium for batteries, but conservation of roadways with lighter vehicles associated with smaller and more frequently chargeable batteries. Still further, such a system enables slower charging of batteries, which is known to enhance battery life. Thus, this more conservative use of batteries is good for the environment, and growing concerns and known problems relating to mining for lithium batteries may be somewhat alleviated.

The station in accordance with this aspect and embodiment of the disclosure may further preferably comprise a materials access bank adjacent the structure and for enabling picking up of individual materials accessible to pedestrians, cyclists, and crowd-sourced delivery drivers. Thus, in accordance with this aspect and embodiment, materials such as recycling materials, or other raw materials, may be dropped off and picked up, as well as packages, containerized packages, or even robots or small AVs with their packages attached to them. TULIPS stations in accordance with the foregoing aspects and embodiments of the disclosure enable seamless materials delivery to intermediate locations along predetermined public mass transit routes using the previously described associated adapted transit station stops.

The TULIPS stations described also may be integrated into a transit stop station providing for unloading and loading of platooned vehicles, wherein a transit lead vehicle has a follower vehicle, and wherein either may be serviced in a TULIPS station siding area. Further, any such vehicle forming part of a platoon may have top, side, or interior loading capability, a shorter-haul commuter mass transit vehicle adapted also for package delivery capability, a long-distance transit vehicle with compartments for other people or materials/packages, a combination transit vehicle with a fixed flatbed space for materials (which could be top-loaded), a freight vehicle (box truck or flatbed) without passengers, or other configurations. Such incorporation of platooning further lends to the ability of the station and system of intermodal transfer of people and materials to do so without interfering with passenger traffic.

Such stations will greatly reduce the amount of truck traffic for materials delivery on the roadways associated with current burgeoning materials delivery practice unduly employing much larger trucks than needed on roadways not well-suited for such. Thus, it should be noted that, for example, roadways (such as roadways in residential areas) may not in many cases have a sufficient pavement structure for repeated deliveries using heavier trucks (e.g., where asphalt is used instead of reinforced concrete). With such roadways, heavier truck traffic may cause undue wear and tear on the roadways, wherein a start of a roadway defect, such as a pothole, or "alligator cracking", which may be exacerbated by unduly heavy truck traffic running over the defect. And such defects become worse over time as water and ice invade the defect and further break down the roadway. And, of course, such damage must be repaired and with increasing costliness to local governments and associations, thus somewhat inappropriately shifting such costliness from manufacturers and shippers to the consuming public. And while no obvious damage may be visible for a few years, nevertheless the life of the pavement may be reduced by several years forcing either an early repaving or rutting—not to mention that many such roadways may simply be constructed of gravel. Thus, in turn, the system and TULIPS station of the present disclosure, including Already-Going-There (AGT) transit vehicles, will help to preserve and maintain roadways in better condition.

This, in turn, will save costs in materials delivery, and it will encourage increased transit usage-still further encouraging utilization of otherwise under-utilized transit vehicles, whether bus, train, or subway transit vehicles. Such will help preserve existing road infrastructure and reduce pollution and waste, since much of delivery truck traffic on residential roadways entails travel of nearly empty trucks along such roadways (after deliveries have been made), wherein the trucks themselves used for such deliveries, as opposed to the packages carried, comprise the overwhelming portion of weight on the roads. Thus, by integrating materials delivery more seamlessly onto existing modes of AGT public transit, great efficiencies are won, and utilization of public transportation systems is encouraged.

By facilitating integration with last-mile materials delivery solutions, including lightweight bicycle and tricycle materials delivery vehicles, lightweight autonomous delivery vehicles, and by encouraging of passenger pickup of packages on transit vehicles or at transit vehicle stops, the methods, systems and stations of the present disclosure encourage greater cost savings and environmental efficiencies than existing systems, all in a way that will encourage governmental, and quasi-governmental, systems to get involved to collaborate to overcome existing congestion and infrastructure wear and tear problems. By enabling integration of materials delivery with passenger public transit, the system and methods described will lead not only to much greater efficiency, savings, and cost reductions, both in terms of materials delivery and transit costs, but also savings in terms of environmental and infrastructure development and maintenance. This is achieved in part since, whereas before there would have been several large materials delivery carriers with their trucks running over residential surface roads for example, competing with that resource at the same time as transit carriers and other delivery carriers, delivery by way of the present disclosure envisions a vast reduction in the need for such multiple large carriers' trucks on the roads, since now AGT transit vehicles would pick up the load of materials delivery, cargo cycles (bicycles, tricycles, quad cycles), AVs and other smaller delivery vehicles would be enabled in making last mile deliveries.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements. Features, functions, and advantages of the present disclosure may be achieved independently in various embodiments, or may be combined in yet other embodiments without departing form the scope of the invention as claimed.

BRIEF DESCRIPTIONS OF DRAWINGS

Figure 10A:
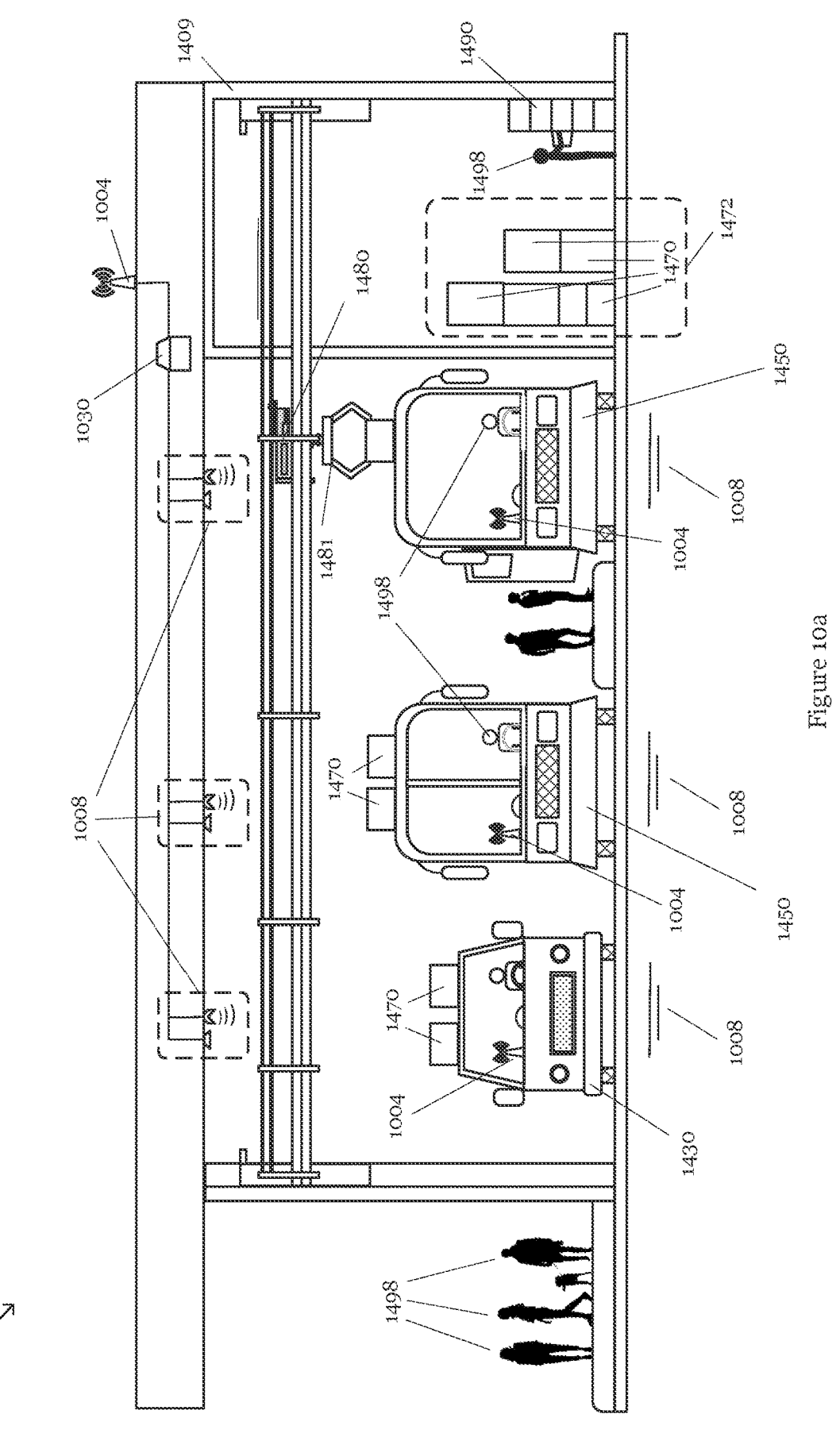

FIG. 10*a* shows a front of a transit stop showing a TULIPS (transfer, unload, load, Internet-of-Things, positioning, storage) station.

Figure 10B:
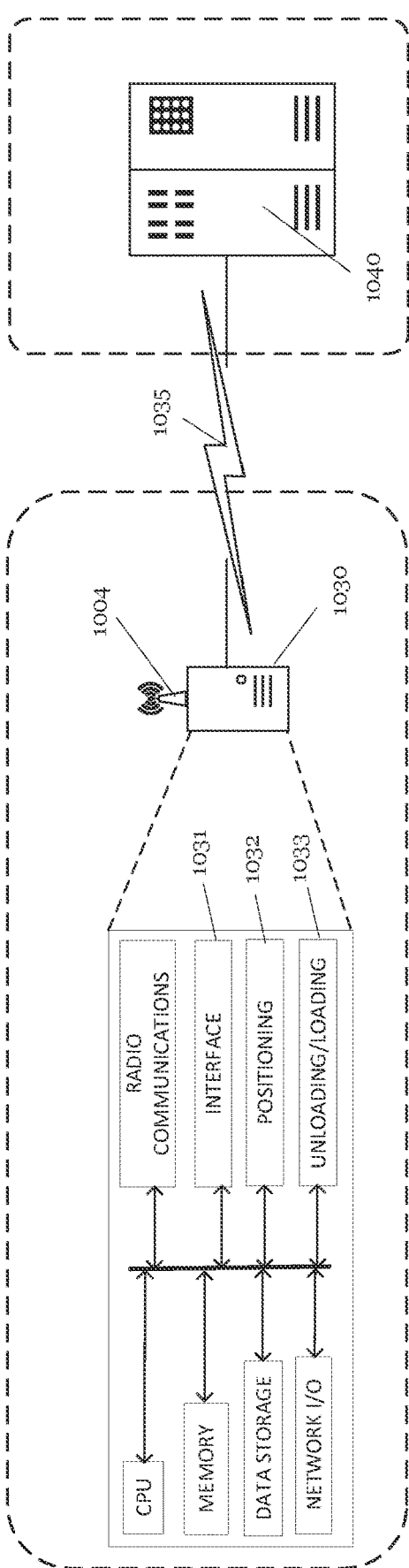

FIG. 10*b* shows a server system designed for communicating with a mass transit central computer system and individual various transit and delivery vehicles, whether bus, truck, bicycle delivery vehicle, or autonomous delivery vehicle (AV) in accordance with an aspect and embodiment of the disclosure.

Figure 10C:
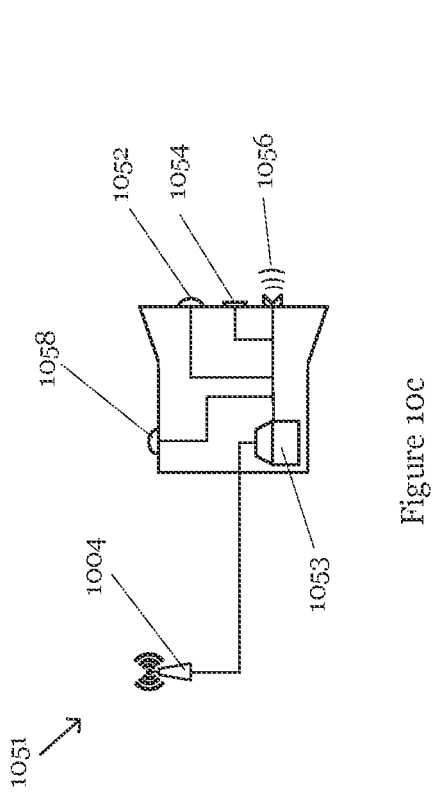

FIG. 10*c* shows a sensor array comprising positional sensors, video cameras, LIDAR, RADAR, GPS, and radio communication means all coordinated by an onboard vehicle computer system.

Figure 10D:
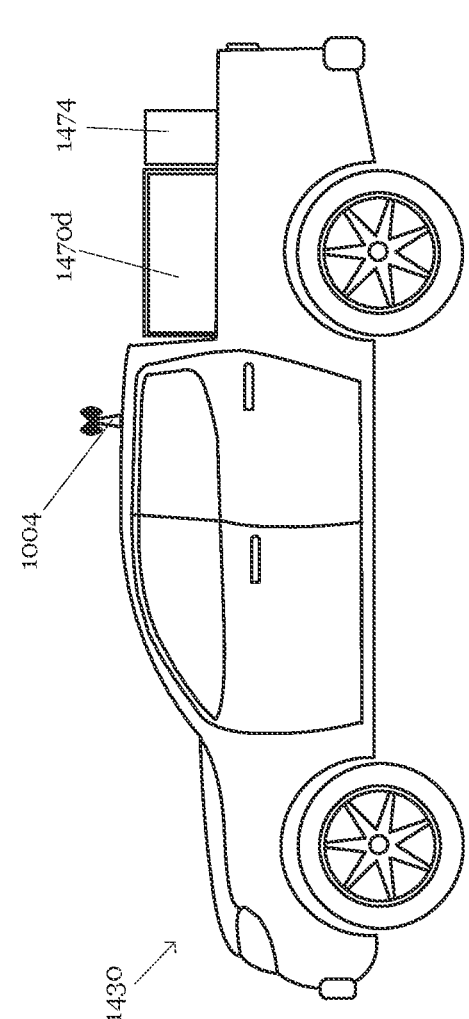

FIG. 10*d* shows a crowdsourced last-mile delivery vehicle capable of carrying containerized and other packages and materials for delivery to destinations.

Figure 10E:
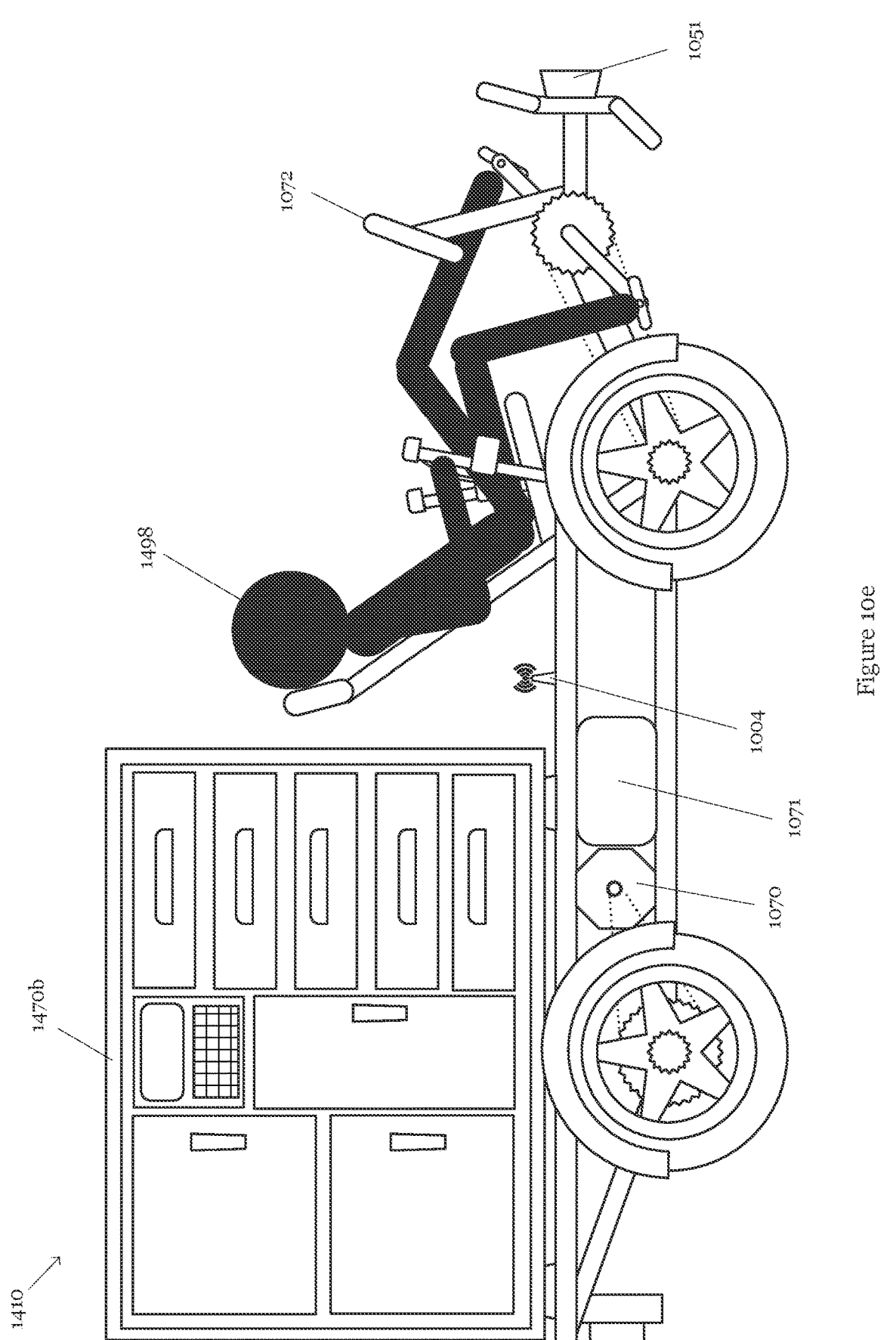

FIG. 10*e* shows a cargo bike last-mile delivery vehicle capable of carrying containerized packages for delivery to destinations and having communication devices thereon for communicating with TULIPS stations, as well as sensors thereon for avoiding collisions, tracking location, and otherwise guiding the cargo bike, all as part of a transit-enabled materials delivery system.

Figure 10F:
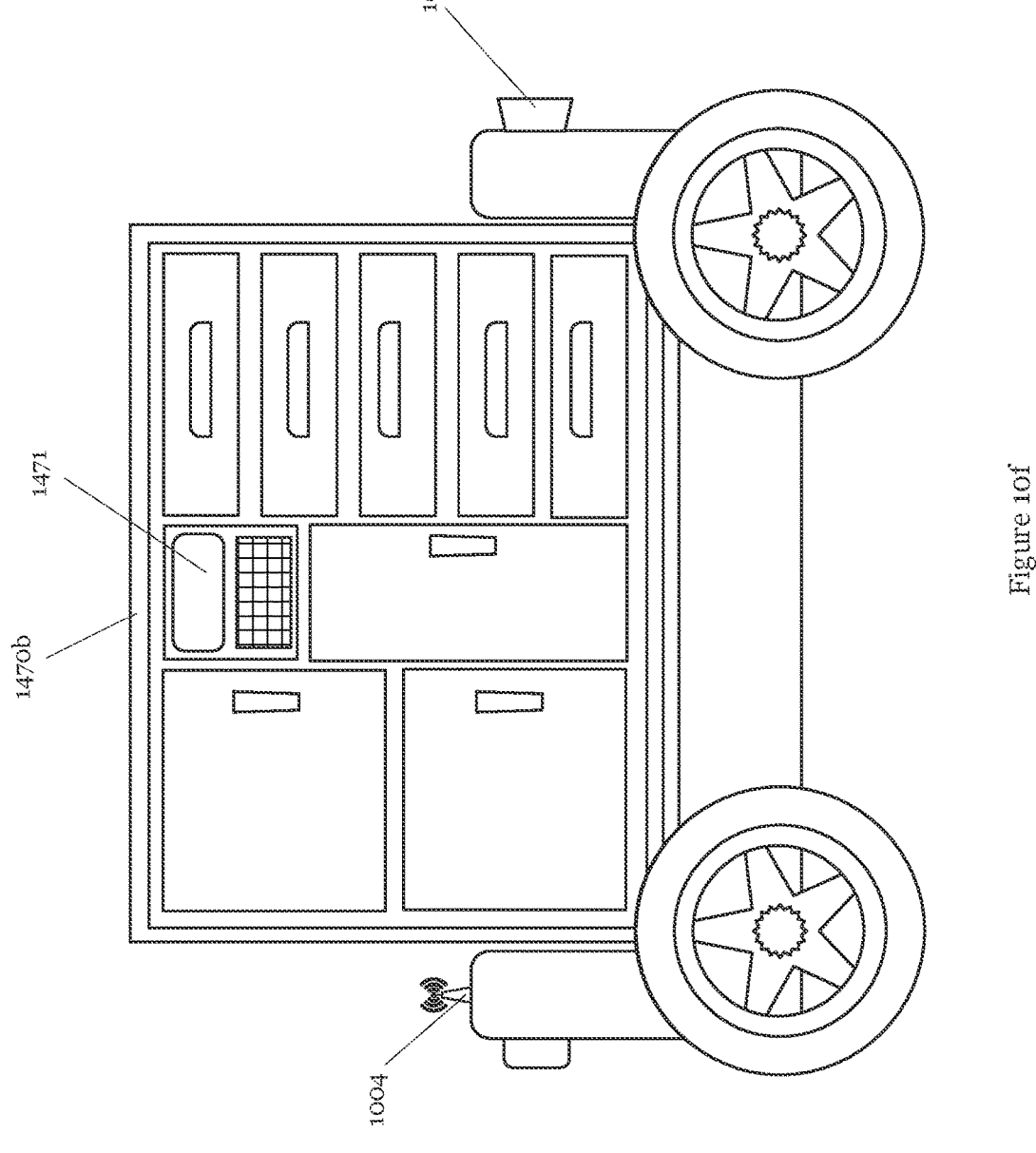

FIG. 10*f* shows an autonomous vehicle (AV) capable of carrying containerized packages for delivery to destinations and having communication devices thereon for communicating with TULIPS stations, as well as sensors thereon for avoiding collisions, tracking location, and otherwise guiding the AV, all as part of a transit-enabled materials delivery system.

Figure 10G:
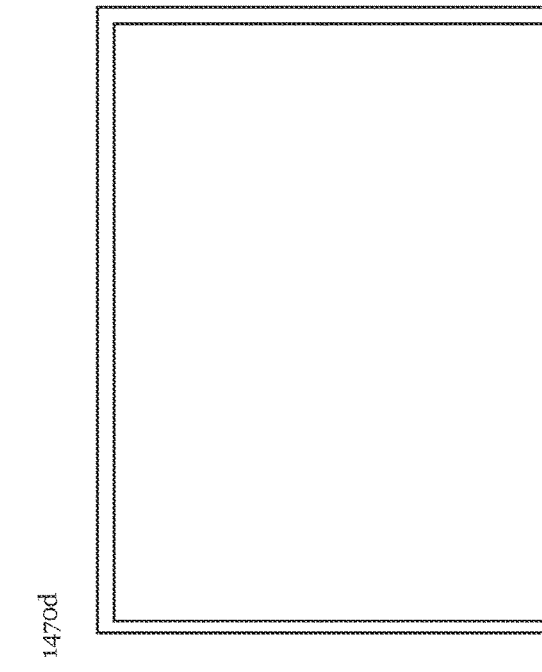
Figure 10G:
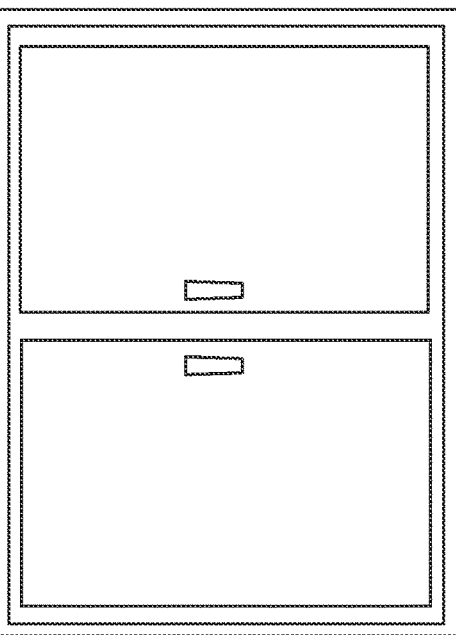
Figure 10G:
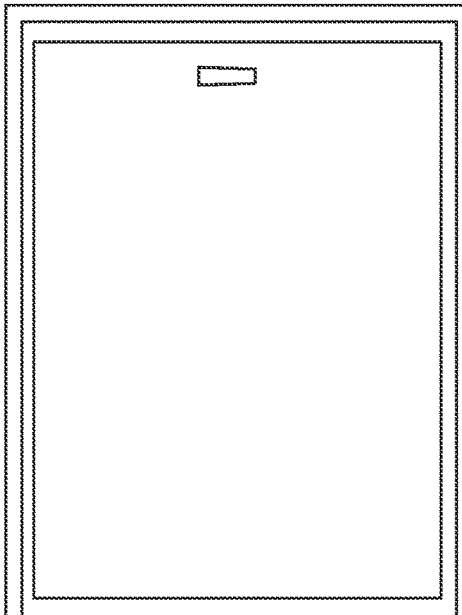

FIG. 10*g* shows four different types of container configurations each having different accessibility features.

Figure 11A:
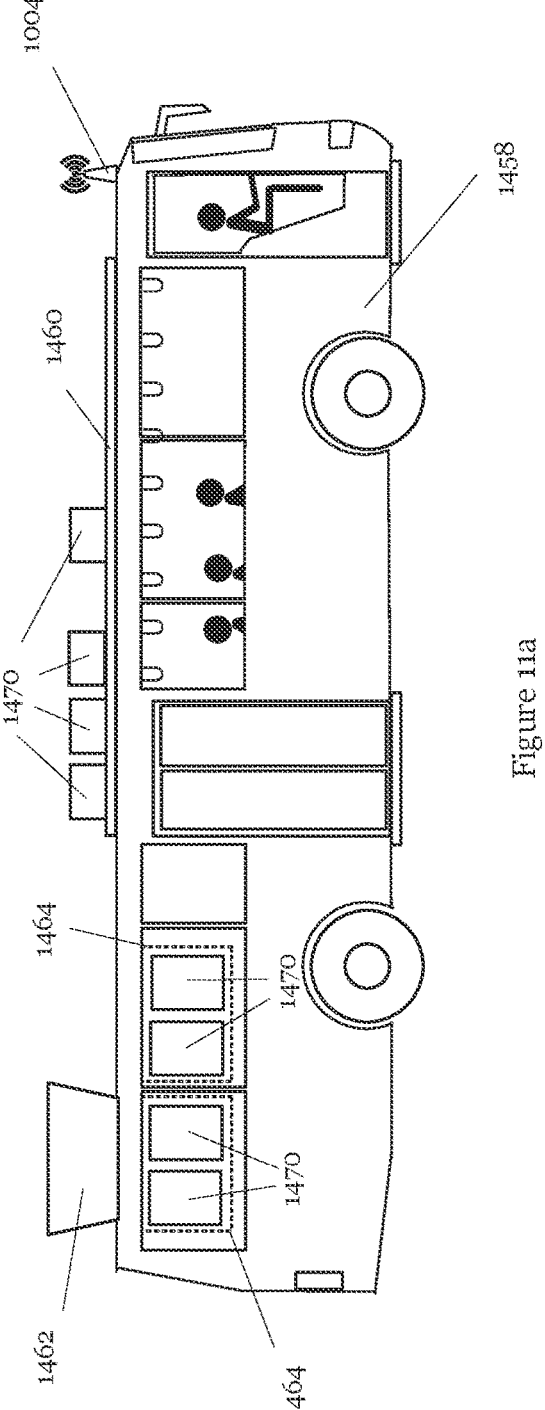
Figure 11B:
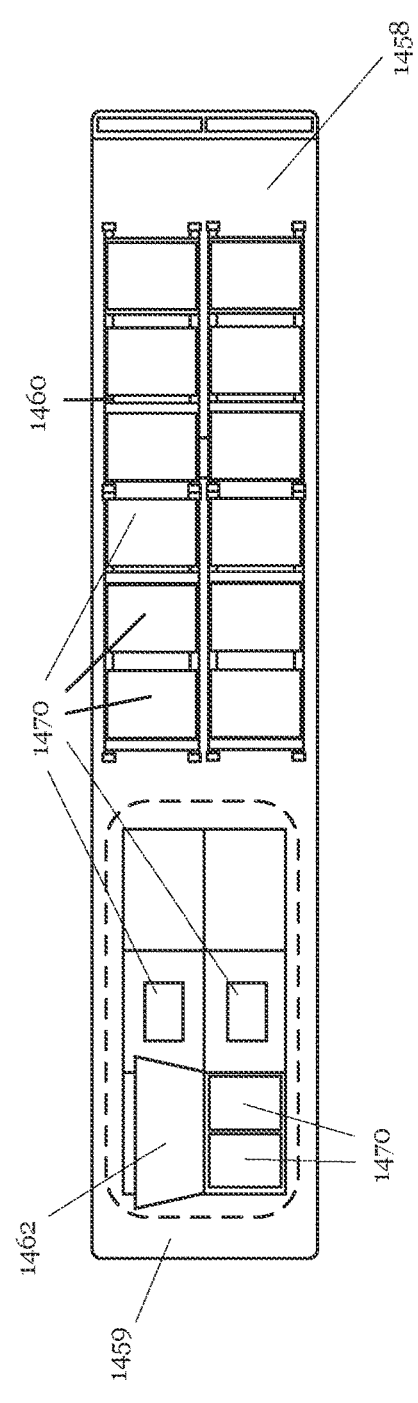

FIGS. 11*a* and 11*b* show a side view and a top view, respectively, of a configuration of a materials carrying enabled commuter-type transit bus in accordance with an aspect and embodiment of the disclosure with top-loaded external and internal materials accommodating bays and showing how the bays may be used during off-peak passenger times so as to not interfere with passenger seating.

Figures 12A, 12B:
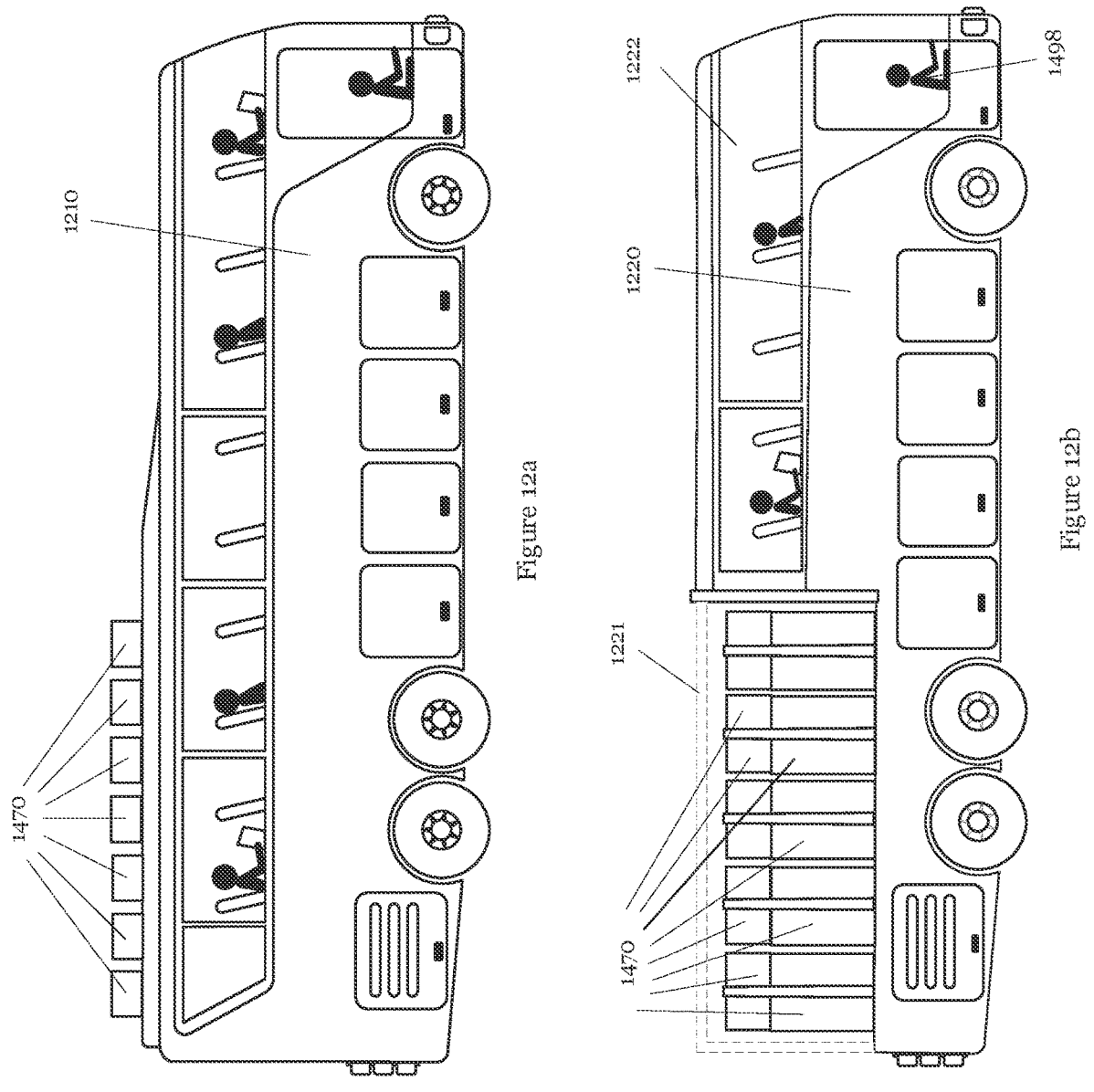

FIG. 12*a* shows a materials carrying enabled long-haul transit vehicle (bus) showing external container storage locations in accordance with an aspect and embodiment of the disclosure.

FIG. 12*b* shows a materials carrying enabled long-haul transit vehicle (bus) showing a rear flat-bed-type external container storage platform, or bay, in accordance with an aspect and embodiment of the disclosure.

Figures 12C, 12D:
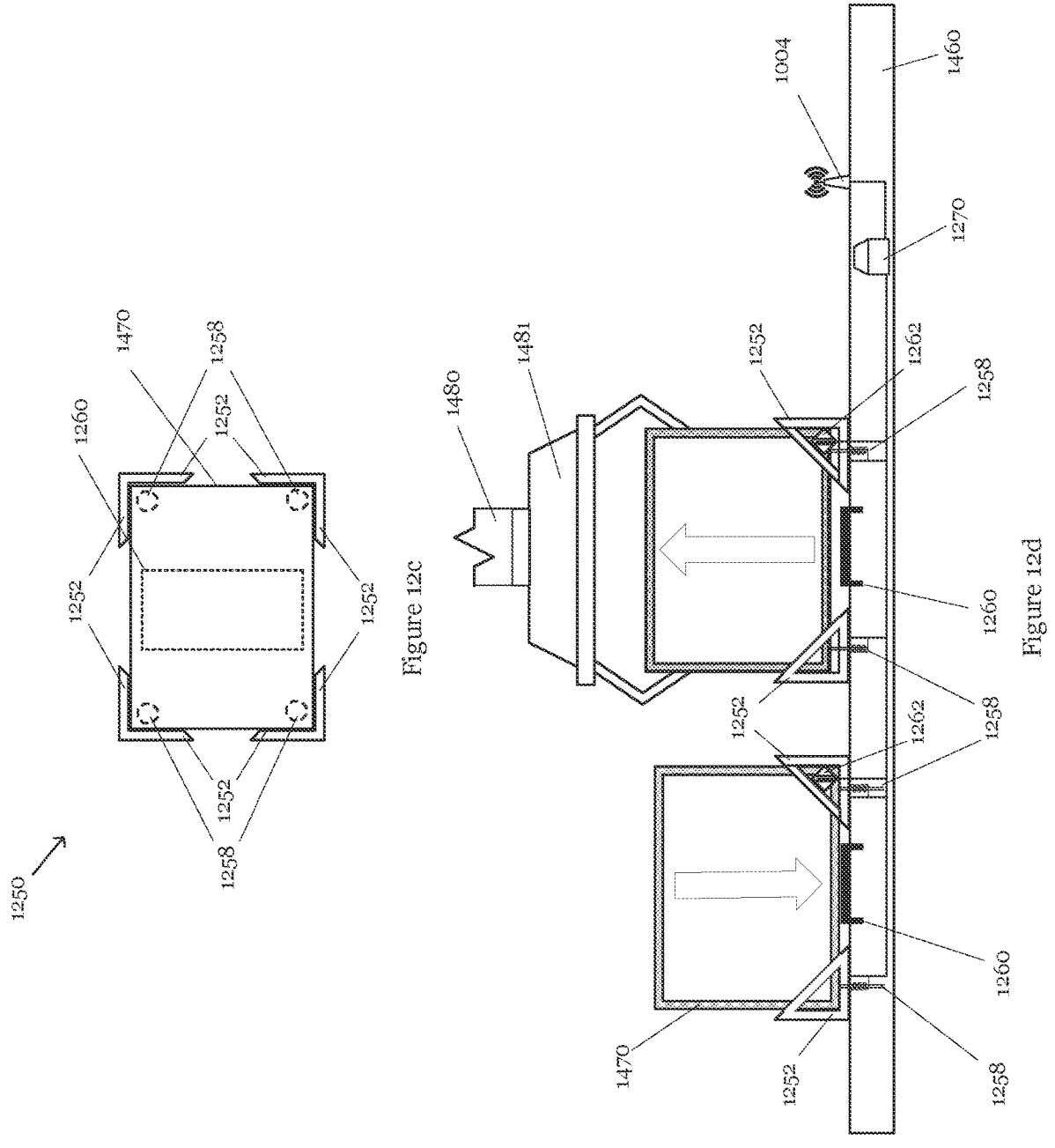

FIGS. 12*c* and 12*d* show top and side views, respectively, of an example of an automated/remote controlled container locking mechanism adapted for use in securing materials to transit vehicles, wherein the locking mechanism is controllable by the transit vehicle and/or a TULIPS station unloading and loading system.

Figure 12E:
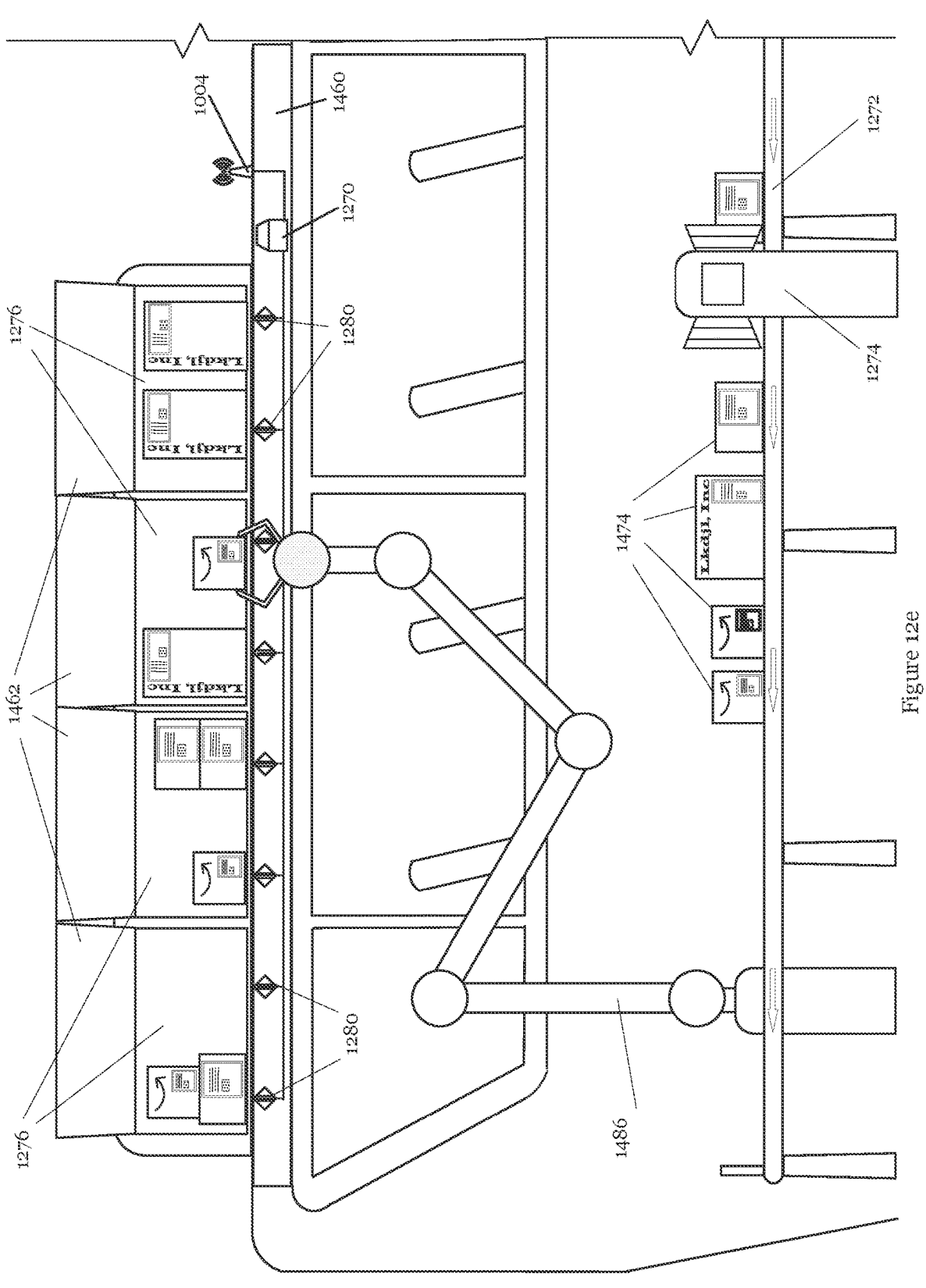

FIG. 12*e* shows an example of a robotic arm that picks up materials, such as individual packages, as they pass by on a conveyor. The system conveyor is shown having a barcode scanner to facilitate tracking and passing along shipping status information for each package, wherein the robotic arm places the materials in openable and closeable bins located on top of a commuter bus.

Figures 12F, 12G, 12H:
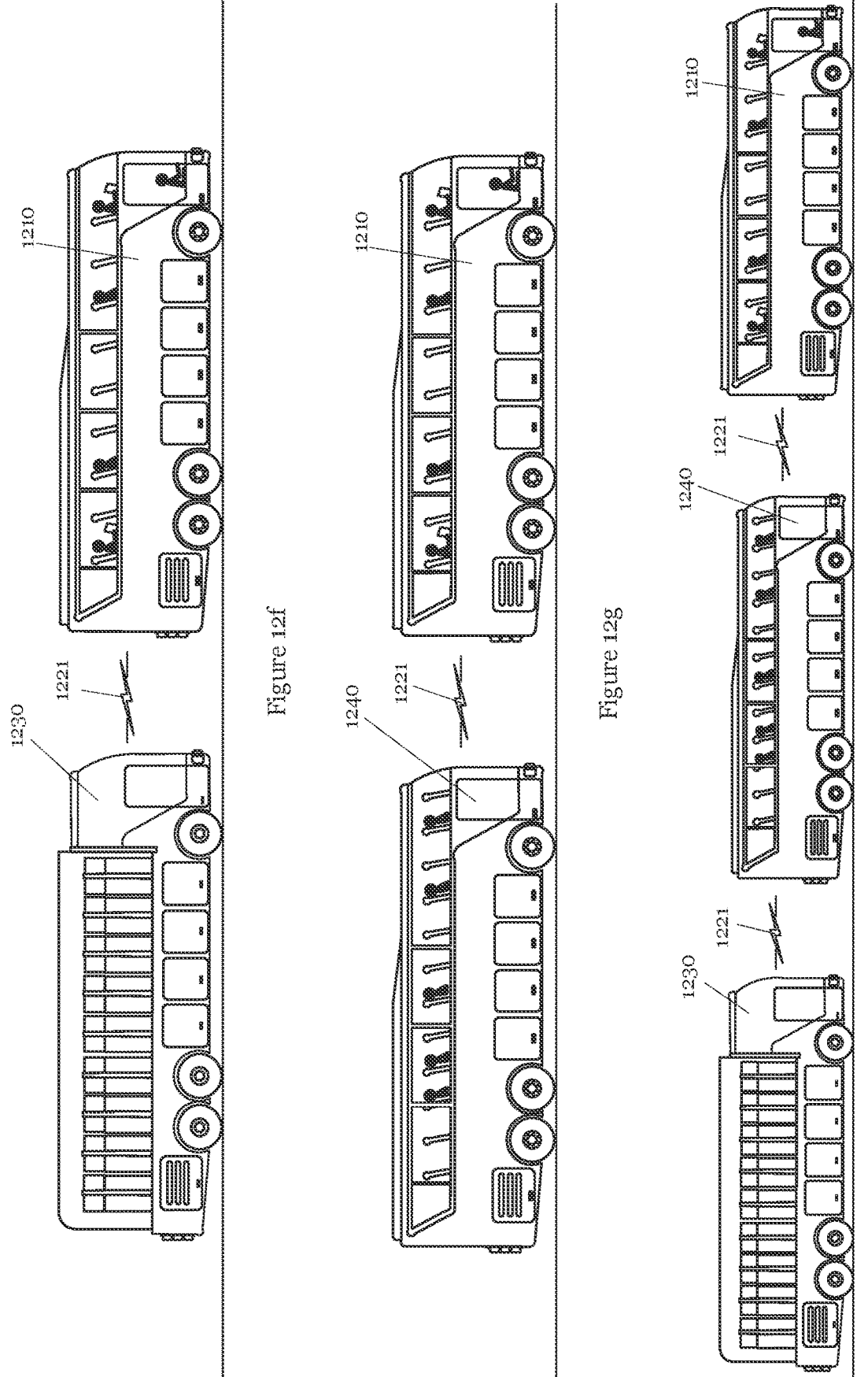

FIGS. 12*f-h* show examples of platooned vehicles in various configurations as follows: FIG. 12*f* is a luxury long-haul bus linked via radio or other means to a freight-only platooned vehicle: FIG. 12*g* is a luxury long-haul bus linked to a coach-class-type platooned passenger vehicle: FIG. 12*h* is a combination of such wherein there is shown a lead luxury-class-type long-haul vehicle followed by a coach-class-type platooned long-haul passenger vehicle further followed by a freight-only-type platooned vehicle.

Figure 13:
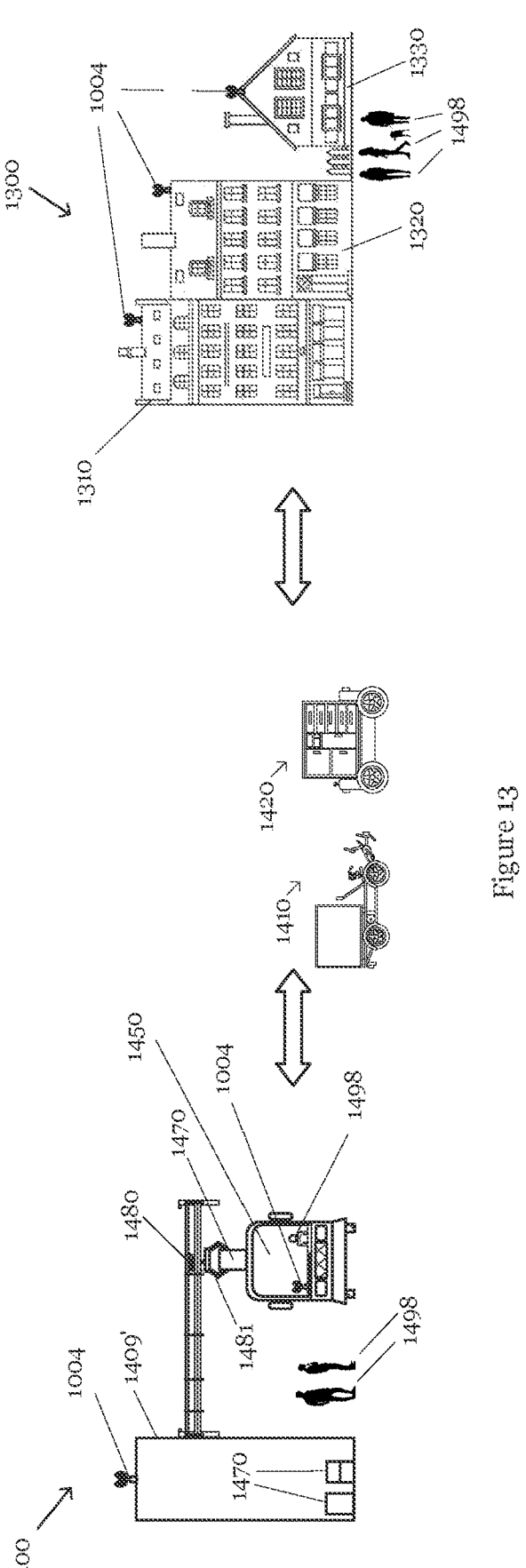

FIG. 13 shows a local bus-stop-type TULIPS station, showing simultaneous loading and unloading of packages and passengers at the same time and Internet-of-Things (IOT) communications between the materials carrying enabled commuter bus transit vehicle and the TULIPS station, wherein FIG. 13 also shows last-mile materials delivery vehicles able to communicate with and having access to the TULIPS station for enabling delivery of packages to a local neighborhood, in accordance with an aspect and embodiment of the disclosure.

Figure 14A:
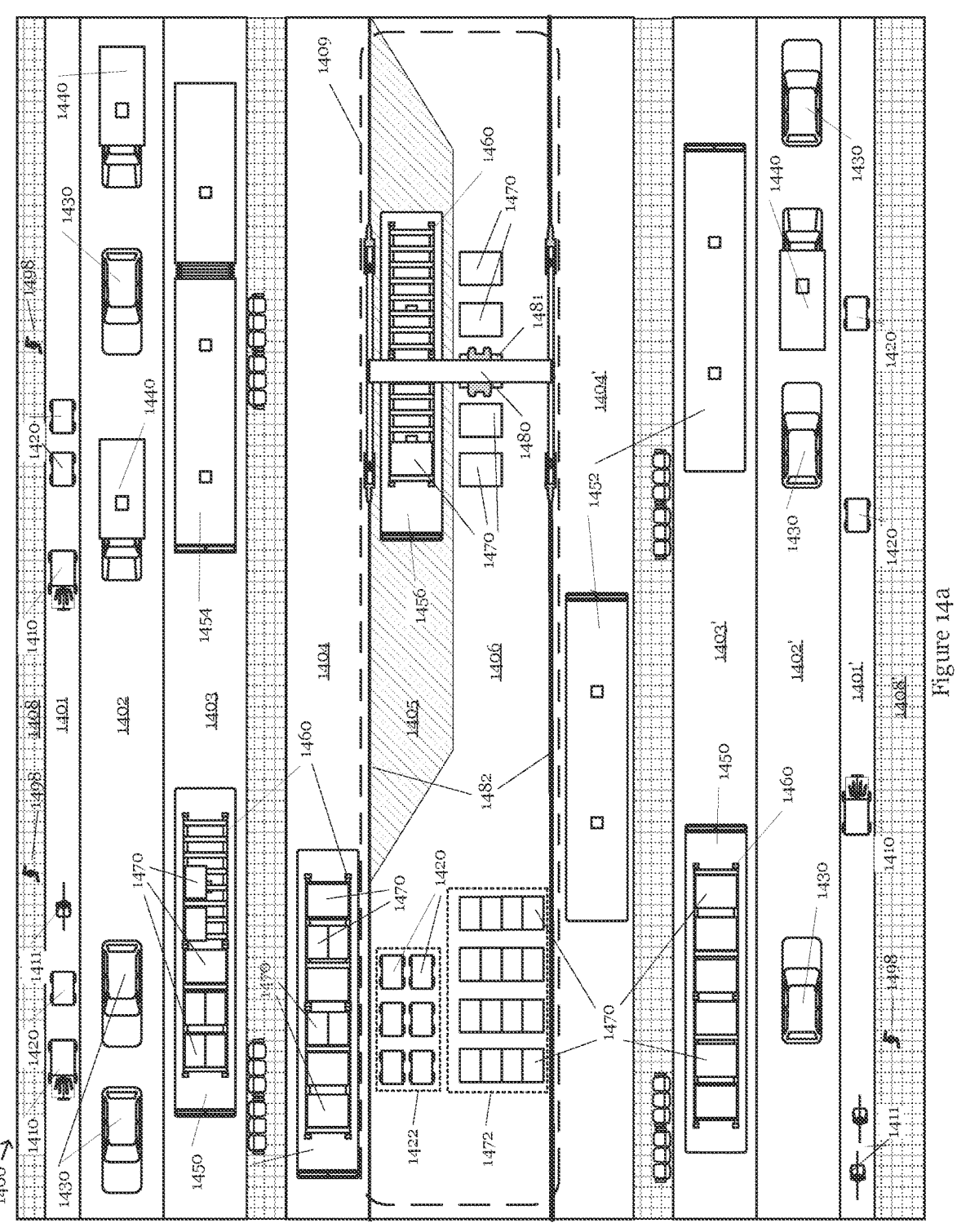
Figure 14B:
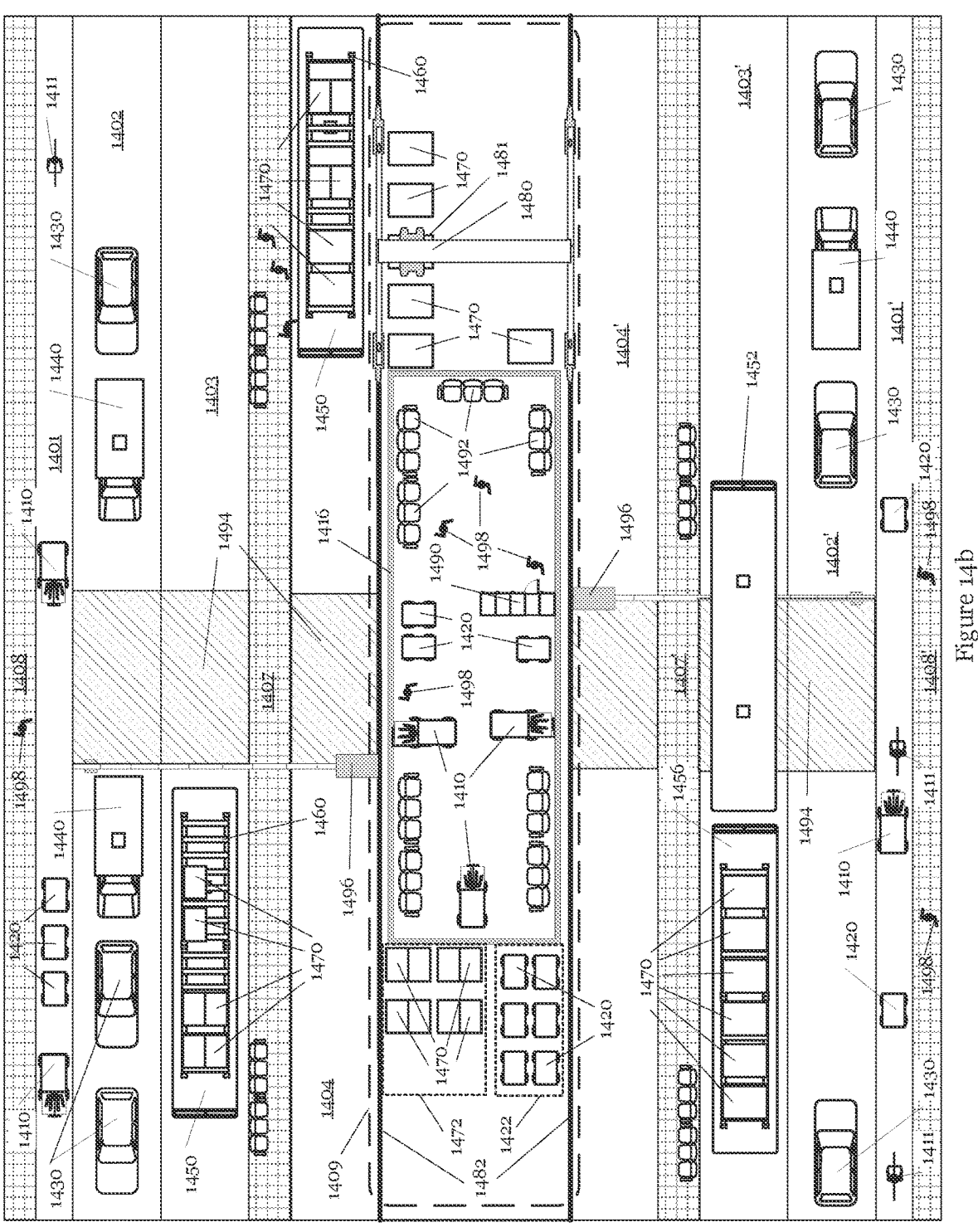
Figure 14C:
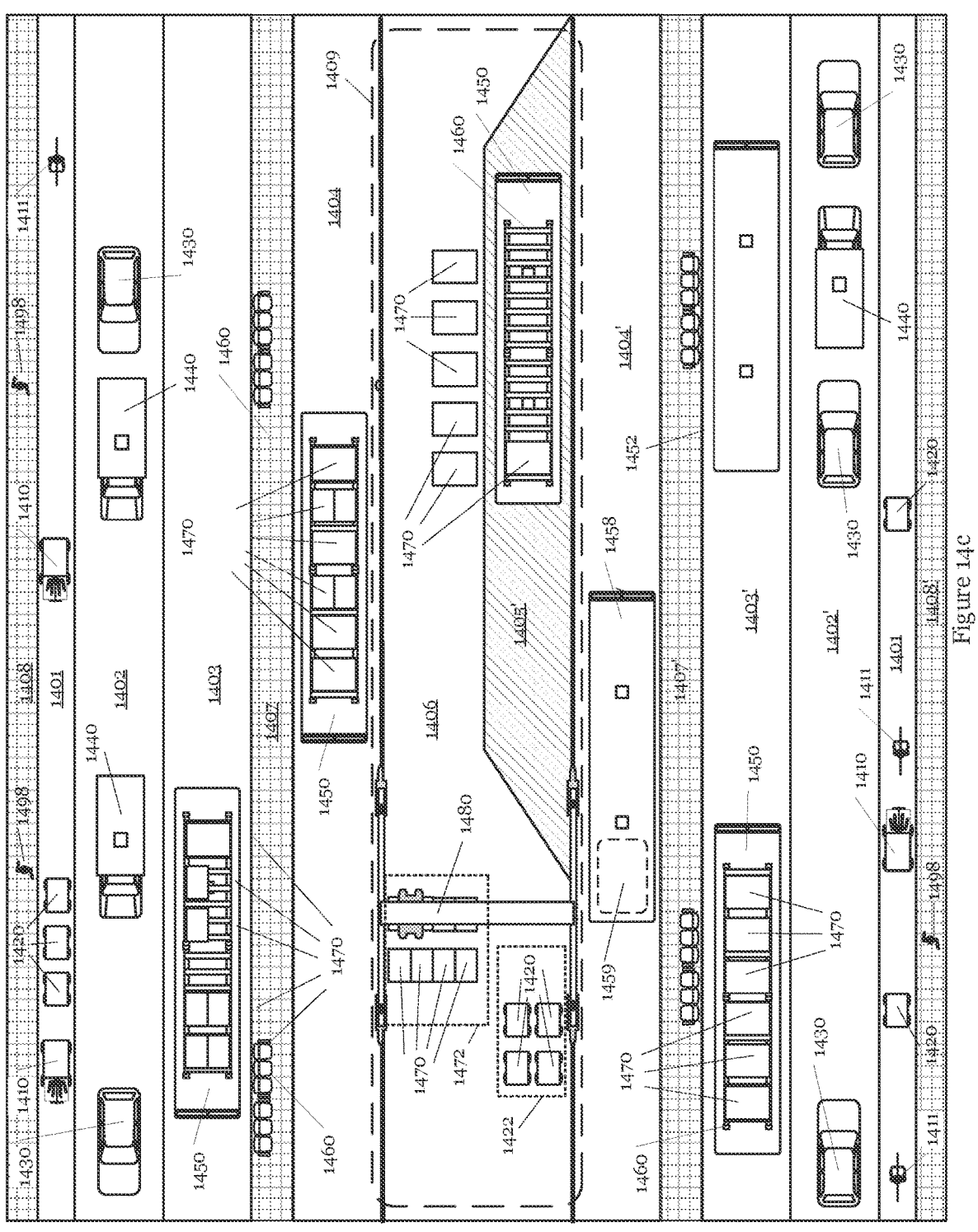

FIGS. 14*a-c* show a preferred configuration for a TULIPS station in accordance with an aspect and embodiment of the disclosure, wherein FIGS. 14*a* and *c* show first and second directional (e.g., East/West, or North/South) capability for basic transit vehicle transit lanes, a passenger path, a bike route, a passenger auto lane, a transit vehicle passing lane, a transit vehicle stop lane, a platoon vehicle loading and unloading area, and a transit vehicle stop loading and unloading area, serviceable with one of a plurality of gantry crane loading and unloading systems, wherein the loading and unloading systems are capable of loading and unloading transit vehicles (e.g., buses), platooned vehicles, and autonomous vehicles: FIG. 14*b* shows passenger areas of the TULIPS station including a locker for users for package access, a crosswalk, and where gantry cranes may provide delivery of packages for AV and cargo bikes (e.g., bicycle/tricycle/quad bikes) and/or wherein crowdsourced delivery vehicles or drivers may access packages or transit loading and unloading.

Figure 14D:
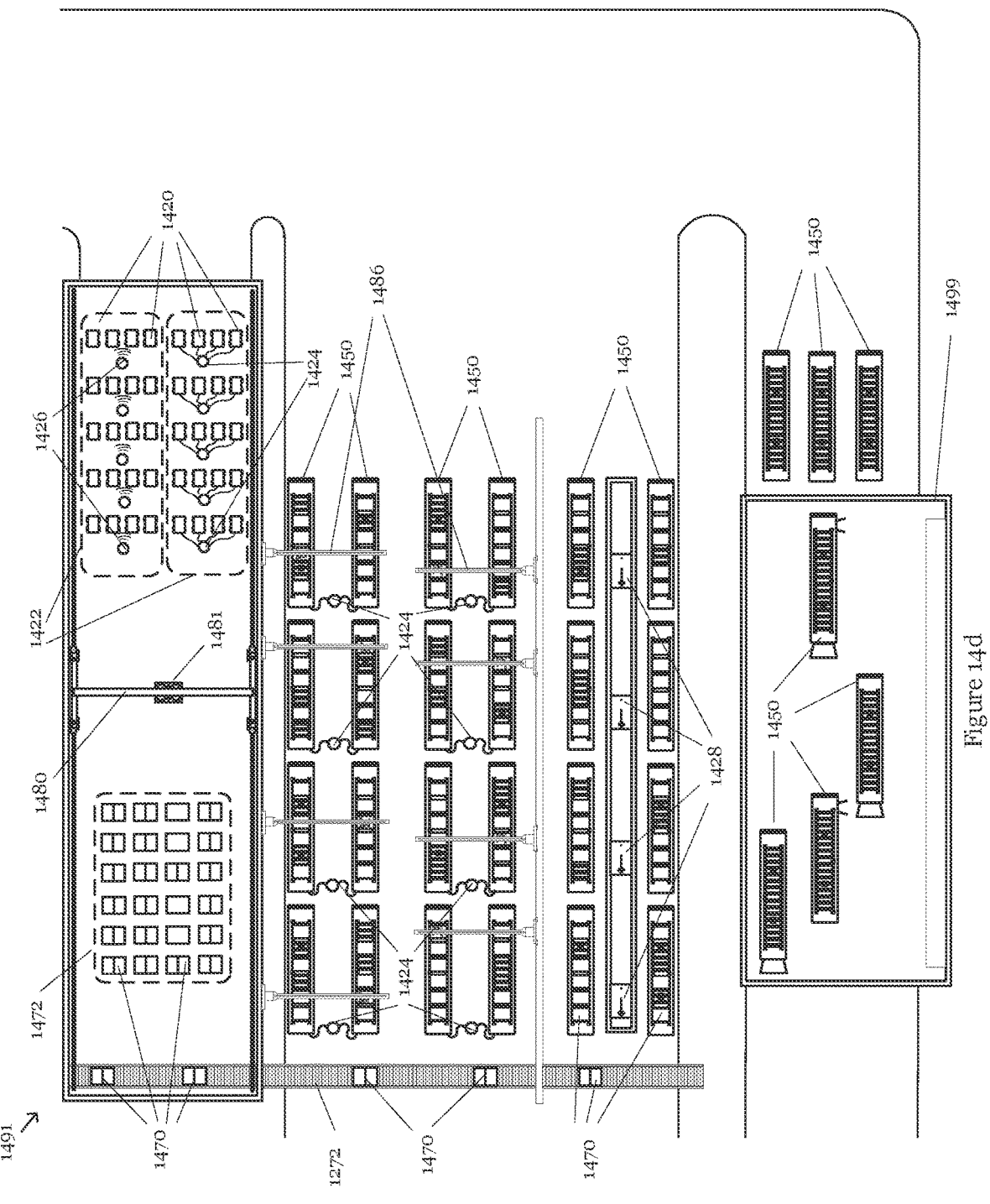

FIG. 14*d* shows an enhanced siding area having a package storage area where vehicles and AVs may be simultaneously pre-loaded with packages, charged, and refueled, the enhanced siding area also providing space where the transit vehicles may be maintained and/or repaired.

Figure 15A:
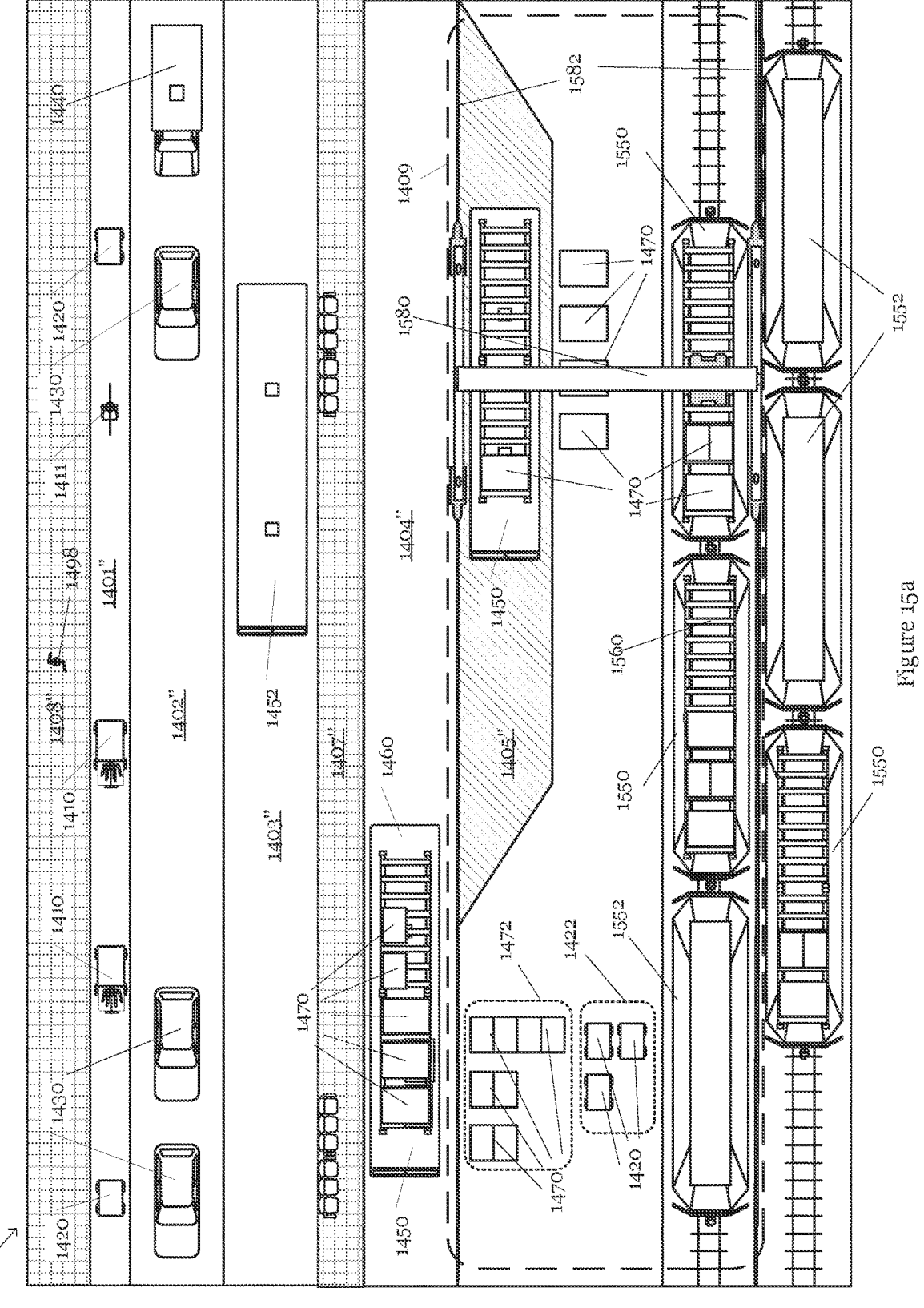
Figure 15B:
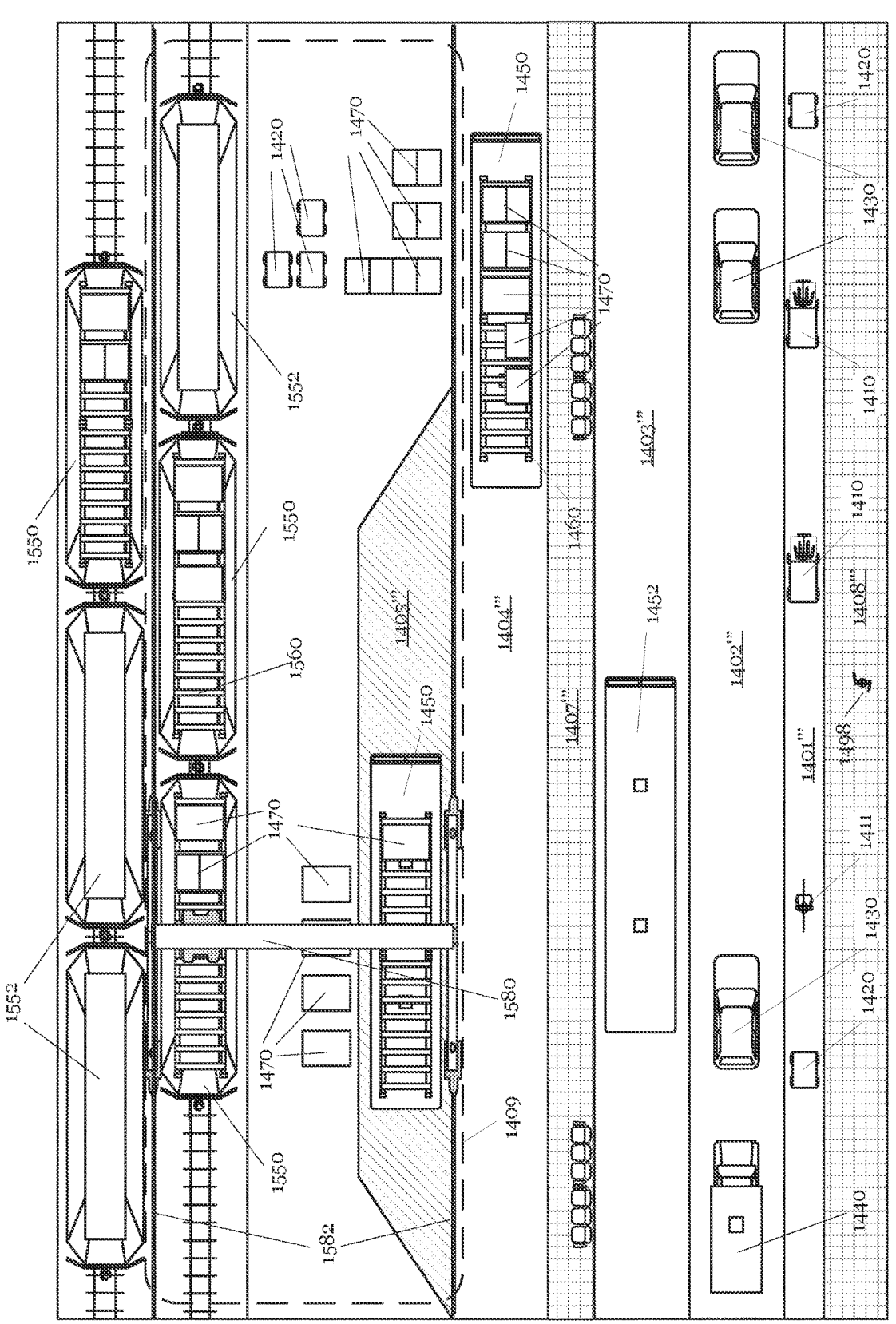

FIGS. 15*a* and 15*b* show other alternative portions of embodiments of types of TULIPS stations where bus transit lanes are positioned together with train transit rails and sidings to enable transit train cars and cargo train cars to stop adjacent the sidings to transfer passengers and materials such as packages or containers between buses and trains.

Figure 16A:
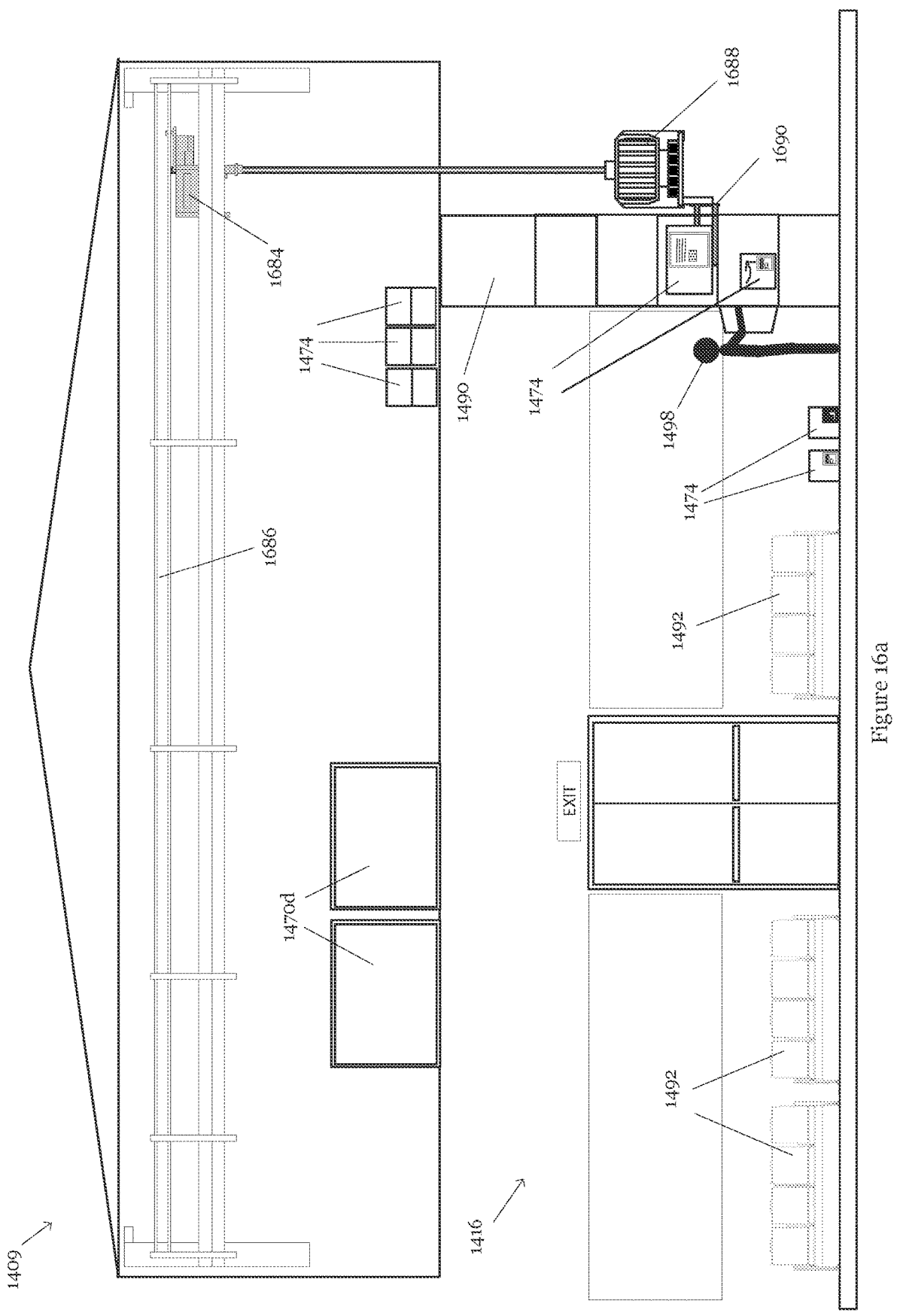

FIG. 16*a* is a side view of the passenger area of a TULIPS station in accordance with an aspect and embodiment of the disclosure and having an automated material, package and container loading and unloading system, where crowdsourced delivery drivers, or materials recipients/owners, may rest and also pick up materials at a locker that has been automatically loaded by the loading and unloading system, or deposit materials at the locker for shipment to a destination, return, recycling, or rerouting.

Figure 16B:
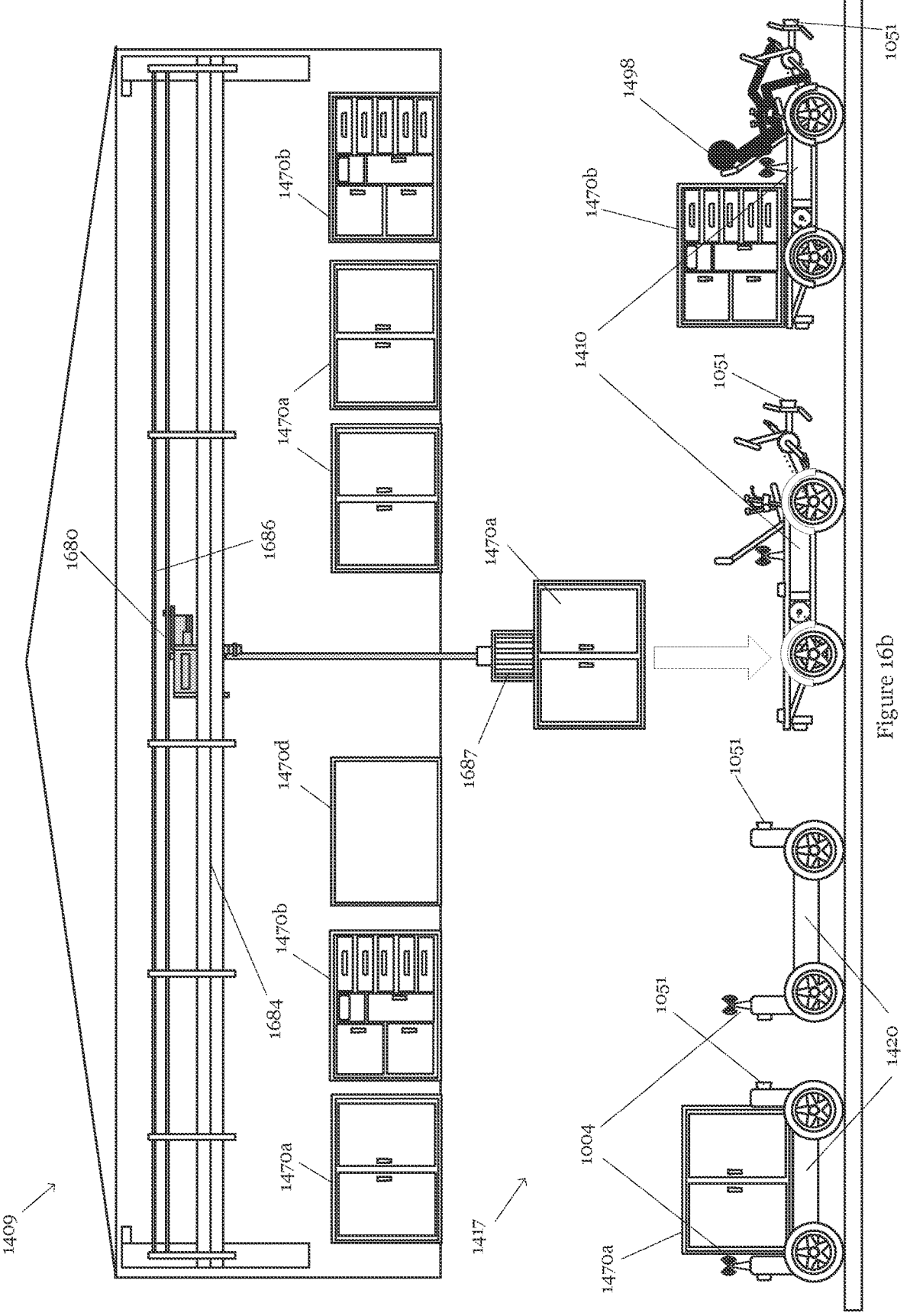

FIG. 16*b* is a side view of an AV and cargo bike materials delivery vehicle loading and unloading area of a TULIPS station in accordance with an aspect and embodiment of the disclosure and having an automated gantry crane materials, packages or containers loading and unloading system, where AVs and cargo bikes may be automatically loaded and/or unloaded by the gantry crane.

Figure 17:
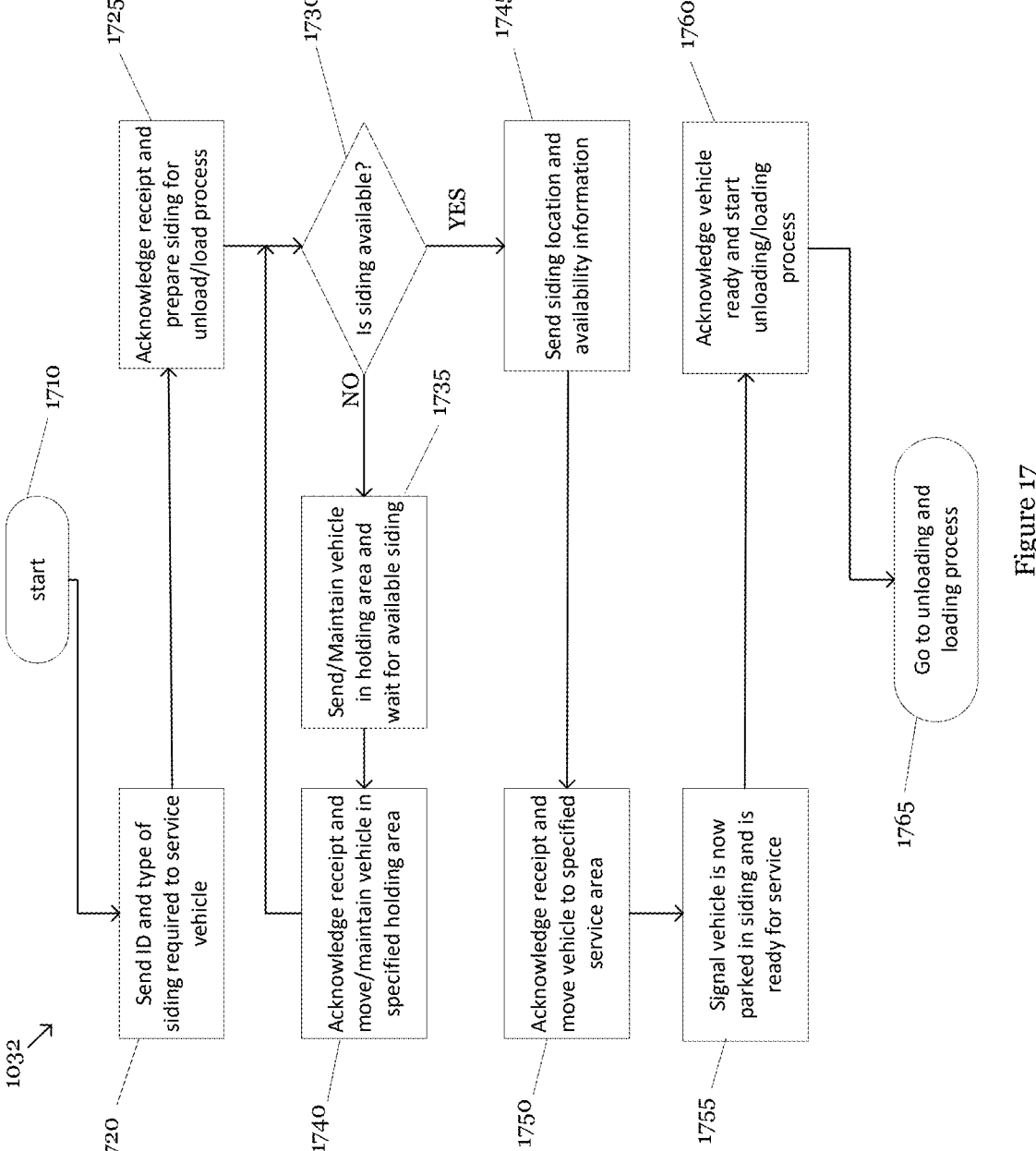

FIG. 17 is a flowchart showing identification of an arriving vehicle, matching of the vehicle with appropriate functionality of the system for unloading and loading of the vehicle, and routing the vehicle to an appropriate servicing area for unloading and loading of passengers and/or materials, packages or containers in accordance with an aspect and embodiment of the disclosure.

Figure 18A:
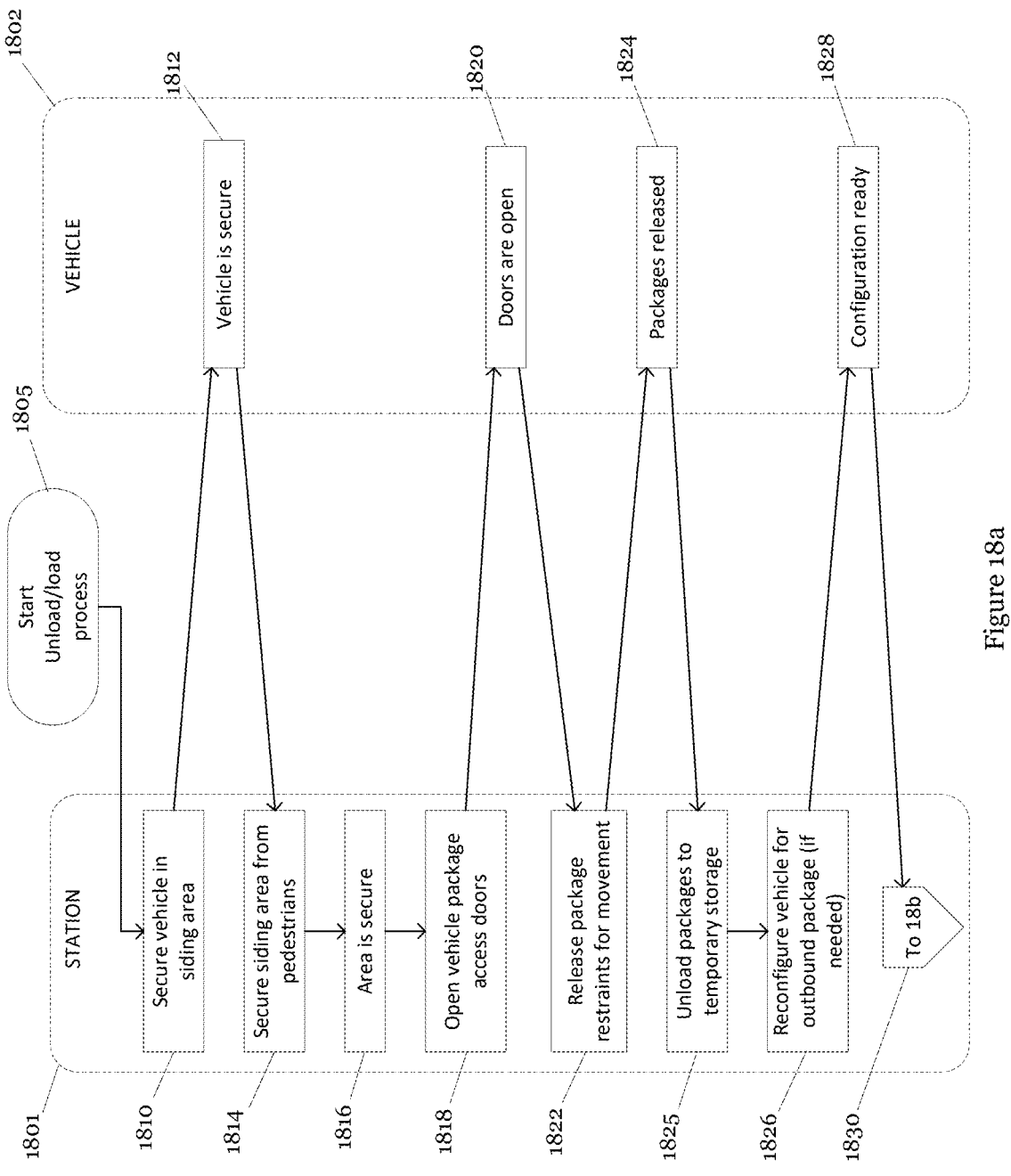
Figure 18B:
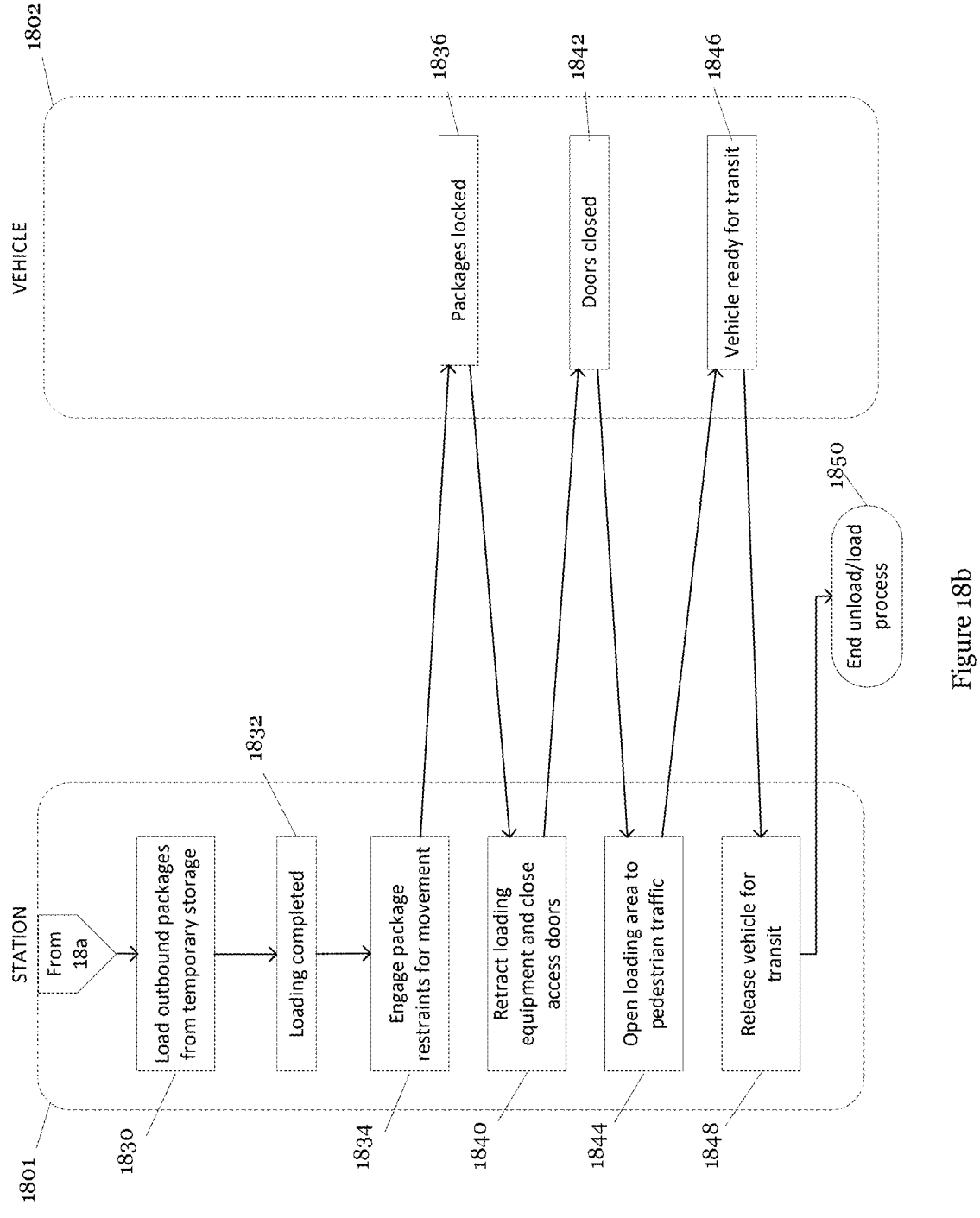

FIGS. 18*a* and 18*b* comprise a flowchart showing the communication between a TULIPS station and a vehicle during the unloading and loading process in accordance with an aspect and embodiment of the disclosure.

Figure 19:
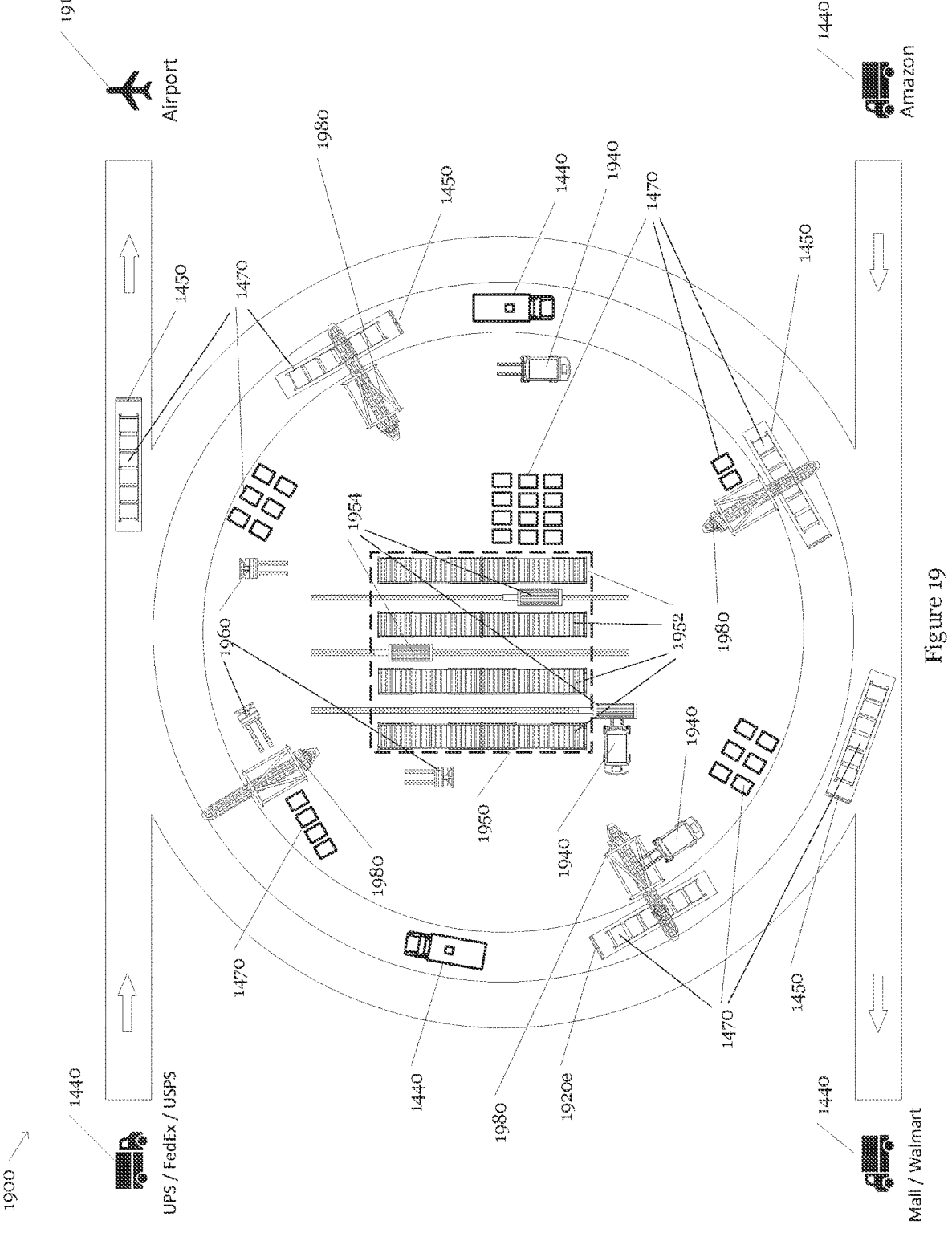

FIG. 19 shows an alternative embodiment for a TULIPS station optimized for interface between major delivery carriers, major retailers, air freight delivery carriers and transit vehicles to enable unloading and loading of packages/containers on the transit vehicles for delivery to other locations.

Figure 20:
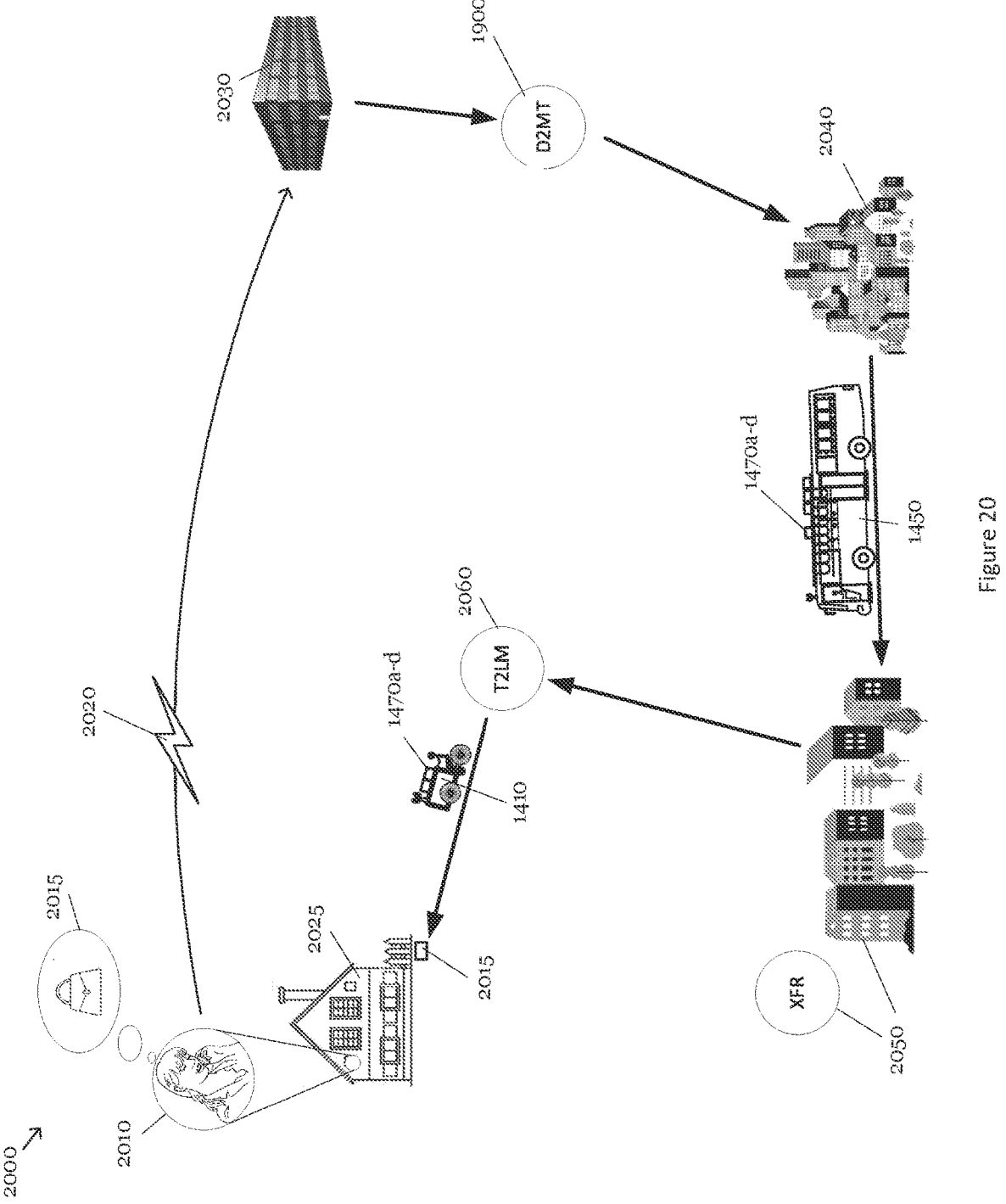
Figure 21:
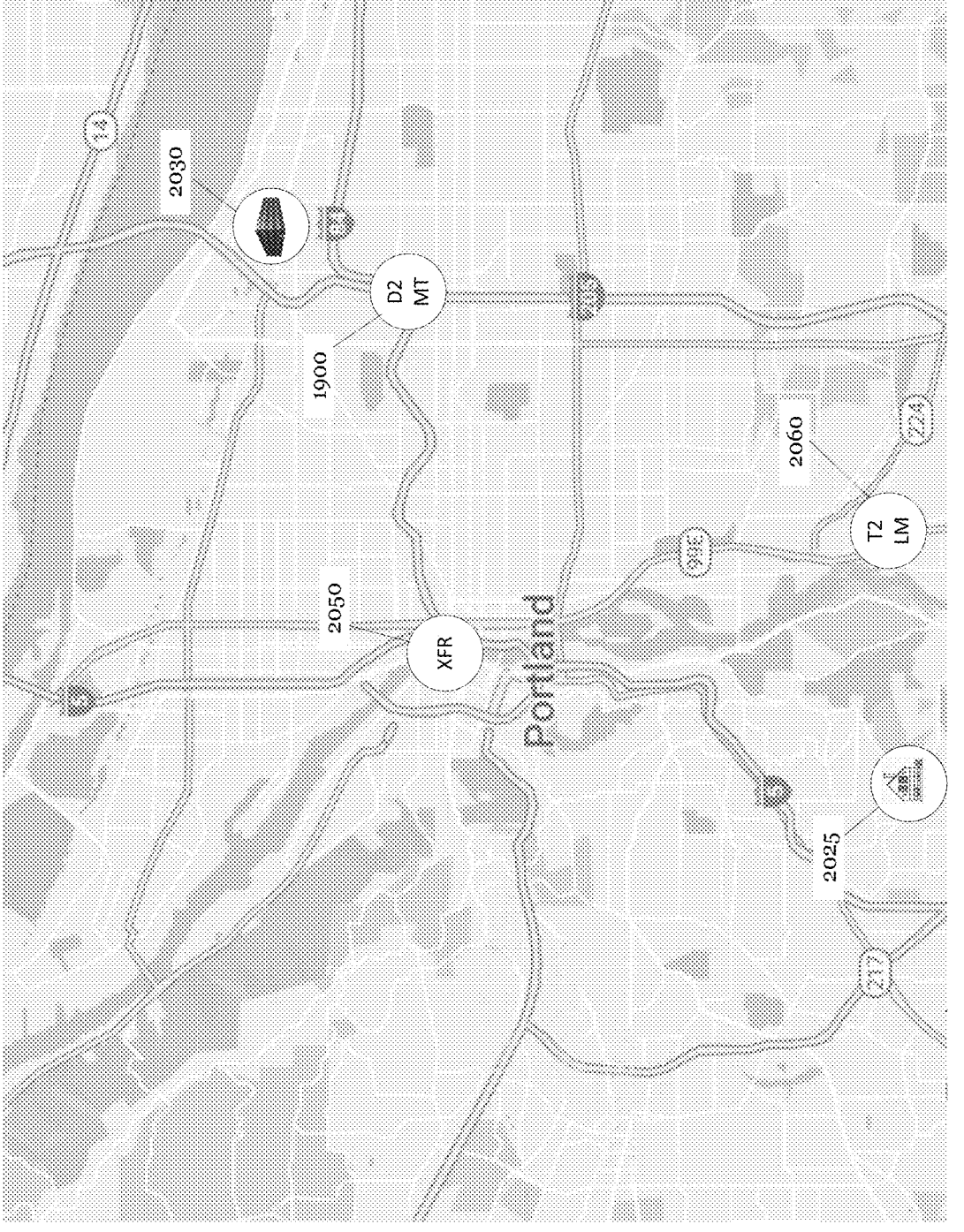
Figure 22:
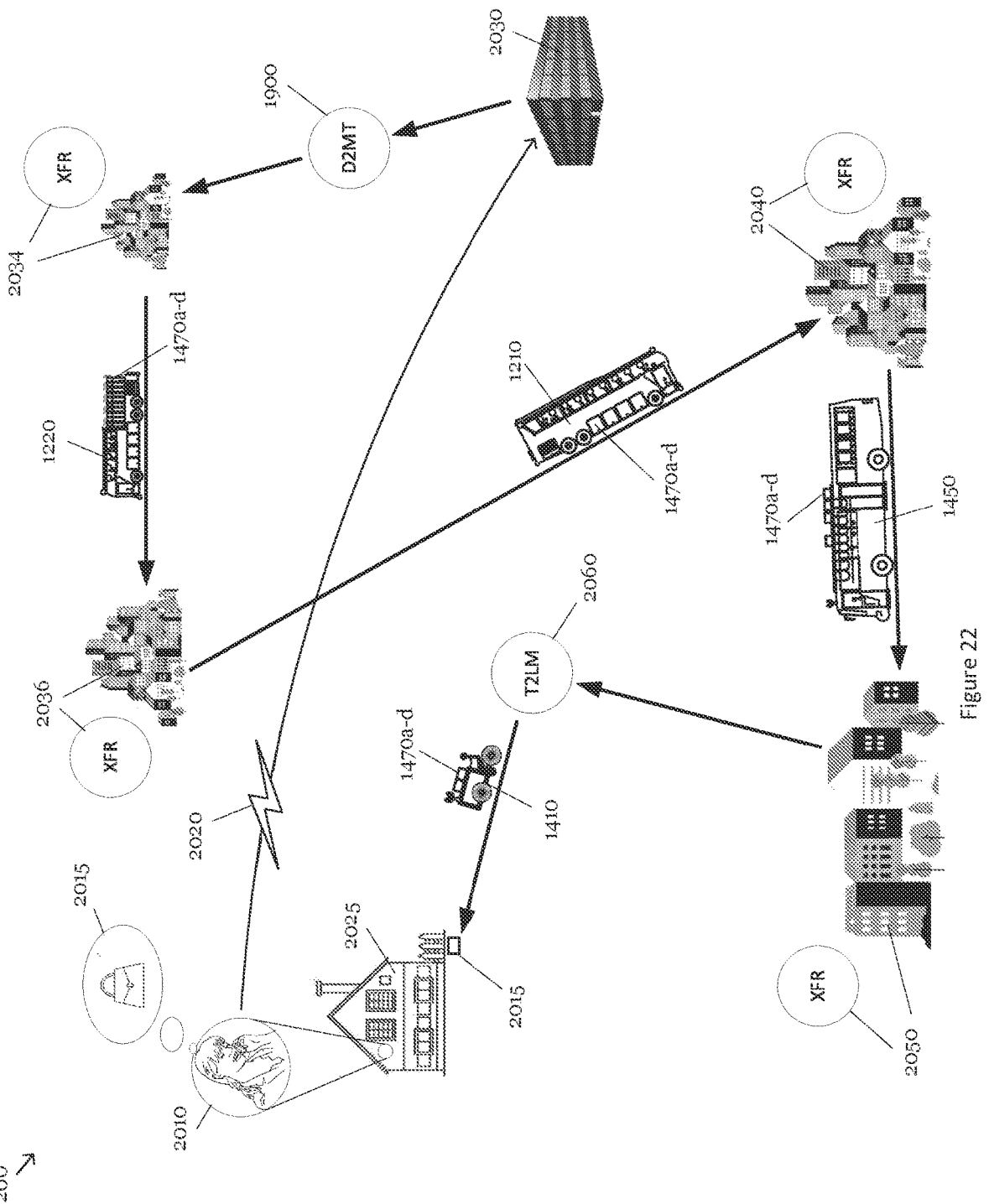
Figure 23:
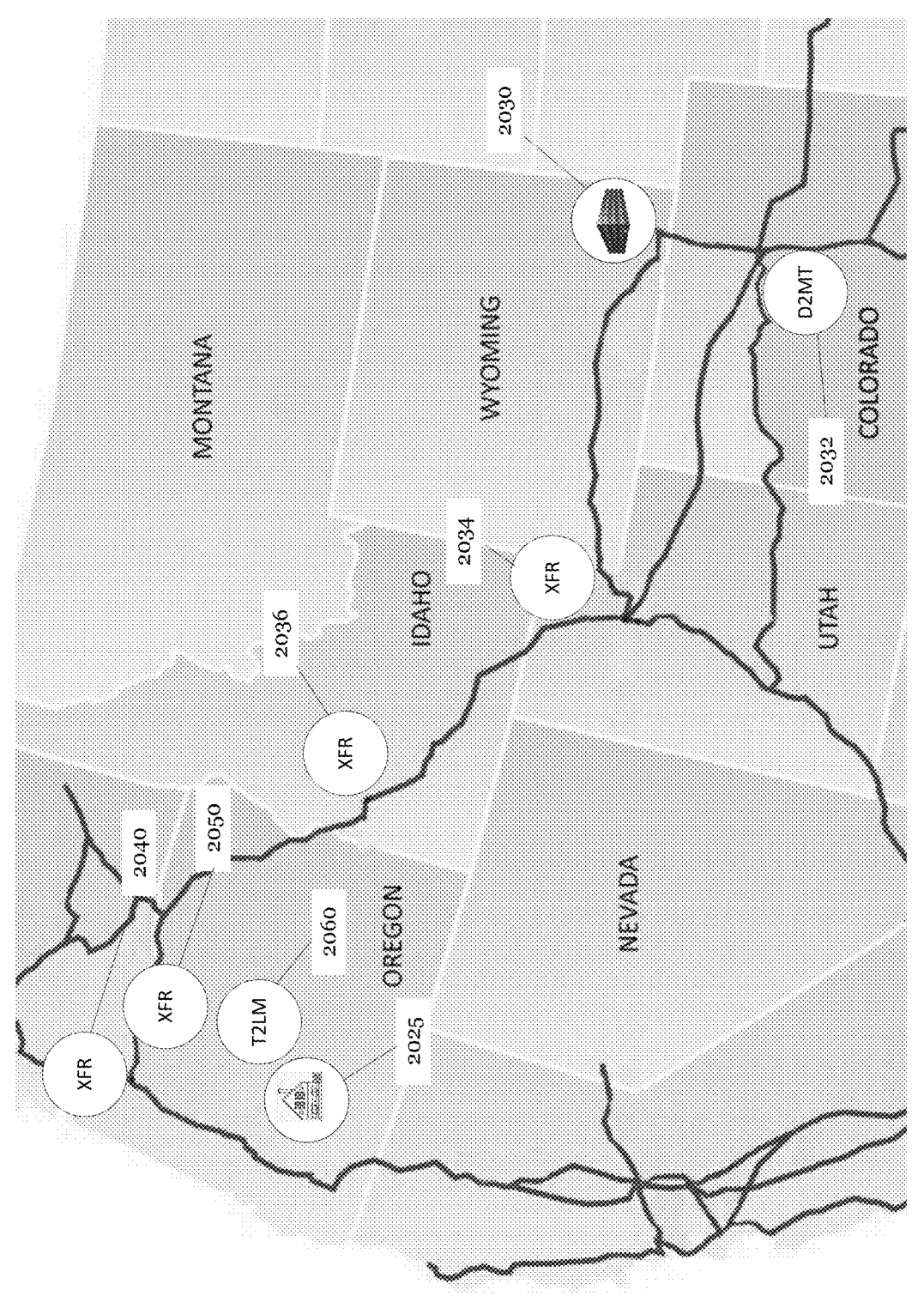

FIGS. 20 and 21 show a shorter-haul, more local, end-to-end product order and delivery diagram and material delivery enabled transit vehicle transit map, showing end-to-end delivery of materials from a fulfillment center, through a plurality TULIPS stations and transit legs, and using a last-mile delivery carrier to the materials to a final delivery destination, FIGS. 22 and 23 show a longer-haul, end-to-end product order and delivery diagram and material delivery enabled transit vehicle transit map, showing end-to-end delivery of materials from a more remote fulfillment center in another city or state, through a plurality TULIPS stations and transit legs, and using a last-mile delivery carrier to the materials to a final delivery destination.

DESCRIPTION OF EMBODIMENTS

Overview

The present disclosure contemplates an intermodal system and method that may increase the efficiency of both delivery and transit. As disclosed herein, the system and method may offer a sustainable and economical solution to many problems that may be faced in last-mile delivery. By using transit systems that are in place in many, if not most, urban areas, the disclosed systems and methods may be implemented at relatively low costs and may not require major changes to a city's existing infrastructure and operations. And, by using ultra-small electric vehicles integrated with transit, the disclosed systems and methods may improve the value of transit by offering significant opportunities for public-private partnerships between local governments, transit agencies, technology companies, courier companies, and other private companies in the business of delivery and transportation. In addition to potential economic benefits, the disclosed systems and methods may also offer a meaningful solution to the problem of certain communities that may experience low accessibility to important resources.

Various aspects of the present disclosure are described in Sections 1-5 below and illustrated in the associated drawings, using certain embodiments and examples intended to illustrate but not limit the disclosure. Nothing in the teachings is intended to imply that any particular feature or characteristic of these embodiments and examples is essential to the disclosure. The scope of protection is defined and limited only by the claims that follow this description, and not by any particular embodiment described herein. Additionally, certain aspects of the teachings may be described as a "first", a "second," a "third," and so forth. However, this numbering scheme is not intended to limit the disclosure to only the numbers described herein, nor to imply that any particular sequence of elements and/or steps is necessary to the disclosure.

I. General Features

This section describes general features of systems and methods for materials delivery, according to aspects of the present teachings. See FIG. 1.

Figure 1:
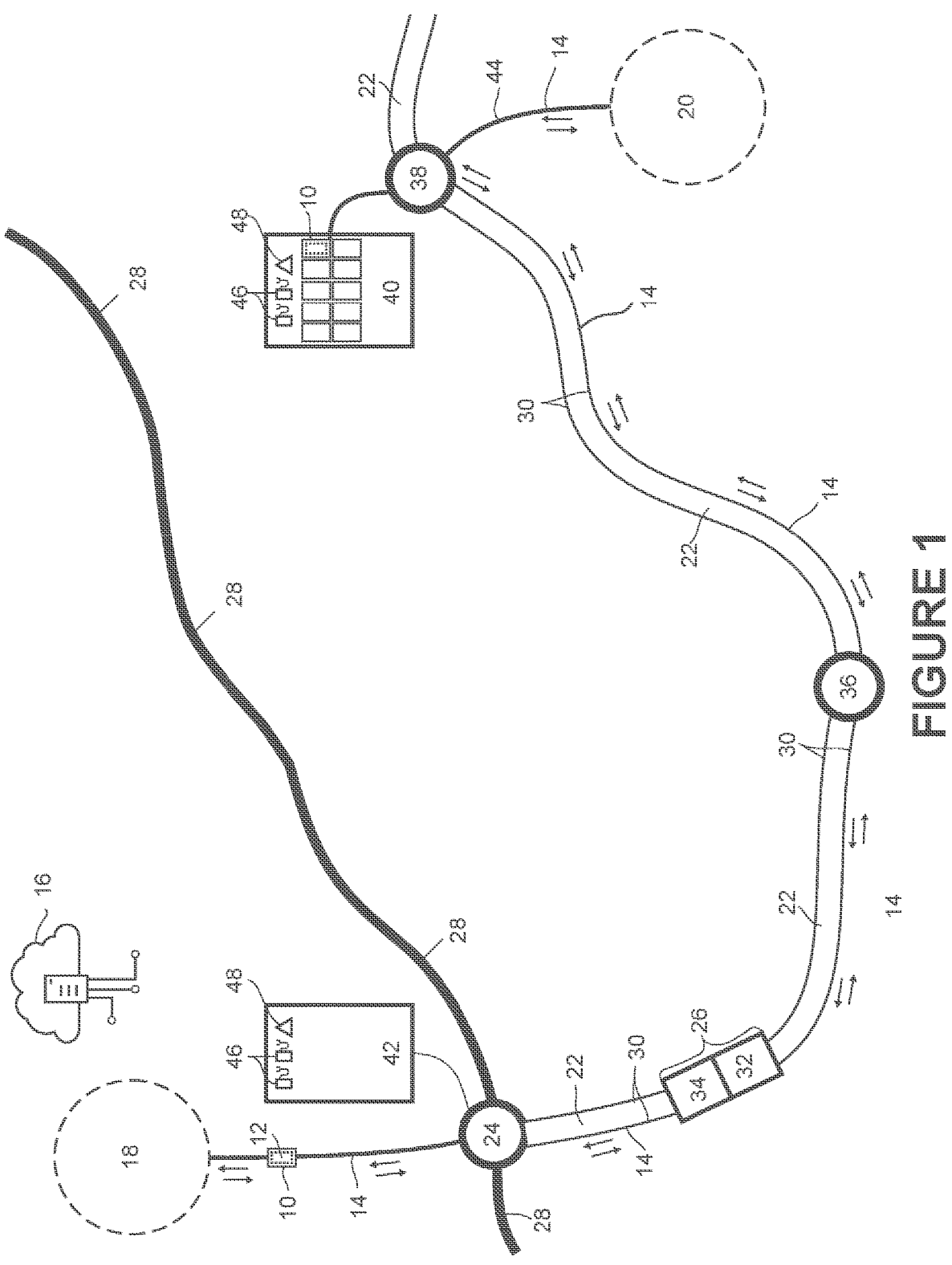
FIG. 1 shows an aerial view of an exemplary delivery path along which a substantially autonomous carrier may travel, according to aspects of the present teachings.

As shown in FIG. 1, a preferred embodiment of the disclosed delivery system may involve using at least one substantially autonomous carrier 10 to deliver at least one material 12 along a delivery path 14. Although only one delivery path is shown in FIG. 1, the carrier(s) 10 may follow any number of suitable delivery path(s), depending on the origin and trajectory of the material(s) 12. Additionally, in some embodiments, the carrier(s) 10 may travel bi-directionally along any number of delivery paths, as indicated by the arrow symbols pointing in opposite directions along the delivery path 14 in FIG. 1. In some embodiments, the carrier(s) 10 may communicate with a computer server 16, such as by receiving delivery data—including but not limited to a suitable delivery path—from the server 16. The carrier(s) 10 may also be in communication with a GPS satellite, which may help track the location and/or movement of the carrier(s) 10 near, along, and/or beyond the delivery path 14. Also in some embodiments, the movement of the carrier(s) 10 may be within geo-fenced areas encompassing the delivery path 14. Additionally or alternatively, the areas surrounding the delivery path 14 may also be geo-fenced.

In some embodiments, the server 16 may also be in communication with a cellular radio tower, which may enable a user to send and/or receive data pertaining to deliveries, such as by using a smart device application to arrange for delivery and/or pickup of the material(s) 12. The material(s) 12 may comprise one or more package(s), parcel(s), good(s), product(s), item(s), container(s), and/or another suitable article(s) to be delivered. For example, customers may order the material(s) 12 directly from a store, either as a one-time purchase or on a monthly subscription. Additionally or alternatively, the material(s) 12 may be a parcel that has arrived at the post office but has yet to embark on the last mile of delivery. In some embodiments, the carrier(s) 10 may deliver the material(s) directly to customers at their residential addresses. In alternative embodiments, the carrier(s) 10 may deliver the material(s) 12 to shops, office buildings, restaurants, or any other suitable commercial locations. In yet other embodiments, customers pay pick up the material(s) 12 directly from the carrier(s) 10, at any suitable pickup point along the delivery path 14.

In some embodiments, the material(s) 12 may begin their journey at an origin zone 18 and complete their journey when delivered to a destination zone 20. The origin zone 18 may include an airport, mall, post office, warehouse, store, supplier, distribution center, and/or any other facility suitable for sending out deliveries. For example, the origin zone 18 may include a local book store, and the material(s) 12 may include several parcels of books to be delivered directly to customers at their homes and/or offices. Alternatively or additionally, the origin zone 18 may include a post office, which may receive the material(s) 12 from around the globe. The post office may then dispatch the material(s) 12 within the carrier(s) 10 for delivery, as an alternative to, or in conjunction with, using load transporters such as but not limited to delivery trucks or cargo bikes to complete those deliveries.

In a preferred embodiment, the delivery path 14 may incorporate a transit line 22. As shown in FIG. 1, the origin zone 18 may be conveniently located near or on the transit line 22 so that the carrier(s) 10 may not need to travel a long distance from the origin zone 18 to a first transit link 24 located on the transit line 22. Likewise, the destination zone 20 may also be conveniently located near or on the transit line 22 so that the carrier may not need to travel a long distance from the transit line 22 to reach the destination zone 20. However, some embodiments may include destination zones having locations such that it may not be practical for the carrier(s) 10 to complete delivery. In such embodiments, it may be useful to transfer the material(s) 12 from the carrier(s) 10 and into another load transporter to complete delivery. Examples of load transporters may include, without limitation, cargo bikes, bicycle couriers, privately-owned cars, and/or any other suitable vehicle suitable for completing delivery of the material(s) 12.

In some embodiments, the origin zone 18 and the destination zone 20 may be interchangeable. Correspondingly, the carrier(s) 10 may travel bi-directionally along the delivery path 14, such that the carrier(s) 10 may travel away from the destination zone 20 and back toward to the origin zone 18 for any suitable purposes. For example, the carrier(s) 10 may return to "home base" at the origin zone 18 after completing a delivery. Or, certain customers may want to return the material(s) 12 to the origin zone 18 for a refund or exchange. Other customers may want to dispatch their own material(s) 12 along the delivery path 14, such that the presently disclosed systems and methods may be used for both sending and receiving materials. Thus, in some embodiments, the material(s) 12 may be picked up and/or dropped off at the origin zone 18 and/or the destination zone 20, depending on the direction of travel required for the material(s) 12 to be delivered.

Additionally, in some embodiments, large and/or small load transporters may be used near the origin zone 18 and/or the destination zone 20 to facilitate delivery of the material(s) 12. In some embodiments, it may be desirable to limit the movement of the carrier(s) 10 to areas near transit links—and to use load transporters to travel distances further away from transit links. In fact, delivery may be more efficient under such approaches where the carrier(s) 10 move at ultra-slow speeds within geo-fenced areas, leaving the longer-distance movement of materials to load transporters. For example, a load transporter located near the origin zone 18 may unload the material(s) 12 onto the carrier(s) 10, so that the carrier(s) 10 may travel toward the first transit link 24 to then unload the material(s) 12 onto a transit vehicle 26 therefrom. The transit vehicle 26 may then travel along the transit line 22 toward the destination zone 20. This journey is discussed in further detail below.

With respect to transit links, the transit link 24 may be any suitable location where a passenger and/or materials may board or alight from a transit vehicle. For example, the transit link 24 may be a stop, station, or connection for a bus, train, tram, light rail, ferry, subway, trolley car, paratransit, high speed rail, or any other suitable mode of transit. However, the transit link 24 may not necessarily be where commuters board and/or alight from transit vehicles. In some embodiments, the transit link 24 may also connect lines of different modes of transit, such as a first transit line 22 and a second transit line 28. In other words, the transit link 24 may be suitable for transit rider(s) and/or the carrier(s) 10 to not only board and/or alight from one transit vehicle, but also to make transfers or connections with additional transit vehicles. For example, the first transit line

22 may include a railway 30 and may be suitable for the transit vehicle 26, whereas a second transit line 28 may be a bus route suitable for city buses and/or paratransit services. In some embodiments, using a railway system may provide the greatest benefits in terms of cost savings and efficiency. Other embodiments may include any other suitable types of transit, including but not limited to train, tram, light rail, ferry, subway, trolley car, and/or high speed rail.

As shown in FIG. 1, the carrier(s) 10 may be loaded with the material(s) 12 and then be dispatched along the delivery path 14 toward the transit link 24. At the transit link 24, the carrier(s) 10 may navigate safely and autonomously within areas that may be shared with pedestrians, transit riders, and cyclists. Also at the transit link 24, the carrier(s) 10 may dock with the transit vehicle 26, either autonomously or with human assistance, to deposit material(s) 12 onto the transit vehicle 26. This may be considered to be a "transit leg" of delivery path 14. In other embodiments, the carrier(s) 10 may physically board the transit vehicle 26, be removably attached to the transit vehicle 26 (like a trailer, as an example), and/or engage directly with the railway 30 of the transit line 22 to take advantage of the low-friction and cost benefits of rail transport. Examples of such benefits may include significantly reduced "wear and tear" on the carrier(s) 10, less miles traveled by the carrier(s) 10, and less charging time necessary, due to piggybacking on transit vehicles. These benefits may in turn reduce maintenance costs, reduce downtime, and prolong the life expectancy of the carrier(s) 10. Other benefits may include reducing or eliminating any labor costs associated with delivery, particularly where the carrier(s) 10 may be fully autonomous and where customers may access their parcels directly therefrom.

Additionally, in some embodiments, the carrier(s) 10 may be dispatched on delivery runs during periods of low or "off-peak" transit ridership to optimize any underutilized space on the transit vehicle 26. For example, light rail ridership levels may be predictably lower during later times in the evenings and often on weekends, as compared with the times of day during which riders may typically be commuting to and from work, or while running errands. Embodiments that make use of this otherwise underutilized space may not only save costs, but also increase delivery volumes. However, alternative embodiments may include the use of transit vehicles beyond normal operating hours, such as by extending operating hours to specific carrier-only times during the middle of the night.

For example, the transit vehicle 26 may consist of a first railcar 32 and a second railcar 34. In some embodiments, the first railcar 32 may be used to transport one or more carriers and any material(s) 12 therein, while the second railcar 34 may be used to transport commuters. On a regular transit schedule, a single transit vehicle 26 may have the capacity to facilitate dozens of deliveries per hour or even hundreds of deliveries over several hours. In embodiments using both the railcars 32 and 34 for delivery, this capacity may be doubled. And, in embodiments using more than just one transit line 22, delivery volumes may be substantially multiplied at a fraction of the costs that may be incurred by traditional shipping methods. As such, the present disclosure contemplates a substantially or fully-automated system of delivery within or across principally urban environments, which may be implemented using existing infrastructures—without disrupting a city's everyday flow of transit, and without contributing to traffic congestion on roadways.

In some embodiments, the carrier(s) 10 may deliver the material(s) 12 along the entirety of the delivery path 14 to reach the destination zone 20. In alternative embodiments, however, customers could pick up their pre-ordered material(s) 12 directly from the carrier(s) 10 at any suitable pickup point along the transit line 22. For example, a customer may plan her commute home from the work by boarding the transit vehicle 26 at a second transit link 36, and may retrieve the material 12 directly from the carrier 10 during her commute. In such embodiments, customers may track the movement of the material(s) 12 along the delivery path 14 by using a smart phone application or any other suitable software. In other embodiments, the carrier 10 may alight from the transit vehicle 26 at a pickup point located at any transit link, so that a customer may retrieve the material 12 directly from the carrier 10 without necessarily having to board the transit vehicle 26. Conversely, a customer may drop off a material to be delivered by the carrier 10. In such embodiments, a customer may pre-arrange for material pick up or drop off, and input a unique carrier access code that allows the customer to insert and/or remove the material 12 from the carrier 10.

Enabling pickup and drop off at one or more transit links along delivery path 14 may effectively transform any such transit link into a mini commerce hub, such as a food cart area, a farmer's market, a mail center, an event space, a pop-up shop, or any combination thereof. The potential for such commerce hubs creates a multi-purpose role for transit agencies, and may potentially increase transit ridership. Additionally, these commerce hubs may create value for the public by providing communities with access to important resources such as nutritious and affordable foods. For example, certain communities may have zero or limited access to fresh fruit, vegetables, and other healthful whole foods due to a lack of grocery stores, farmer's markets, and other healthy food providers within one or more miles. As a result, members of such low-access communities may be forced to purchase sugary, heavily processed, and fat-laden foods from nearby convenience stores. However, the present disclosure may provide an affordable way for healthful foods to reach low-access communities near transit lines.

In some embodiments, the above-described transit leg of the delivery path 14 may be all that is required to complete delivery of the material(s) 12. However, the present teachings also provide a system and method for storing the material(s) 12 within the carrier(s) 10, which may be particularly useful for embodiments having extended delivery paths. Of course, the "modular" storage of materials within the carriers may be useful for delivery paths having any length. For example, the carrier(s) 10 traveling along the delivery path 14 may undock from the transit vehicle 26 at a third transit link 38. In some embodiments, the carrier(s) 10 may then head toward a storage hub 40 located near transit link 38 and substantially near and/or along the delivery path 14. Although the storage hub 40 is shown in FIG. 1 as being located nearer to the destination zone 20 than to the origin zone 18, storage hubs may be located anywhere along the delivery path 14—such as near the beginning, middle, or end of the delivery path 14. Additionally, the delivery path 14 may include any suitable number of storage hubs. Accordingly, FIG. 1 also shows an empty storage hub 42 located near the origin zone 18.

The storage hub(s) 40 may also be located at any suitable parking facility, such as a parking lot, parking structure, a "park and ride" area, and/or a substantially empty lot along a multi-use or bike path 44. In some embodiments, the multi-use and/or bike path may need to be widened to accommodate the storage hub(s) 40. However, some multi-use and/or bike paths may include sufficient right-of-way to where this may be accomplished without incurring substantial expenses. Accordingly, the storage hub(s) 40 may essentially create a portable warehouse anywhere that multiple carriers may be parked, without requiring additional construction or labor costs. However, parking facilities may be specially built and/or designated for carrier use. For example, as shown in FIG. 1, a plurality of carriers 10 may form the storage hub 40 by parking at a facility—such as a "park and ride" area—located near the transit link 38. In some embodiments, the storage hub 40 may have a particularly large footprint during nights and weekends when the "park and ride" area is typically underutilized. The carriers 10 may then collectively vacate the storage hub 40 during early mornings before commuters arrive. In such embodiments, the carriers 10 may optimize the underutilized space in a parking facility in a similar fashion to optimizing the underutilized space on transit vehicles.

Storage of the material(s) 12, the carrier(s) 10, and/or load transporters at the storage hub 40 may be particularly beneficial where the storage hub 40 is located near the destination zone 20. In some embodiments, the storage hub 40 may serve as a decentralized or local storage site for the material(s) 12 that have transported away from the origin zone 18 and toward the destination zone 20. Additionally, the storage hub 40 may serve as a portable warehouse for materials that may not necessarily be contained within carriers. For example, a carrier 10 may deposit a pallet of materials within the storage hub 40, and then leave the storage hub 40 to retrieve additional materials to deposit within the storage hub 40. In such embodiments, the storage hub 40 may or may not include overhead coverings and/or walls to protect the materials. In some embodiments, the materials may be enclosed in one or more containers for protection from theft, vandalism, and the natural elements. Additionally, in some embodiments, customers may be able to access the material(s) 12 directly from the containers. However, other embodiments may not require the use of containers, depending on the needs of the particular materials.

Additionally, it may be desirable for some embodiments to include an additional storage hub 42 located near the origin zone 18. In such embodiments, load transporters may deliver the material(s) 12 onto and/or into the carrier(s) 10 at the storage hub 42 during the "first mile" of delivery, so that the carrier(s) 10 may then deliver the material(s) 12 onto and/or into the transit vehicle 26 at the transit link 24. In the context of the present disclosure, the first mile may refer to movement of the material(s) 12 from any suitable materials-distributor (such as but not limited to a retailer) to a delivery service or other entity who may transport the material(s) 12 to their final destination. For example, a load transporter, traveling at any suitable speed, may transport the material(s) 12 to the first storage hub near the origin zone 18 during the first mile of delivery. A carrier 10 may then receive the material(s) 12 from the load transporter to thereby transport the material(s) 12 at the slow—and low-traffic areas closer to the transit link(s). In other words, the storage hubs may serve as an interface between carriers and load transporters. Load transfers between the transporters and carriers may be automated and/or human-assisted.

The storage hubs 40 and/or 42 may be also used for storing, swapping carrier batteries, and/or charging one or more carrier(s) 10 that may be used in the delivery process. Accordingly, the storage hubs 40 and/or 42 may include at least one carrier charging station 46 that the carrier(s) 10 and/or other electric vehicles may use to recharge their batteries. Other embodiments may include no charging stations, or only one charging station 46. In embodiments having charging stations, the carrier(s) 10 having lower battery levels may have higher charging priority than the carrier(s) 10 having higher battery levels. In fact, the carrier(s) 10 may form a queue at the charging stations 46. Any fully charged carrier(s) 10 may then move aside to allow other carrier(s) a turn at the charging stations 46. Additionally, or alternatively, embodiments may include a battery-swapping station 48 where a drained carrier battery may be exchanged with a fully (or partially) charged carrier battery. The swapping of batteries may be achieved autonomously and/or with human assistance.

In some embodiments, the organization and movement of the carrier(s) 10 may be accomplished by using the server 16, which may be centralized, to control the movement and configuration of the carrier(s) 10 within the storage hubs 40 and/or 42. For example, the server 16 may be configured to move the carriers 10 individually and/or collectively—such as by "rows" or "columns." This type of movement may enable the carriers 10 may be tightly packed within the storage hubs 40 and/or 42, without the need for aisle ways, and to save space. Aisle ways may be created, as needed, such as by moving rows and or columns of carriers. In other embodiments, however, the organization and movement of the carrier(s) may be accomplished using other suitable means, such as but not limited to using a computer to organize and move the carrier(s) 10 individually or as a group. While moving, the carriers 10 may use lights to signal at least a direction of movement. In some embodiments, the carriers 10 may also use lights to signal that the carriers 10 have registered that pedestrians are nearby—to ensure that pedestrians feel reasonably safe while sharing space with the carriers 10. Of course, the carriers 10 need not be stored in a rectangular configuration as pictured in FIG. 1. Rather, the carriers 10 may be configured in any suitable formation or combination of formations. In some embodiments, the carriers 10 may also be stored within the storage hubs 40 and/or 42 on multiple levels, such as in multilevel parking structures in which the carriers 10 may park.

Additionally, the server 16 may organize and move the carrier(s) 10 within the storage hubs 40 and/or 42 to promote security while providing customers, vendors, employees, and other authorized individuals with access to selected carriers 10 as needed. For example, carriers having higher-value materials contained therein may be packed in the center of a group of carriers—thereby making it more difficult for thieves and vandals to access those materials. To accomplish this, the server 16 may have access to data regarding the materials contained within each carrier. This data may include, without limitation, how valuable the materials may be and/or what time the materials must be delivered by. The server 16 may then enclose higher-value but lower-delivery-priority materials toward the center of a cluster of carriers 10 for optimal security. In some embodiments, the server 16 may have access to this data prior to the carriers 10 arriving at the storage hubs 40 and/or 42. Accordingly, the server 16 may determine pre-designated spots for each carrier 10 based on the value and priority of the material(s) 12 contained therein. Likewise, the network may have access to battery levels of the carriers 10 so that the network can determine pre-designated spots for the carriers along the charging station(s) 46. The carrier(s) 10 in communication with the network may then automatically park at their pre-designated spots within the storage hubs 40 and/or 42.

Additionally, in some embodiments, the carriers 10 having camera sensors may serve as automated security guards for the materials 12 stored therein—thereby reducing or eliminating security concerns and labor costs. The carriers 10 may accomplish this by keeping their environmental sensors active while the carriers 10 are parked within the storage hubs 40 and/or 42. To save battery life, these camera sensors may only turn on when the carriers 10 sense any suspicious movement and/or lingering of any entities near the carriers. By being in communication with the server 16, the carriers 10 may then provide alerts when theft and/or vandalism appear imminent. Furthermore, the carriers 10 may even serve to prevent theft and/or vandalism by turning on their lights and/or alarms—or even mobilize to trap the culprit—such as in situations where a thief has attempted to pry open a carrier and/or container containing the material(s) 12. And, by storing the material(s) 12 within the carrier(s) 10, the material(s) 12 may be insulated from theft and poor weather conditions without requiring the storage hubs 40 and/or 42 to include walls or overhead coverings. Other embodiments may, however, include security personnel, walls, and/or overhead coverings as needed—particularly where the carriers and/or containers may not fully enclose the materials contained within.

Although FIG. 1 shows only two storage hubs, other embodiments may include any number of storage hubs. Overall, the storage hubs 40 and/or 42 may make delivery more efficient by reducing reliance on large warehouses, and providing for convenient storage of materials along or near the delivery path 14. Additionally or alternatively, the storage hubs 40 and/or 42 may serve as a pickup point where customers may retrieve their materials directly from the carrier(s) 10 such as while commuting to and/or from work. And, in embodiments where the storage hubs 40 and/or 42 are located near commuter parking, there may be an added benefit of customers not having to manually carry their material(s) 12 long distances.

EXAMPLES, COMPONENTS, AND ALTERNATIVES

The following sections describe selected aspects of exemplary systems and methods for materials delivery. The examples in these sections are intended for illustration and are not intended to limit the entire scope of the present disclosure. Additionally, each section may include one or more distinct inventions, contextual information, functions, and/or steps.

2. Exemplary Methods

This section describes how exemplary systems and methods for materials delivery may be implemented, according to aspects of the present teachings. See FIGS. 2-3.

Figure 2:
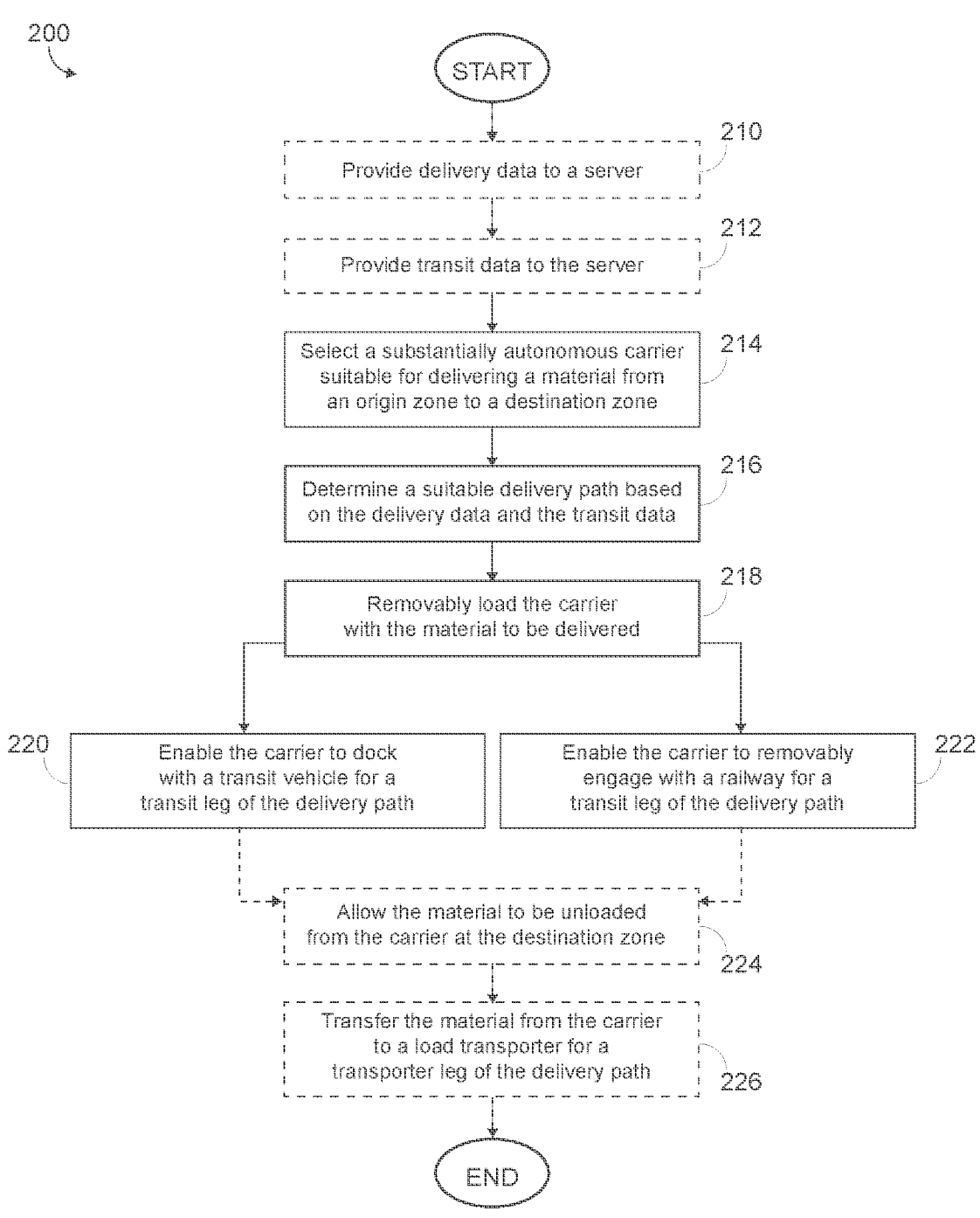
FIG. 2 shows a flowchart depicting the steps of an intermodal and at least partially automated method of delivering materials, according to aspects of the present teachings. Optional steps are shown in dotted lines.

FIG. 2 shows a flowchart depicting a broad overview of the steps that may be involved in implementing an exemplary method 200 of delivering materials, according to aspects of the present teachings. Although the following steps are described using the terms "first," "second," "third," and so on, the steps may be performed in any suitable order, and certain steps may be repeated as necessary and/or desired to carry out the present teachings. In some embodiments, a first step 210 of the method 200 may be providing delivery data to a server. A second step 212 of the method 200 may be providing transit data to the server. A third step 214 of the method 200 may then be selecting a substantially autonomous carrier suitable for delivery of a material from an origin zone to a destination zone. For embodiments including a transporter leg, a suitable load transporter may also be selected during this step. A fourth step 216 of the method 200 may be determining a suitable delivery path based on the delivery data and transit data provided to the server. A fifth step 218 of the method 200 may be removably loading the carrier with the material to be delivered.

Figure 3:
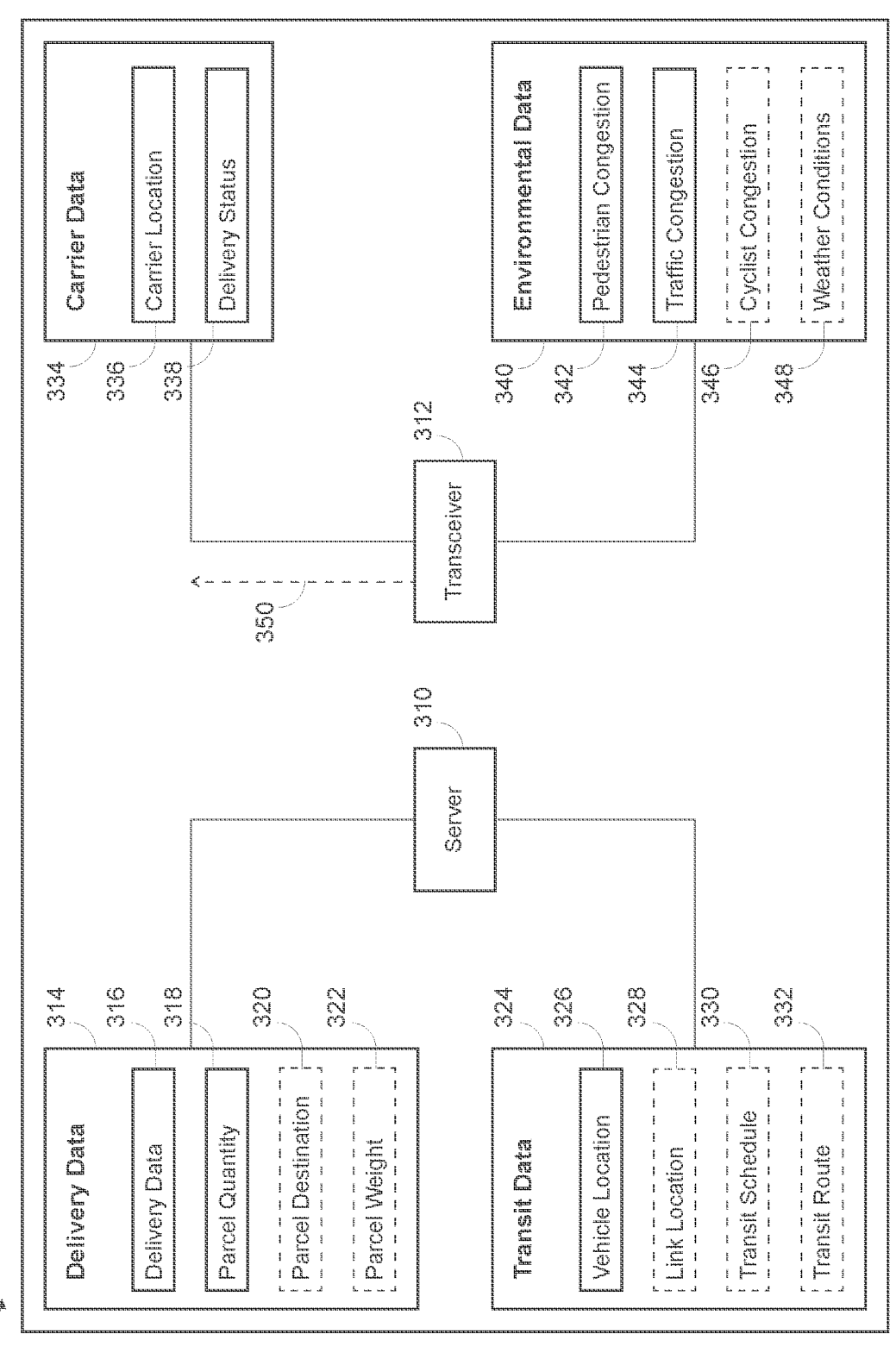
FIG. 3 shows a schematic depicting transfer of data within a network of FIG. 2, according to aspects of the present teachings.

Next, the method 200 may entail, alternatively, a sixth step 220 of enabling the carrier to dock with a transit vehicle for a transit leg of the delivery path. For example, the carrier may dock with the transit vehicle to deposit materials (or a container thereof) onto the transit vehicle and/or to board the transit vehicle. An alternative sixth step 222 of the method 200 may be enabling the carrier to removably engage with a railway for a transit leg of the delivery path. For example, the carrier may move along the railway independently of the transit vehicle and/or removably attach to the transit vehicle much like a trailer. A seventh step 224 of the method 200 may then be allowing the material to be unloaded from the carrier at the destination zone. In some embodiments, an optional eighth step 226 of the method 200 may be transferring the material from the carrier to a load transporter for an optional transporter leg of the delivery path. As noted above, certain steps may be repeated as desired. Therefore, the foregoing steps may describe a first leg of transportation, whereas a second or subsequent legs may continue after a transporter leg, wherein the process may begin again, for example beginning at step 218 described above. The dotted lines of FIG. 2 indicate optional steps. Additionally, the delivery method may include the use of more than one transit system across more than one city. The exemplary method of FIG. 2 is described in more detail below:

FIG. 3 shows a data network 300, indicating data that may be transferred when implementing the method 200 to deliver one or more parcel(s), according to aspects of the present disclosure. The network 300 may be continuous and cloud-based, and/or sporadic such as by using devices that communicate based on proximity to each other. In some embodiments, the network 300 may be configured by manually entering data into the network. As shown in FIG. 3, the network 300 may include a server 310 communicatively connected with a carrier transceiver 312 of the carrier. To implement step 210 of the method 200, a delivery service may provide delivery data 314 to the server 310 in the form of a delivery request. The delivery data 314 may include information about the delivery, such as but not limited to parcel identification data 316 (i.e., data sufficient to identify the parcel(s)), a parcel quantity 318 (i.e., how many parcels are to be delivered), a parcel destination 320 (i.e., a location to where the parcel(s) are to be delivered), and a parcel weight 322 (i.e., how much the parcel(s) weigh). Other data may include, without limitation, the number of cubic inches of a parcel, and a parcel delivery window. Depending on the details of the delivery request, some situations may require a load transporter to pair up with the carrier for the first—and/or last-mile portion of the delivery path.

Additionally, to implement step 212 of the method 200, a transit agency—or more than one transit agency—may provide transit data 324 to the server 310. The transit data 324 may include information about the transit system to be used during the transit leg of the delivery path, such as but not limited to a transit vehicle location 326 (i.e., where a suitable transit vehicle may be located), a transit link location 328 (i.e., where a suitable transit link may be located), a transit schedule 330 (i.e., when and where a suitable transit vehicle will be traveling), and a transit route 332 (i.e., which path a suitable transit vehicle will be traveling along). For example, the transit vehicle location 326 may be useful data such that a carrier may facilitate a rendezvous with the transit vehicle within seconds of its arrival at a transit link, to thereby minimize or eliminate dwell time at the transit link. Suitability of any particular transit vehicle may be determined based on whether there is adequate space on the transit vehicle to handle the delivery load, whether the transit infrastructure can handle the delivery request without delaying commuters, and other such logistical questions. In some embodiments, space on a transit vehicle may be reserved for parcels and/or carriers by using an interactive map, similar to how an airline passenger may select and reserve seats aboard an aircraft.

Further, to implement step 214 of the method 200, a computing device or, more specifically, a computer control system may select a suitable carrier for delivering the parcel(s) based on the delivery data 314 and/or the transit data 324. Suitability of any particular carrier may also be determined based on whether there are a sufficient number of carriers available to handle the delivery request, whether the carrier(s) are adequately charged to complete delivery, and similar logistical questions. Depending on the specificity of data provided, the computer control system may also be capable of prioritizing and otherwise organizing carrier dispatch based on unique delivery needs, including factors such as but not limited to which parcel(s) may require rush delivery and/or special handling, and/or which parcel(s) may require a load transporter to complete first—and/or last-mile delivery.

The computer control system may also select a suitable transit vehicle and/or load transporters based on a plurality of vehicle and/or load transporter values (similar to using a point system), including at least an economic value, an environmental value, and a public value. Exemplary economic values may include, without limitation: labor costs, speed of travel, costs per mile traveled, maintenance costs, infrastructure costs, capacity for delivering high volumes of materials, capacity for heavy loads of materials, and/or level of autonomy with respect to loading and unloading materials to and from the carrier. Exemplary environmental values may include, without limitation: clean energy use, fuel efficiency, ability to reduce traffic congestion, and/or promoting transit use. Exemplary public values may include, without limitation: low noise levels, safety due to low-speed movement, safety due to smaller size, level of bike-friendliness, level of pedestrian-friendliness, and level of damage to roadways.

In some embodiments, the key to fostering each value may be closely related to which type of transit vehicle is selected. For example, light rail vehicles may embody many of the above values and therefore be preferred for delivery. Specifically, light rail vehicles may use clean energy, enjoy low friction, include low floors that may enable easier carrier docking, and transit links may be located near origin zones (i.e., airports, malls, and other suitable dispatch centers). However, other vehicles may also exemplify these values, such as but not limited to shuttle buses, autonomous trucks, cargo bikes, rideshare vehicles, and/or pedicabs. Street cars, for example, have similar benefits to light rail vehicles— such as low friction. Certain buses may also have similar benefits—particularly buses using clean energy. Ultimately, the computer control system may select whichever vehicle(s) are best-suited for the particular delivery request. In some embodiments, the vehicle and/or load transporter values may be useful for generating environmental and/or economic reports that may be required by government agencies, investors, and so on.

In some embodiments, it may be useful to communicate certain responsive data to the delivery service and/or transit agency. For example, responsive data sent to the delivery service may include delivery information such as but not limited to a confirmation or denial of the delivery request, confirmation details, a time of dispatch, and/or an estimated time of delivery. And, data sent to the transit agency may include vehicle data such as but not limited to whether space has been reserved within a suitable transit vehicle, where a suitable transit vehicle may be located, and/or whether a suitable carrier has been dispatched on a delivery path. Furthermore, the carrier(s) may transmit the carrier data 334 to the server 310, including but not but not limited to a carrier location 336 (i.e., where the carrier is located) and a delivery status 336 (i.e., whether delivery is complete and/or if there are any delays). Based on the carrier data 334, a delivery service, transit agency, and/or a customer may track the progress of delivery. For example, delivery progress may also be communicated to a customer via a smart device application.

Based on the delivery data 314 and the transit data 324, a computer system may be able to compute a suitable delivery path in order to move the parcel(s) from the origin zone to the destination zone. In some embodiments, environmental data 340 may also be useful in computing the delivery path. Specifically, the carrier(s) may communicate the environmental data 340 to the server 310 to thereby re-compute the delivery path in real time and as necessary. The environmental data 340 may include information such as but not limited to pedestrian congestion 342, traffic congestion 344, cyclist congestion 346, and/or weather conditions 348. The carrier(s) may then use the environmental data 340 to safely navigate along the delivery path. For example, a predetermined delivery path may no longer be optimal due to unforeseen circumstances, such as a roadblock due to a car accident. In that situation, a carrier may be able to detect the traffic congestion and re-compute the delivery path to enable the carrier(s) to take an alternative route and thereby complete delivery on time. In such embodiments, the carrier may communicate the re-computed delivery path to the server in real time, to enable tracking of the carrier(s) and parcel(s) as within usual parameters.

In some embodiments, the computer system may also be involved in the continuous monitoring of the carrier(s) and parcel(s), such as but not limited to the purposes of averting vandalism, theft, and/or delay of movement. This may be accomplished by using the environmental sensors of the carrier(s) and/or by human assistance—such as where a human monitors the carrier(s) in real time, to ensure safety and on-time deliveries. For example, in some embodiments, the camera sensors of a carrier may generate images indicating to a monitor that the carrier may require repairs, repositioning, or other assistance. In that situation, the monitor may use the computer system to troubleshoot the carrier remotely, and/or dispatch a proper authority to apprehend a thief or vandal.

In some embodiments, the network 300 may include exchange of data between carrier(s) (in addition to the exchange of data between carrier(s) and the server). The exchange of data between transceivers of different carriers is indicated by the dotted line 350 in FIG. 3. Accordingly, carrier(s) may be able to assist each other where required. For example, a first carrier may be experiencing technical difficulties at a certain location along the delivery path, such as a low battery. The first carrier may then communicate its low-battery status to other networked carriers, for the purpose of obtaining assistance from a suitable second carrier. A suitable second carrier may be one that is close in proximity and has the capacity to, for example, receive a delivery load from the first carrier to thereby complete the first carrier's deliveries, tow the first carrier to a nearby storage hub for recharging, and/or otherwise assist the completion of delivery. In other words, the data network 300 may be used not only to organize deliveries, but also to ensure the safety and security of the carrier(s) and parcel(s) moving within the delivery system.

Additionally, as ecommerce grows, the expense and inefficiency of such transport may become increasingly frustrating to customers, who may expect same—or two-day delivery for their pre-ordered goods at low shipping prices. Likewise, customers may demand increased transparency while tracking the movement of their goods. Specifically, tracking codes that merely provide statuses every few days—such as when a parcel is sent out for delivery, when a parcel reaches a post office in a different state, and when a parcel is out for delivery—may no longer satisfy customers. Instead, customers may want to have full, real-time knowledge of where their parcels are located and when their parcels will arrive. Such knowledge is particularly useful for the delivery of a high-value parcel, which often requires a signature. Instead of having to wait at home for six (6) hours to be able to sign for a parcel, a customer may want to be able to track the exact location of their parcel using a smart phone application so she can go home and sign for the parcel as needed and during a specified pickup time.

Such smart phone applications may be similar to rideshare applications having digital maps that show exactly where a driver is located, in which direction(s) the driver is traveling, and an estimated time of arrival for the driver. Similarly, a delivery application may show exactly where a parcel is located, in which direction the parcel is traveling, and an estimated time of arrival of the parcel. Customers may also receive a text message or phone call when their parcel arrives at its final destination. In addition to allowing passengers to track their parcels, such smart phone applications may also enable customers to retrieve their parcels directly from the carriers in certain embodiments. For example, embodiments using a storage locker system for parcel retrieval may include a barcode scanner. A customer may then present a specific barcode to the scanner, thereby opening a compartment of the carrier and allowing the customer to retrieve her parcel from within. Once a parcel is retrieved, the application may mark the delivery as complete. When in communication with the overall delivery network, the transit agency and/or delivery service may also receive a notification that the delivery is complete.

Smart phone applications may also be useful for coordinating delivery across different modes of transit. While in some embodiments, a carrier may deliver a parcel along the entire delivery path to the destination zone, it may be desirable for other embodiments to include additional load transporters to facilitate—i.e., complete—last-mile delivery. In such embodiments, a delivery driver or bicycle courier may arrange, via the smart phone application, to receive a parcel or load of parcels from a carrier so that the delivery driver or bicycle courier may complete last-mile delivery. This may be similar to how drivers are able to pick up passengers via a rideshare application, in that an operator of a load transporter may receive notifications that certain parcels need to be delivered to certain locations. In some embodiments, the parcels may appear up on a digital map of the smart phone application. The operator may then go to a transit link to retrieve the parcels from the carrier and, once retrieved, the parcels may embark on a transporter leg of the delivery path.

3. Exemplary Carriers

This section describes more specific aspects of exemplary substantially autonomous carriers, according to aspects of the present teachings. See FIGS. 4-5.

Figure 4:
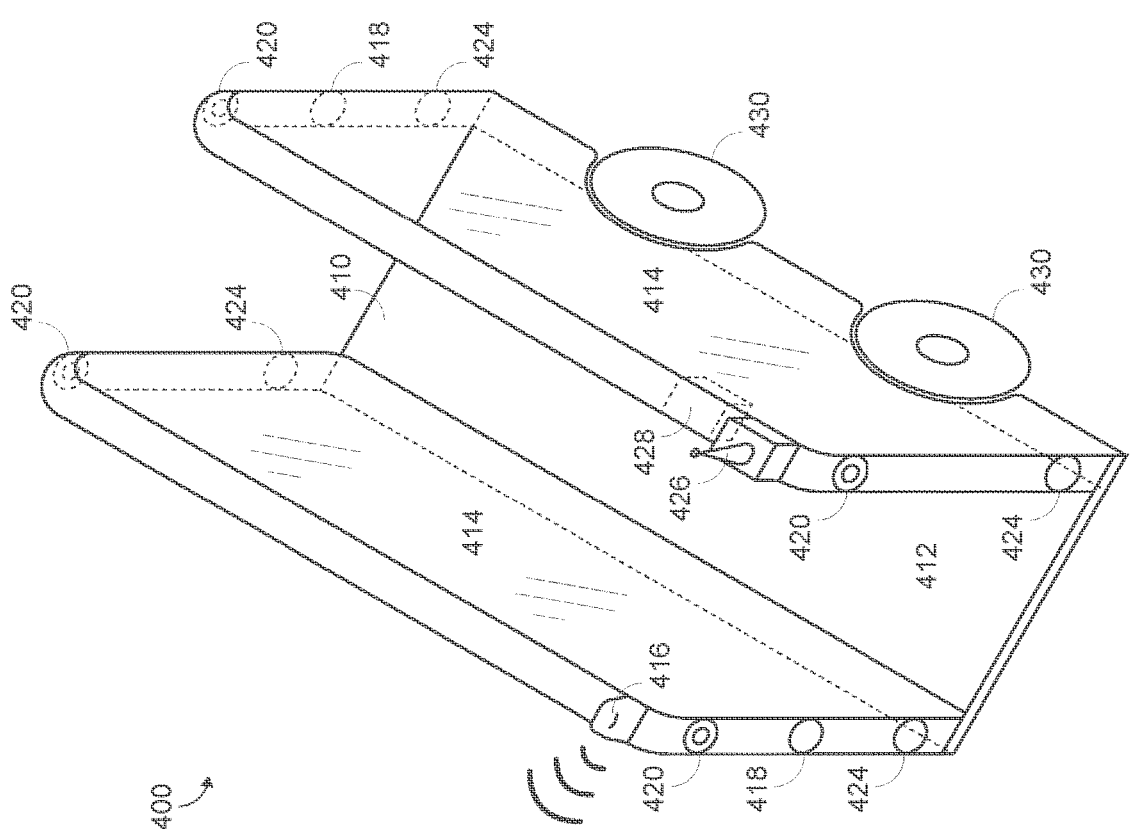
FIG. 4 shows a perspective view of the substantially autonomous carrier of FIG. 1, according to aspects of the present teachings.

FIG. 4 shows a perspective view of an empty, substantially autonomous parcel carrier 400 (corresponding to the carrier 10 of FIG. 1), according to aspects of the present teachings. The carrier 400 may be used to deliver at least one parcel (or container of parcels) from an origin zone to a destination zone, along a substantially pre-determined delivery path. In some embodiments, the carrier 400 may be similar to an autonomous mobile robot and/or other low-speed autonomous vehicles. The carrier 400 may be fully autonomous or only partially autonomous (in that it may require some human input). In some embodiments, the carrier 400 may be configured to travel at ultra-slow speeds, such as walking speeds or even slower, in order to maximize safety for pedestrians, and to minimize dwell time at transit links. Another benefit of low-speed carrier travel may be reduced costs compared to autonomous vehicles moving during peak daytime traffic, at freeway speeds, and in complex traffic situations. That is, the cost burden may be lower to create low-speed autonomous vehicles as opposed to high-speed autonomous vehicles. However, the carrier 400 may be capable of traveling at higher speeds in some embodiments. Yet another benefit of low-speed carrier travel may be a lesser need for research and development compared to that required by high-speed carriers.

Additionally, having a reduced size may enable the carrier 400 to have a small turning radius, such as by using wheel hub motors that allow for "o" turns. The carrier 400 may also be suitable for maneuvering narrow pathways and transit platforms, without substantially impeding the normal traffic in those areas. Higher levels of safety may be achieved by limiting movement of the carrier 400 to times of day when pedestrian, cyclist, and other such traffic is low. In some embodiments, movement of the carrier 400 may be separated from pedestrian movement such as by restricting the carrier 400 to specific carrier lanes (similar to clearly-marked and designated bicycle lanes along roadways).

Furthermore, the carrier 400 may be an ultra-small vehicle that may or may not accommodate driver(s) and/or passengers. In other words, the carrier 400 may be a driverless or robotic car. Such embodiments may be beneficial for maximizing the space capacity within a carrier body 410 of the carrier 400, such that it can contain a large number of parcel(s) and/or parcel(s) of large sizes. As shown in FIG. 1, the carrier 400 may be configured specifically for fitting as many materials as possible therein. More specifically, the carrier 400 may include a platform 412 and one or more sidewalls 414. Although the carrier 400 is not shown to be fully enclosed, other embodiments may include carriers with additional sidewalls, a roof, a door, and/or any other structures suitable for removably securing materials therein. Other embodiments may not include any sidewalls at all.

Additionally, the carrier 400 may include a plurality of environmental sensors, including but not limited to at least one LIDAR sensor 416, at least one RADAR sensor 418, and/or at least one camera sensor 420. The carrier 400 may use any single type or combination of sensors. These sensors may be suitable for detecting, anticipating, and/or recording potential impacts, theft, and vandalism to the carrier 400. The sensors may also be capable of mapping the environment around the carrier 400 so that the carrier 400 may stop and/or change course to avoid potential impacts. Accordingly, the sensors may be useful for ensuring the safety and security of the carrier 400 and the parcel(s) contained within.

The carrier 400 may also include a plurality of lights 424, which may be configured to indicate a direction of travel, a change in the direction of travel, and/or a deceleration of the carrier 400. The lights 424 may be useful for the safe navigation of pedestrians, cyclists, and other vehicles that may share roadways, multi-use paths, bike paths, transit platforms, and/or sidewalks with the carrier 400.

In some embodiments, the carrier 400 may also include a carrier transceiver 426 configured to communicatively connect with the server 310 of FIG. 3, receive the delivery data 314 and the transit data 324 from the server 310, and transmit the carrier data 334 to the server 310. Likewise, the transceiver 312 may be suitable for transmitting the environmental data 340 that the carrier may obtain from its sensors to the server 310. In some embodiments, the carrier transceiver 426 may be configured to share information with transit vehicles, such as but not limited to a position, speed, and/or direction of travel of the carrier 400. The sharing of information between the carrier 400 and a transit vehicle may be particularly useful for enabling the precise and removable docking of the carrier 400 with the transit vehicle, as well as to reduce carrier congestion at and near transit links.

The carrier 400 may also include a computing device or, more specifically, a navigation control 428 that is operatively connected to the transceiver 426. The navigation control 428 may in turn include a memory and a processor configured to receive at least the environmental data from the sensors of the carrier 400, compute the delivery path based on the delivery data 314, the transit data 324, and the environmental data 340. Similarly, the navigation control 428 may be configured to re-compute the delivery path in real time based on at least the environmental data 314, such as where traveling along the original delivery path may no longer be feasible and/or desirable. The navigation control 428 may also be configured to determine at least one safety parameter based on the environmental data 314, such as by slowing down the movement speed of the carrier 400 when pedestrians are nearby. In some embodiments, the carrier 400 may also be capable of conveying an audible signal to alert pedestrians of its position, such as but not limited to by beeping when moving in reverse. The carrier 400 may also include an audible and/or visible alarm system suitable for deterring vandalism and/or theft.

Additionally, although FIG. 4 shows the carrier 400 having at least two wheels 430, carriers according to the present disclosure may include any number of wheels suitable to enable stable movement of the carrier 400 along the delivery path. Accordingly, some embodiments may include three wheels, whereas other embodiments may include only one wheel. In embodiments having only one wheel, the wheel may encompass the entire carrier body such that the carrier may "roll" along the delivery path (see, e.g., the carrier of FIG. 6). In some embodiments, the carrier 400 may include omni wheels or mecanum wheels that enable the carrier 400 to make tight turns. Additionally, some embodiments may include at least one wheel configured to removably engage directly with a railway, thereby enabling the carrier to travel along the railway during a transit leg of the delivery path. Such embodiments may, for example, include metal wheels similar to those of a railway car and be suitable for reducing the amount of friction generated between the wheels of the carrier and the railway.

Figure 5:
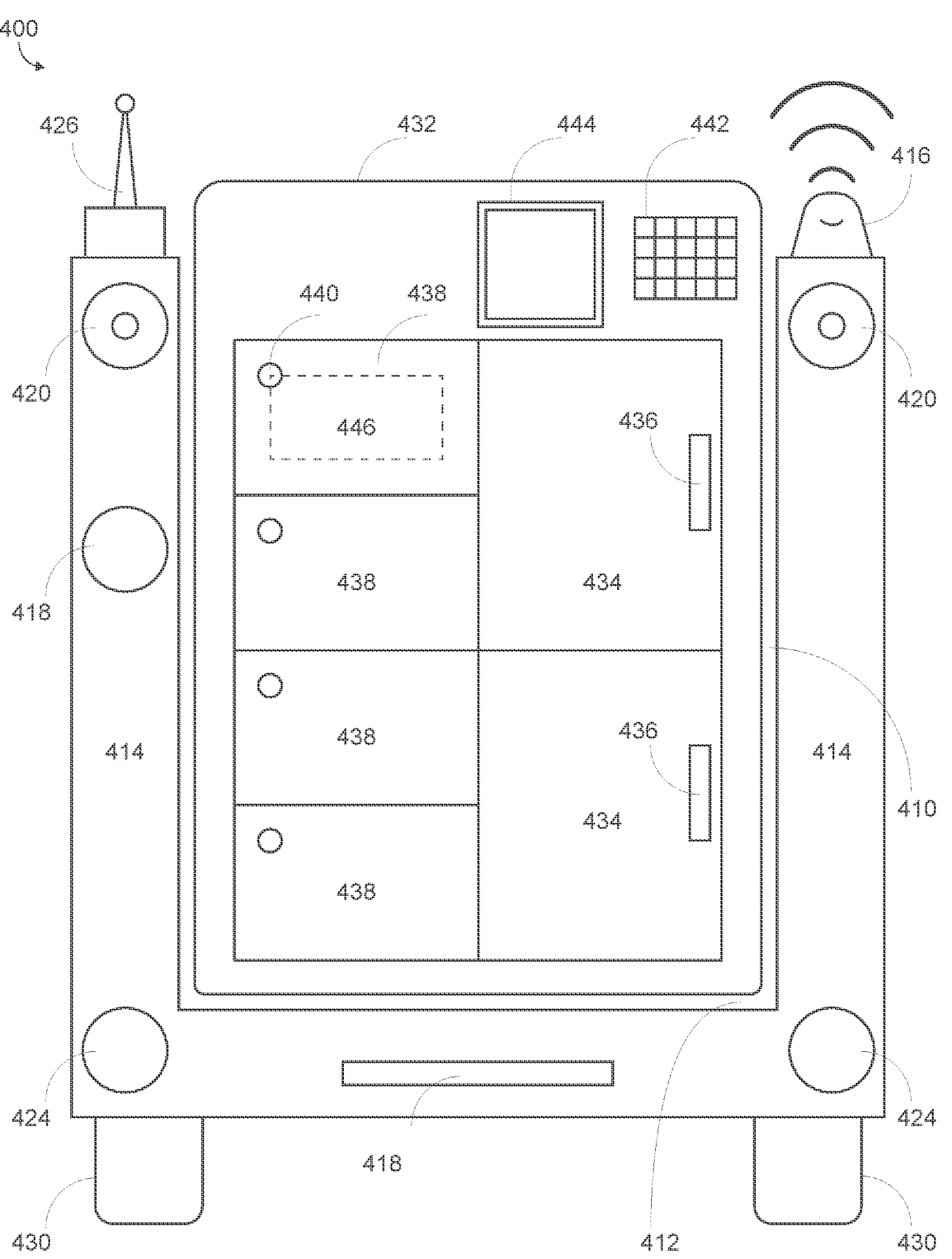
FIG. 5 shows a rear view of the substantially autonomous carrier of FIG. 4, according to aspects of the present teachings.

FIG. 5 shows a rear view of the same carrier 400 of FIG. 4, but including an exemplary storage container 432, according to aspects of the present teachings. As shown in FIG. 5, the storage container 432 may be configured to fit inside of the carrier body 410 and on top of the platform 412. In some embodiments, the storage container 432 may be built into the carrier 400: however, the storage container 432 may be removable from the carrier 400 in other embodiments. The storage container 432 may include one or more compartments 434, which may be openable using any suitable mechanism, such as but not limited to one or more handles 436. In some embodiments, the handle(s) 436 may not be necessary. Alternatives may include—without limitation—knobs, buttons, slots, and/or electronic releases that may not require any external structure. For example, as shown in FIG. 5, certain compartments 438 may include a keyhole 440 usable by delivery personnel. Additionally, or alternatively, a customer may access her parcel(s) directly from the carrier 400 similar to using a storage locker system. In such embodiments, the storage container 432 may also be referred to as a vending container.

For example, each compartment may contain any number of parcel(s) that may be delivered to a particular customer or to different customers. In some embodiments, one or more compartments 434 and/or 438 of the carrier 400 may be configured to enable removal of the parcel(s) upon providing suitable parcel access data to the carrier 400. It may be useful for each compartment 434 and/or 438 to contain only parcel(s) to be delivered to a specific customer who is authorized to open that compartment, to avoid the problem of customers removing the wrong parcel(s). The parcel access data may be in the form of an alphanumeric code and/or barcode that can be input via a keypad 442 or a scanning device 444. For example, the scanning device 444 may be suitable for reading a barcode and/or credit card associated with a particular parcel and/or compartment, so that the carrier 400 may open the correct compartment to allow access to that parcel. Alternatively, or additionally, the scanning device 444 may be configured for facial and/or fingerprint recognition.

For example, some embodiments of the carrier 400 may serve as a portable vending machine such that customers may remove any suitable goods—such as bike repair accessories, snacks, refreshments, or even fresh groceries—from the compartments 434 and/or 438 while commuting, on the go, at transit links, in parking facilities, along multi-use or bike paths, and/or wherever carrier 400 may be parked. In such embodiments, the compartments 434 and/or 438 may include menus and/or viewing windows so that customers may see which goods are available for purchase. Customers may then select their goods using the keypad 442 and/or a smart phone application, and thereby remove their goods after completing payment.

Although FIG. 5 shows a carrier 400 including a locker system, not all embodiments may include a locker system. For example, some embodiments may include only one compartment suitable for containing parcel(s). In these embodiments, the carrier may or may not be configured to allow customers to directly access their parcels. Other embodiments may include any number of compartments that may be directly accessible by customers, in conjunction with any number of compartments that may not be directly accessible to customers. Additionally, although FIG. 5 shows the carrier 400 having covered and closeable compartments 434 and 438, other embodiments may include open compartments, much like a flatbed—particularly where the parcel(s) may not be sensitive to the open elements and/or where security of the parcel(s) may not be of concern. Some embodiments may even include closed compartments for parcel(s) of higher value that may need to be secured, in addition to open compartments for parcel(s) of lower value that may be likely to be stolen. In some embodiments, parcel(s) may be palletized and then loaded into the carrier 400.

4. Exemplary Transit Vehicles

This section describes more specific aspects of exemplary transit vehicles, according to aspects of the present teachings. See FIGS. 6-7.

Figure 6:
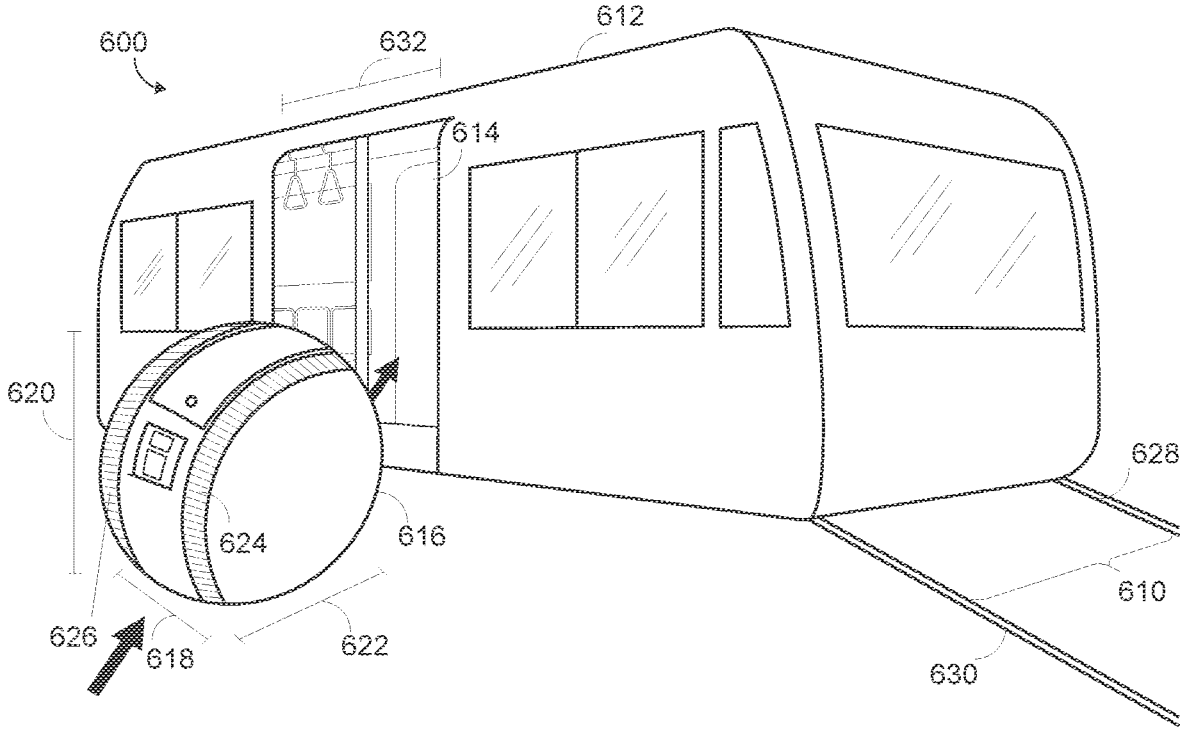
FIG. 6 shows a perspective view of a transit vehicle on a railway of FIG. 1, including a carrier capable of docking with the transit vehicle, according to aspects of the present teachings.

FIG. 6 shows a perspective and partial view of a transit vehicle 600 on a railway 610 like that of railway 30 of FIG. 1, according to aspects of the present teachings. As shown in FIG. 6, the transit vehicle 600 may include at least one railcar 612. In some embodiments, the transit vehicle 600 may include two or more railcars, however. The transit vehicle 600 may also include an opening 614 that may open and close to allow passengers to board and alight from the transit vehicle 600. However, the opening 614 may—in other embodiments—be specifically designated to allow a carrier 616 to enter and exit the transit vehicle 600 and may not be suitable for passenger use. As shown in FIG. 6, the carrier 616 may have any form suitable for containing materials therein and for removably docking with transit vehicles, and therefore may not necessarily be shaped like a traditional car.

Additionally, in some embodiments, the carrier 616 may be configured to removably dock with the transit vehicle 600, at the opening 614, to deposit materials therein. For example, the carrier 616 may include a lifting member configured to elevate the carrier 616 to a suitable level to dock with the opening 614 of the transit vehicle 600 (or with other delivery vehicles). The lifting member may also be configured to elevate the carrier 616 so that the materials may be tilted (i.e., deposited) into the transit vehicle 600. In such embodiments, it may only be necessary for the materials (and not carriers) to travel along a transit route on their way to the destination zone. However, in other embodiments, it may be useful for the carrier 616 itself to travel along the transit line. For example, the carrier 616 may include at least one wheel configured to removably engage with the railway 610 directly. More specifically, the carrier 616 may include a first wheel 624 and a second wheel 626 suitable for travel along roadways, on transit platforms, and/or upon railways. Thus, the carrier 616 may "roll" onto the railway 610 such that the first wheel 624 removably engages with a first rail 628 of the railway 610, and such that the second wheel 626 removably engages with a second rail 630 of the railway 610.

In other embodiments, the carrier 616 may not travel directly upon the railway 610 during the transit leg of its delivery path. Rather, the carrier 616 may travel within the transit vehicle 600 during the transit leg. For example, as shown in FIG. 6, the carrier 616 may include a carrier body having a width 618, a height 620, and a length 622 suitable to clear the opening 614 of the transit vehicle 600 so that the carrier 616 may board the transit vehicle 600 while the transit vehicle 600 is stopped or otherwise idle at a transit link. In such embodiments, the carrier 616 may be equipped with sufficient environmental sensors and a means of carrier-to-vehicle communication to thereby enable precise docking with the transit vehicle 600. For example, the opening 614 of the transit vehicle 600 may have a width 632 of 48 inches. Accordingly, the width 618 of the carrier 616 may be less than 48 inches. Precise docking of the carrier 616 with the transit vehicle 600 may prevent damage to the opening 614 and may obviate any need for a transit or delivery worker to facilitate the docking and/or depositing process. After docking, the carrier 616 may be configured to convey materials away from the opening 614 and along the length the railcar 612, to optimize space usage inside the transit vehicle 600.

Figure 7:
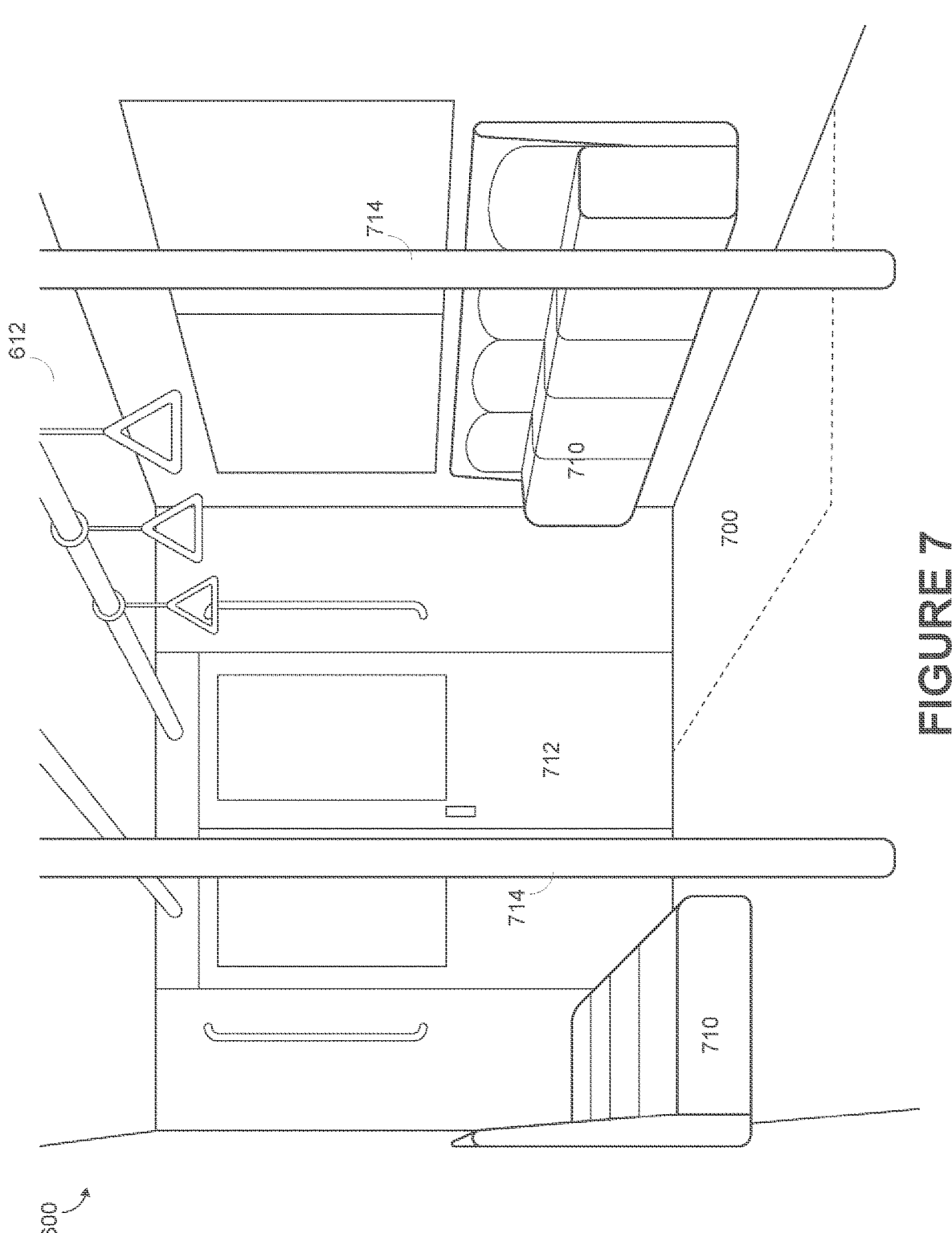
FIG. 7 shows an interior view of the transit vehicle of FIG. 6, according to aspects of the present teachings.

FIG. 7 shows an interior view of the railcar 612 of the transit vehicle 600 of FIG. 6, according to aspects of the present teachings. For embodiments in which the carrier 616 is configured to be positionable inside the transit vehicle 600, the transit vehicle 600 may have at least one designated area 700 suitable for the carrier 616 to be positioned. Additionally, the designated area 700 may be marked with a line so that any passengers sharing the railcar 612 with the carrier 616 may know to vacate the area when the carrier 616 boards the railcar 612. In some embodiments, lighting and audio may also be useful for indicating the designated area 700 to passengers. Although FIG. 7 shows only one desig-nated area 700, embodiments may include any number of designated areas suitable for the carrier 616 to be positioned while traveling within the transit vehicle 600. Additionally, the carrier 616 may be mobile within the transit vehicle 600. In other words, a position of the carrier 616 may not be limited to the designated area 700.

In some embodiments, the transit vehicle 600 may include foldaway seats 710 that are configured to fold up to thereby make room for the carrier 616 within the designated area 700. In embodiments wherein the carrier 616 may be in wireless communication with the transit vehicle 600, the foldaway seats 710 may automatically fold up when the carrier 616 is in close proximity. In other embodiments, the carrier 616 may include a means to push the foldaway seats 710 up when positioning itself in place within the designated area 700. In yet other embodiments, a transit worker may manually move foldaway seats 710 to their stowed position. In some situations, it may be desirable for the carrier 616 to vacate the railcar 612 through an internal door 712, and occupy a second railcar of the transit vehicle 600. Such situations may arise where the transit vehicle 600 may need to accommodate additional carriers, and the carrier 616 moves further along the full length of the transit vehicle 600 to thereby make space for the additional carriers. Another situation may be where the carrier 616 vacates the desig-nated area 700 to make space for a passenger having a wheelchair or a stroller. However, in some embodiments, one railcar of the transit vehicle 600 may be entirely designated for the carrier 616 whereas another railcar of the transit vehicle 600 may be entirely designated for passen-gers.

Additionally, the transit vehicle 600 may include at least one stanchion 714 that may typically be used for passengers to hold onto while riding the transit vehicle 600. Like the foldaway seats 710, the stanchion 714 may—in some embodiments—be configured to fold up or otherwise be stowed away to make space for the carrier 616 within the transit vehicle 600. In some embodiments, the carrier 616 may be securable to the stanchion 714. For example, the carrier 616 may include a support member extending from the carrier body and suitable for engaging the stanchion 714 automatically. Alternatively, the carrier 616 may be manu-ally secured to the stanchion 714 via any suitable means, such as but not limited to by "tying" the carrier 616 to the stanchion 714 using a strap, lock, or other securing device. However, the carrier 616 may be securely positionable inside the transit vehicle 600 by any other suitable means. For example, the carrier 616 may include a parking brake or similar device configured to keep the carrier 616 in a stable position within the transit vehicle 600. Any such securing device may be disengaged when the carrier 616 is to move along and/or off the transit vehicle 600.

5. Exemplary Last Miles

This section describes more specific aspects of last-mile delivery, according to aspects of the present teachings. See FIGS. 8-9.

In the context of delivery, the term "last mile" may be used to describe the challenges in delivering materials from transportation hubs (such as but not limited to transit links, railway stations, bus depots, ferry slips, and the like) to their final destinations. Although colloquially described as the last mile, the last leg of delivery may span less than one (1) mile, more than two (2) miles, or even fifty (50) miles. Challenges of last-mile delivery may include, without limitation: cost, efficiency, and transparency. In terms of cost, last-mile delivery may account for up to approximately forty percent (40%) of delivery costs—and these costs may typically be passed down to the customer. These high costs may be caused by the complexity of urban logistics, such as where highly congested cities may restrict truck access, off-hour delivery times, pollution, and noise levels. In addition to densely populated areas, last-mile delivery may also be challenging when the final destinations are in lower-density areas (such as but not limited to the outer edges of cities and/or rural or suburban areas), which may not be located near a transportation hub. As such, it may be expensive and inefficient for delivery trucks (e.g., transportation and main-tenance costs) and workers (e.g., labor costs) to make long journeys to sparsely populated areas. Instead, it may be useful for a load transporter to complete last-mile delivery.

Figure 8:
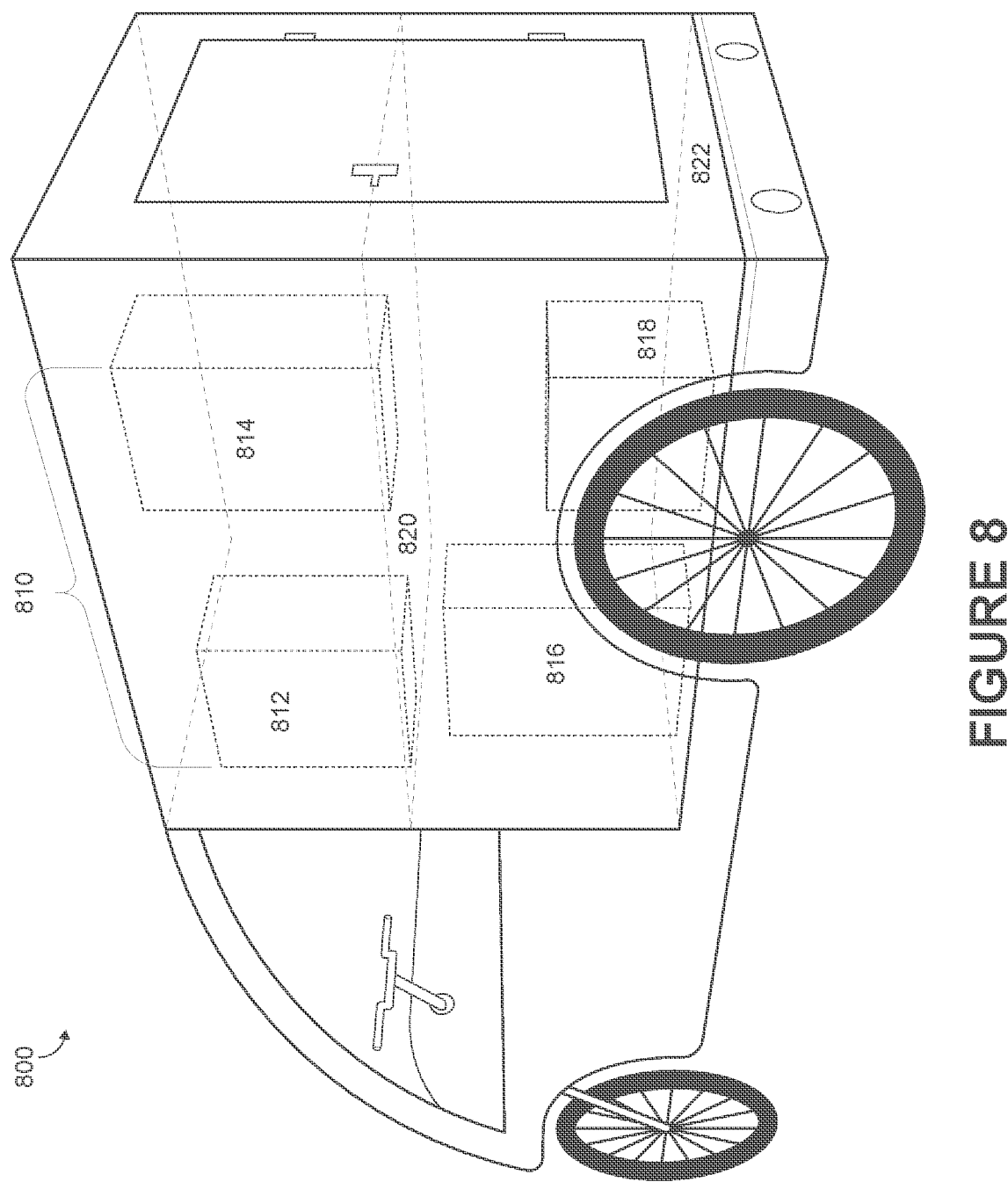
FIG. 8 shows a perspective side view of a load transporter, according to aspects of the present teachings.

FIG. 8 shows a perspective side view of an exemplary small load transporter 800, according to aspects of the present teachings. In some embodiments, it may be more cost-effective and efficient for a small load transporter 800 to complete delivery of a parcel load 810—rather than having a large load transporter complete delivery. That is, carriers and small load transporters may be particularly well-suited for short-range delivery. However, carriers may be limited to geo-fenced and/or slow-traffic areas, and cargo bikes may be limited by factors such as speed, battery life, and human exhaustion. Thus, large load transporters such as delivery trucks may be better suited for longer-range deliv-ery. The load 810 may include a plurality of parcels, such as a first parcel 812, a second parcel 814, a third parcel 816, and a fourth parcel 818. As shown in FIG. 8, the parcels 812 and 814 may be placed upon a first platform 820, and the parcels 816 and 818 may be placed upon a second platform 822. However, other embodiments may be configured in any suitable manner to enable any suitable number of parcels to fit inside of the load transporter 800.

The parcels 810 may be destined for the same or different location(s) within the destination zone. In some embodi-ments, the destination zone for the load 810 may be less than one (1) mile from the transit link, in which case it may be practical for the load transporter 800 to deliver the load 810 to the destination zone, thereby freeing the carrier to con-tinue along the transit line and pick up additional parcels for delivery. Additionally, it may be desirable for the load transporter 800 to circumvent delivery restrictions and/or traffic congestion in an urban environment, such as by utilizing bike lanes, multi-use paths, and/or bike paths to move through traffic more quickly. For example, the load transporter 800 may serve the same one-mile radius between a transit link and a destination zone by picking up the parcel load 810 from a carrier at the transit link, delivering the load 810 to the destination zone, and returning to the transit link to pick up another load for delivery. (Likewise, the load transporter may serve an area between a storage hub and a destination zone.) Using the load transporter 800 to complete last-mile delivery—as opposed to using carriers and/or delivery trucks—may therefore reduce traffic congestion, reduce CO2 gas emissions, reduce noise, reduce "wear and tear" on roadways, create "green collar" jobs, and offer partnership opportunities between transit agencies, private businesses, and even independent couriers seeking to earn extra income by making deliveries in their very own neighborhoods.

Although the load transporter 800 is shown as a cargo bike, any suitable load transporter may be used, including but not limited to a pedicab, a trike, a bicycle with a flatbed, a regular bicycle, and/or even an automobile such as a private car or truck. These load transporters may be configured to transport parcels or other materials during any portion of the delivery path, not limited to only the last mile and/or areas near the destination zone 20. In the case of a private car, a rideshare driver may serve as an independent contractor for one or more rideshare companies, and also ferry parcels between transit links and destination zones (and/or origin zones) as a way to earn extra income and minimize downtime between jobs. Similarly, a bicycle courier may ferry parcels between transit links and destination zones (and/or origin zones) to earn extra income and minimize downtime between dispatches. Larger vehicles, such as delivery vans and/or trucks may also be suitable for facilitating first—and or last-mile delivery, particularly in situations involving extreme weather conditions and/or longer distances between transit links and destination zones.

Figure 9:
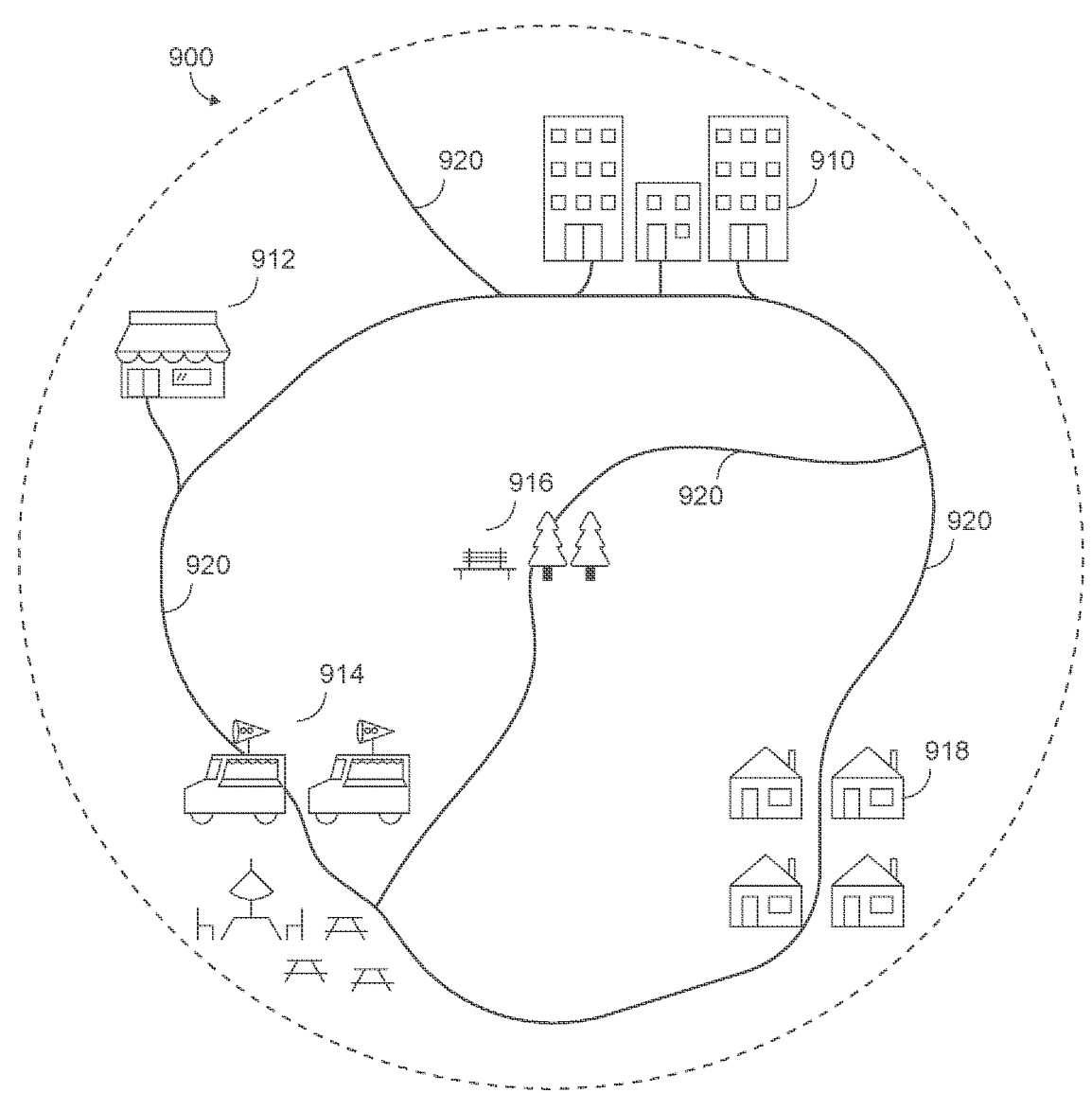
FIG. 9 shows a more detailed view of a destination zone of FIG. 1, according to aspects of the present teachings.

FIG. 9 shows a more detailed view of a destination zone 900 (corresponding to the destination zone 20 of FIG. 1), according to aspects of the present teachings. The destination zone 900 may include multiple final destinations, such as but not limited to an office center 910, a convenience store 912, a food truck area 914, a park 916, and/or a residential area 9) 18. In some embodiments, these final destinations may be connected by a multi-use and/or bike path 920. Additionally, or alternatively, the final destinations may be connected by one or more roadway(s), sidewalk(s), and/or any other suitable path(s) on which a load transporter or carrier may travel. For example, a load transporter or carrier may enter the destination zone 900 via the bike path 920, deliver the parcel 812 to the office center 910, and then continue along the bike path 920 to deliver the parcel 814 to the residential area 918, the parcel 816 to the food truck area 914, and the parcel 818 to the convenience store 912. In some embodiments, the destination zone 900 may also serve as an "origin" zone. For example, a lawyer who works at the office center 910 may send legal documents away from the "destination" zone 900 and toward another location along the delivery path. Alternatively, or additionally, an artist who works from home at the residential area 918 may ship fine art prints to her fans away from the "destination" zone 900, toward a post office along or near the delivery path, from where the prints may be shipped worldwide.

Alternatively, a load transporter or a carrier may convey the load 810 to the park 916, such as where the load 810 may include picnic supplies that were ordered by picnickers in the park. If conveyed by a carrier having a locker system, the carrier may effectively turn the park 916 into a mini commerce center, and may include a farmer's market, a mail center, an event space, a pop-up shop, or any combination thereof. In other embodiments, a load transporter or a carrier may deliver the load 810 to the convenience store 912. Particularly where the destination zone 900 may be a "food desert," it may be useful for the load 810 to include fresh, affordable, and nutritious foods that the convenience store 912 may otherwise not have in stock. Accordingly, the load transporter or carrier may serve as a portable vending machine, a portable grocery store, or simply a means of delivering parcels to customers at their homes or offices. Additionally, as described in further detail above, a carrier may also serve as a portable warehouse, such as where a plurality of carriers may form a storage hub to secure goods while not in active transport.

The different embodiments of the systems and methods for the intermodal delivery of materials via at least substantially autonomous carriers and transit vehicles described herein may provide several advantages over previous autonomous delivery systems and methods. For example, the illustrative embodiments described herein allow for carriers capable of docking directly with transit vehicles to make deliveries while traveling along existing transit lines, thereby reducing the amount of "wear and tear" caused by friction between carriers and roads. Thus, using low-friction rail transit, along with using prepaid transit movement, may enable materials delivery at only a fraction of the costs that may be associated with traditional shipping methods.

Additionally, and among other benefits, illustrative embodiments described herein allow for carriers to stop and recharge at storage hubs located at any underutilized parking facility substantially along the delivery path. Using the environmental sensors built into the carriers to detect potential theft and/or vandalism, as well as a network connected to a centralized server to control the movement and configuration of the carriers, the storage hubs may act as securable and portable warehouses. These storage hubs offer significant advantages over traditional warehouses because they can bypass the costs of constructing walled-in and/or covered enclosures, as well as labor costs associated with security and handling. No known systems or methods can produce these results, particularly in the delivery industry where storage and last-mile delivery present the common challenges of costliness, inefficiency, poor inventory management, damage to materials, and remoteness from final destinations.

Thus, the illustrative embodiments described herein are particularly useful for optimizing the underutilized capacity of transit and parking infrastructures to thereby foster mutually-beneficial partnerships between transit agencies, private companies, and/or individuals who own private vehicles (such but not limited to cars, bikes, and trucks), while enjoying the economic benefits of smoother supply chains, as well as the environmental benefits associated with using transit and electric vehicles. However, not all embodiments described herein provide the same advantages or the same degree of advantage.

Referring to FIGS. 10*a*-14*c*, in accordance with an aspect and embodiment of the disclosure, there are shown front view and top view of portions of a materials storage, movement, and transfer station 1400. Such a station 1400 is otherwise referred to herein as a TULIPS station 1400 (signifying materials/package/container Transfer, Unload, Load, Internet-of-Things communication, Positioning of vehicles and materials, and Storage of materials/packages/containers). Stations 1400 are adapted for use at a transit stop for facilitating simultaneous movement and transfer of materials 1470*a-d* and 1474 (materials may include a single larger container 1470*d*, package 1474, or a grouping of packages in a container 1470*a-d*, as well as stock, or an individual product, raw materials, processed materials, or recyclable materials) using any of a plurality of materials enabled transit/delivery vehicles 1210, 1220, 1450, 1456, 1458 (those buses/transit vehicles shown having materials holding capability). This transfer may take place between intermediate such stations 1400 and last mile delivery solutions (such AVs 1420, cargo bike materials delivery vehicles 1410) capable of approaching the stations, and the stations also provide secure accessibility to materials 1474 in a locker 1490 for materials owners 1498 or crowdsourced delivery providers in crowdsourced delivery vehicles 1430. The access to materials by AVs 1420, cargo bikes 1410, crowdsourced vehicles 1430, robotic arms 1486, gantry cranes 1480, and the like at a transit system 1400, is adapted for avoiding interference with pedestrians and mass transit passengers 1498 for and on vehicles 1210, 1220, 1450, 1452, 1454, 1456, 1458. Where the Figures refer to 1470 alone, this means that any one of the containers 1470a-d could be used, as many containers are interchangeable as to their exterior functionality regarding being locked down onto the top of a transit vehicle or other vehicle. Further, other materials 1474 could occupy such space if otherwise desirable, sufficient locking of the package is achievable, and weather or protective covering permitting. Further, the inclusion of a letter after container 1470 in the Figures, such as in the case of 1470b in FIG. 16a, is not meant to be restrictive, but rather simply exemplary, so that any container or package may be used at such locations if otherwise desirable, sufficient locking is achievable, and weather or protective covering permitting.

The station 1400 comprises a structure 1409 adjacent various lanes and routes, such as lanes and routes 1401-1408 shown in FIGS. 14a-c, for temporary storage of materials 1470a-d, 1474 closely adjacent the transit stop without interfering with normal passenger 1498 movement. Further, each station 1400 comprises robotic means, such as a robotic arm 1486 (as shown in FIG. 12e), or a gantry crane 1480 with automatic grippers 1481 (e.g., friction, air suction, electromagnetic) for moving materials from temporary storage under or within the structure 1409 to vehicles 1210, 1220, 1450, 1456, 1458.

The station 1400 comprises a server system 1030 (see FIG. 10b) further comprising known CPU, Memory, Data Storage, Network I/O, and radio communications subsystems as shown for controlling interface 1031 of the server 1030 with a mass transit data center 1040 for tracking and communicating routing of materials 1470a-d. 1474 shipment and movement relative to one or more stations 1400 and correlating them for delivery with established transit routing and schedule information from the mass transit data center. The server 1030 communicates with vehicles 1210, 1220, 1450, 1456, 1458 (vehicles adapted to handle materials delivery) that are approaching and in the TULIPS station via Bluetooth Local Energy (BLE), Bluetooth, cellular, laser link, C-V2X, DSRC, or other communications links 1004 (attached to both the server and each transit vehicle) to enable materials delivery without interfering with passenger 1498 traffic.

The server 1030 further comprises a subsystem 1032 for determining positioning of vehicles 1210, 1220, 1450, 1456, 1458, relative to the station 1400 to facilitate movement of materials 1470a-d, 1474 between the structure 1409 and the vehicles 1210, 1220, 1450, 1456, 1458 and last-mile materials delivery vehicles 1410 (cargo bike materials delivery vehicles) and 1420 (AV materials delivery vehicles).

Vehicles 1210, 1220, 1450, 1456, 1458 comprise several different types of vehicles, each having differing materials retaining capabilities as follows: a long-haul-type human-driven bus 1210 adapted for carrying materials on a materials rack 1460 attached to the top of the bus: a combination bus/truck 1220 (e.g., such as for example, a longer-haul type bus for passengers at the front portion 1222 of the bus, whereas there may be provided a flat-bed-type portion 1221 near the rear of the bus for hauling materials 1470a-d, 1474): vehicle 1450 comprises a conventional human-driven commuter bus with a materials rack 1460 attached to the top of the bus and accessible with a robotic means such as a robotic arm 1486 or gantry crane 1480: vehicle 1456 comprises a platooned vehicle which may follow a lead bus, such as vehicle 1450, with or without a driver, and further also has a materials rack 1460 attached to the top of the bus and accessible with a robotic means such as a robotic arm 1486, or a gantry crane 1480: vehicle 1458 comprises a bus with an accessible hatch area 1459 with individually-accessible hatches 1462, allowing materials 1470a-d, 1474 to be top-loaded (or side-loaded). Each of the aforementioned vehicle types 1210, 1220, 1450, 1456, 1458 communicates with the TULIPS server 1030 via near distance radio link 1004 or other similar technology.

The station 1400 is adapted for transporting materials 1470a-d, 1474 on appropriately-equipped vehicles 1210, 1220, 1450, 1456, 1458 anywhere between an origination point for such materials and intermediate TULIPS stations 1400 on through to a destination TULIPS station and there beyond via last mile carriers 1410, 1420, 1430 as shown in FIGS. 10d-f. Materials delivery carriers 1410, 1420, 1430 comprise several different types of vehicles, each having differing delivery capabilities as follows: carrier 1410 comprises a human/battery-powered materials delivery cargo cycles or bikes (bicycle, tricycle or quad cycle) adapted for securely retaining and transporting materials 1470a-d. 1474 loaded into a storage area or attached to the cargo cycle, the cargo cycle being accessible and loadable with robotic means such as a robotic arm or gantry crane 1480. As known in the art, and as shown in FIG. 10e, cargo bikes 1410 preferably comprise a human assisted and driven delivery cycle capable of carrying a container 1470a-d, which is power assisted by an electric motor 1070 and a battery 1071, wherein the rider is provided navigation via a navigation computer 1072.

As shown in FIG. 10f, carrier 1420 comprises an autonomous computer-navigated vehicle (AV) adapted for securely retaining and transporting materials 1470a-d, 1474 loaded into a storage area or attached to the AV and being accessible, the AV being adapted with a plurality of sensors (as shown in FIG. 10c) comprising a sensor array 1051 controlled by an on-board computer 1053 and including a video camera 1054. LIDAR 1056, and a GPS sensor 1058, the AV also being loadable with robotic means such as a robotic arm or gantry crane 1480: carrier 1430 (shown in FIG. 10d) comprises a crowdsourced vehicle which is adapted to retain and transport materials either by automated loading by robotic means as described above with other carriers, or which may alternatively be simply loaded manually by a crowdsourced delivery vehicle operator by accessing a locker area to pick up materials and to stow it in the carrier 1430. Each of the aforementioned carrier types 1410, 1420, 1430 may communicate with the TULIPS server 1030 via near distance radio link 1004 or traditional cellular technology.

The station 1400 shown in FIG. 10a incorporates a plurality of sensor arrays 1008. Such arrays 1008 may include LIDAR, RADAR, camera, proximity detectors, and other means for determining the presence and position of crowdsourced vehicles 1030, long-haul materials delivery enabled transit vehicles 1210, combination flatbed-type materials delivery and long-haul passenger transit vehicles 1220, driver-optional platooned truck materials delivery follower vehicles 1230, driver-optional platooned coach-class follower vehicles 1240, materials delivery enabled transit vehicles 1450, driver-optional platooned materials delivery enabled vehicles 1456, and top-loaded materials delivery transit vehicles 1458. Such sensors 1008 may also be used to track and monitor the movement and storage of cargo cycles 1410 and AVs 1420. Other proximity monitors may be used to track and monitor pedestrian and passenger 1498 traffic and passenger counts which may be used to select proper configuration and type of vehicles to service a particular route at a particular time. The sensors 1008 are fed into a TULIPS station server 1030 which may also use radio links 1004 to collect vehicle-specific information, including GPS data, vehicle type data, and other vehicle specific information.

Referring specifically to FIG. 10*g*, there are shown a plurality of differently-configured, but similarly-sized, containers 1470*a-d* allowing interchangeability with vehicles 1210, 1220, 1230, 1450, 1456, 1458, and last-mile vehicles 1410, 1420, depending on the shape and size of materials 1474 to be included within the containers to be delivered. As known in the art, there are various-sized access doors on the various containers 1470*a-d*, such as for medium-sized packages (1470*a*), smaller-sized packaged (1470*b*), and a single large opening 1470*c* for larger-sized containers. The containers 1470*a* and *c* are perhaps best suited for human supervised delivery cycles 1410, since a person, such as a delivery driver, would be available to open the doors thereof in order to remove the materials. Container 1470*b* is perhaps best suited for non-supervised delivery, such as with an AV 1420, since the access doors thereon are controlled by a lock controlling numeric keypad and associated display 1471. Container 1470*d* is perhaps best suited for those delivery situations when an entire container is to be delivered to a specific destination, such as for delivery to an access locker 1490, for delivery from one transit station to the next, for delivery from a fulfillment center to a transit station, or from an airport to a larger TULIPS transit station as shown in FIG. 19, etc.

Referring specifically to FIGS. 11*a-b*, there are shown side and top views of a materials delivery enabled commuter-type bus 1458 adapted for receiving and retaining materials 1470*a-d*, 1474 inside the bus loaded through the hatch 1462 into materials receiving and accommodating bays 1464 and showing how the bays may be used during off-peak passenger times so as to not interfere with passenger 1498 seating. FIG. 11*b* shows an upper roof portion of the transit vehicle type 1458 of FIG. 11*a* showing materials 1470*a-d*, 1474 storage locations and further comprising a portal 1462 in the top of the transit vehicle for allowing deposition of a material into the bay within the vehicle, thus accommodating top-loading and unloading of the transit vehicle. Alternatively, there may be provided means for receiving materials 1470*a-d*, 1474 onto a retractable platform adapted for retraction to transition the materials into the transit vehicle for temporary stowage and transport.

FIG. 12*a* shows a materials delivery enabled long-haul-type bus 1210 adapted for first-class-type service for passengers. FIG. 12*b* shows a combination flat-bed-type materials delivery enabled long-haul-type bus 1220 adapted for carrying materials on a rear flat-bed freight-area portion 1221 of the vehicle and adapted for carrying passengers in a passenger seating portion 1222.

As more specifically shown in FIG. 13, at least one TULIPS station 1400 is provided for communicating via radio link 1004 with appropriately-adapted transit vehicles 1450, 1456, 1458 to move materials from origination points, through the TULIPS station(s), and on to last-mile delivery solution carriers, such as cycles 1410, and AVs 1420 (or crowd-sourced delivery vehicles 1430) all for delivery of materials to last mile geographically similar locations, such as a neighborhood, an apartment complex with a retail establishment on the bottom floor 1310, an apartment building 1320, and individual homes 1330, all in a community 1300. Such communities 1300 are also preferably equipped with radio link 1004, or alternatively cellular technology with perhaps a smart phone application known in the art, adapted for coordinating materials traffic to and from TULIPS stations 1400 from community 1300, as well as letting recipients know when materials 1470*a-d*, 1474 are arriving. Thus, a TULIPS station 1400 may be appropriately sized with capacity sufficient for a given size of neighborhood 1300 with attendant demand. Further, it will be appreciated that the process of materials delivery may be implemented in reverse, wherein persons 1498 may originate return of materials via last-mile solution carriers 1410, 1420 (or crowd-sourced delivery vehicles 1430) through the TULIPS station(s) 1400 and to various materials delivery hubs/vendors where the materials may be optionally aggregated into containerized packages (e.g., materials 1470*a-d*. 1474).

While the term "materials" as used herein may include hard goods, soft goods, products, whether packaged or unpackaged, recyclable materials, and preferably materials in the form of containerized packages or materials 1470*a-d*, 1474, it will be appreciated that automated locking and unlocking of the materials onto the top of, or within, a transit vehicle, such as a specially-adapted commuter bus 1450, a long-haul bus 1210, 1220, a van, a train 1552, or other transit vehicle, may be accomplished in any of a number of ways known in the art. For example, as shown in FIGS. 12*c-d*, it will be appreciated that electronically-controlled electromagnets 1258 with guides 1254 and indented seats, with or without mechanical clamps adapted for clamping on integral bars on a containerized package 1470*a-d*, or other portion of the goods, may be implemented and automatically system-controlled by either the transit vehicle (e.g., 1450) receiving a signal from the TULIPS station 1400, or activated more directly by the loading and unloading system 1033 of the TULIPS station itself.

Referring more specifically to FIGS. 14*a-140*, and 12*a-b*, there are shown a plurality of sections of a TULIPS transit station 1400, wherein in FIG. 14*a* is continued on FIG. 14*b* which is continued on FIG. 14*c*. In other words, the various lanes and routes of FIGS. 14*a-14c* (described further below) are meant to be continuous from one FIG. to the next forming one continuous TULIPS transit station 1400. The TULIPS station 1400 comprises first and second directional (e.g., East/West, or North/South) capability for basic bus transit lanes (first direction and second direction designated with primed numbers). The station 1400 further comprises a pedestrian path 1408, 1408' for pedestrian 1498 transport: a bike route 1401, 1401' for materials carrier cycles 1410, bicycles 1411, and AV 1420 movement; a passenger auto lane 1402, 1402' for any conventional vehicle traffic including automobiles 1430, trucks 1440. The station 1400 also provides a bus passing lane 1403, 1403' for any type of bus 1210, 1220, 1450, 1452, 1454, 1456, 1458: a bus stop lane 1404, 1404 for passenger 1498 unloading and loading of such buses along passenger walkways 1407, 1407. There is also provided a materials 1470*a-d*. 1474 loading and unloading area or siding 1405, 1405", for vehicles 1210, 1220, 1450, 1456, 1458 and serviceable with one of a plurality of gantry crane 1480 loading and unloading systems, wherein the loading and unloading systems are capable of loading and unloading buses, platooned vehicles, and autonomous vehicles. While FIG. 14a shows a portion of the TULIPS station with lanes 1401-1404 going in opposite directions as lanes 1401-1404', it only shows the siding area 1405 for the upper set of lanes 1401-1404, whereas FIG. 14c shows another portion of the TULIPS station also with lanes 1401-1404 going in opposite directions as lanes 1401-1404", but it (FIG. 14c) only shows the siding area 1405' for the lower set of lanes 1401-1404. Thus, in essence each of the FIGS. 14a, 14b, 14c focuses on different portions of an embodiment of a TULIPS station 1400.

FIG. 14b shows passenger stopping 1416 and seating areas 1492 of the TULIPS station 1400 including a locker 1490 for users for materials access. Further, there is shown a crosswalk 1494 with traffic control lights 1496 for controlling vehicle traffic for safely allowing pedestrians 1498, the AVs 1420, and cycles 1410 to navigate the station, to cross lanes of traffic, and to access the passenger waiting area 1416. Still further, in FIG. 14b the gantry cranes 1480 are adapted to accomplish movement and transfer of materials 1470a-d. 1474 along gantry rails 1482 the entire longitudinal distance of the TULIPS station 1400, whether in FIG. 14A, 14B, or 14C, but the gantry crane system is specifically designated in FIG. 14b for AV and bicycle/ tricycle carrier 1410, and/or wherein crowdsourced delivery vehicles 1430 may access materials or transit loading and unloading. Thus, it will be appreciated that the gantry crane system 1480 may, for example, pick up materials 1470a-d. 1474 shown at a storage area 1472 at the left of FIG. 14a and transport anywhere along rail 1482, for example through the passenger area 1416 in FIG. 14b, for loading onto a package carrying enabled commuter bus-type vehicle 1450 in a siding area 1405 at the far right of FIG. 12C. As a practical matter, a single gantry crane 1480 typically would not traverse the entire TULIPS station embodied in FIGS. 14a-14c, but rather there would be a gantry crane 1480 associated with each area in each Figure, and materials would be dropped in overlapping temporary storage areas and retrieved by the next gantry crane for further transport. It will be appreciated that the number, and different types, of gantry cranes 1480, 1688 may be decreased or increased based upon the anticipated TULIPS station 1400 traffic.

Still further, there is provided an AV parking area 1422 where AVs 1420 may be parked and recharged, and there is provided a materials storage area 1472 where materials 1470a-d, 1474 may be stored. As shown in FIG. 14b, AVs 1420 may be platooned, as in "follow-me" mode, to increase the capacity of the AVs for transporting materials.

Referring now to FIG. 14d, there is provided as part of an alternate embodiment TULIPS station 1400, an enhanced siding area 1491 having a package storage area 1472 where vehicles 1210, 1220, 1450, 1456, 1458 and AVs 1420 may be simultaneously pre-loaded with packages, charged/refueled, the enhanced siding area also providing space where the transit vehicles may be maintained and/or repaired in a depot 1499. Thus, there are shown conventional wired charging stations 1424 for charging vehicles 1210, 1220, 1450, 1456, 1458 and AVs 1420 Further, there is provided inductive charging stations 1426 for some AVs 1420 capable of being charged in that way. Still further, there are shown fossil fuel fueling stations 1428 for currently conventional fueling of vehicles. Loading and loading of vehicles 1210, 1220, 1450, 1456, 1458 is accomplished with a gantry 1480 with grippers 1481 and/or cantilevered robotic arms 1486 capable of retrieving materials 1470a-d, 1474 from a conveyor 1272.

Referring now to FIGS. 15a and 15b, there are shown other alternative portions of embodiments of types of TULIPS stations 1400 where lanes 1401"-1404" are shown positioned together with train transit rails 1582 and sidings 1405" (FIG. 15a), 1405"" (FIG. 15b) to enable transit train cars 1552 and cargo train cars (both traditional cargo train cars and materials carrying equipped transit trains 1550, which have a rack 1560 on top thereof, to stop adjacent the sidings to transfer passengers 1498 and materials 1470a-d, 1474 between appropriately equipped materials carrying and transit vehicles 1210, 1220, 1450, 1456, 1458 and materials carrying enabled transit trains 1550. Similar to FIGS. 14a-14c, there is shown a robotic-type gantry crane 1580 positioned over the transit vehicles 1210, 1220, 1450, 1456, 1458 (e.g., mass transit passenger buses appropriately equipped for carrying materials 1470a-d, 1474) and materials 1470a-d, 1474 carrying enabled trains 1550 and spanning temporary storage 1472.

In this way materials 1470a-d, 1474 are enabled in being transferred between various of transit vehicles without impeding passenger ingress or egress from, or otherwise delay passengers on, the transit vehicles. And as with the description of FIGS. 14a-14c, there are further provided in this portion of a TULIPS station 1400 accessibility to such other materials delivery vehicles as AVs 1420, materials delivery cycles/cargo bikes 1410, and crowdsourced delivery vehicles 1430.

Referring specifically to FIGS. 12c and 12d, there are shown top and side views, respectively, of an example of an automated/remote controlled container locking mechanism 1250 adapted for use in securing materials 1470a-d, 1474 to transit vehicles 1210, 1220, 1450, 1456, 1458, wherein the locking mechanism 1258, 1260 is controllable by the transit vehicle and/or a TULIPS station 1400 unloading and loading system 1033 via an on-vehicle controller (communicating with the TULIPS station via a radio link 1004) to enable controlled unlocking and locking of materials on a vehicle. The locking mechanism 1250 further comprises a plurality of guides 1252 for facilitating positioning and holding of the materials 1470a-d, 1474 in place on the vehicle 1210, 1220, 1450, 1456, 1458. Electromagnetic locking systems are known in the art, and the present electromagnetic locking system 1250 actually comprises a permanent magnet lock 1260 with an electromagnetic release 1258 so that the only time the system needs to be energized is to accomplish release. Thus, any of a number of different electromagnet locking systems may be used without departing from the system and station as claimed. Further, there is provided a sensor 1262 to enable signaling to the station server via an on-board computer 1270 whether materials are occupying the slot/location on the vehicle 1210, 1220, 1450, 1456, 1458, or not.

FIG. 12e shows an example of a robotic arm 1486 unloading and loading system that picks up materials 1470a-d, 1474, such as individual packages, as they pass by on a conveyor 1272 (conversely, if materials are being unloaded from the vehicle 1210, 1220, 1450, 1456, 1458 they may be placed by the robotic arm onto the conveyor 1272). The system conveyor 1272 is shown having a barcode scanner 1274 to facilitate tracking and passing along shipping status information for each package 1474, wherein the robotic arm 1486 places the materials in openable and closeable bins 1276 covered with hatches 1462, both located on top of a vehicle 1210, 1220, 1450, 1456, 1458. Each bin 1276 has sensors 1280 for signaling to the station 1400 via an on-board computer 1270 whether a particular bin is loaded or not. Thus, as the vehicle 1210, 1220, 1450, 1456, 1458 approaches and stops at the station 1400, the bins 1276 that need to be loaded, and the bins 1276 sensed as having materials therein and needing to be unloaded, automatically open (i.e., if materials 1470*a-d*. 1474 need to be loaded, or materials 1470*a-d*, 1474 needing to be unloaded have arrived at their final stop as sensed and known by the system), and are unloaded and loaded by the robotic arm 1486 unloading and loading system.

Referring to FIG. 12*f-h*, there are shown various types of platooned vehicles as follows: FIG. 12*f* is a luxury long-haul bus 1210 linked via radio or other means 1221 to a freight-only platooned vehicle 1230: FIG. 12*g* is a luxury long-haul bus 1210 linked at 1221 to a coach-class-type platooned passenger vehicle 1240; and FIG. 12*h* is a combination of such wherein there is provided a lead luxury-class-type long-haul vehicle 1210 followed by a coach-class-type platooned long-haul passenger vehicle 1240 further followed by a freight-only-type platooned vehicle 1230.

The ability of TULIPS stations 1400 in accordance with an aspect and embodiments of the disclosure to accommodate platooned vehicles 1210, 1220, 1230, 1240, 1458 greatly increases the flexibility and ability of operators to accomplish package delivery and transit objectives while encouraging further enhancement of availability of resources for package delivery and transit purposes. This is because platooning allows ready mixing and matching of types of vehicles which may inserted or removed into the delivery/transit process at any given TULIPS station, or otherwise, to expand capacity to address specific needs, for example for rush hour needs for additional passenger carrying capacity, or increased need or demand for materials delivery (for example on holidays or otherwise at peak delivery times). Such platooning also allows flexibility and capacity for response to emergency situations (such as weather or other natural disaster types of events). TULIPS stations 1400 are therefore proponents of such flexibility and enhanced capacity in that each TULIPS station may incorporate additional loading and siding areas 1405, 1405', 1491 where platooned vehicles 1210, 1220, 1230, 1240, 1458 may be temporarily stored and at the ready to be put into service, or removed from service, based upon demand.

Referring now to FIG. 16*a*, there is shown a side view of a passenger area 1416, wherein pedestrians/passengers 1498 are enabled to pick up and drop off materials in lockers 1490 adjacent or integral with the structure 1409 of the TULIPS station 1400. Operating optionally above this passenger area 1416 (in an enclosed portion of the structure 1409) for safety reasons), there is further provided an automated material, package and container loading and unloading system 1688 having materials grippers 1690 and running on rails 1686 for transferring materials 1470*a-d*. 1474 from temporary storage to the lockers 1490. Passengers, or other persons (such as crowdsourced delivery drivers, other package owners and the like) 1498 may rest on benches 1492 provided (e.g., while they wait for their transit vehicle to come) and also may pick up materials 1474 at a locker 1490 that has been automatically loaded by the loading and unloading system 1688. Further, for safety reasons, it may be seen that passenger and pedestrian walkways and transit loading areas are to be routed away from being directly under or unduly close to gantry crane 1480 or other robotic arm 1486 operations. Further, of course, enclosure structures 1409 may be implemented to prevent unintended contact between persons and gantry cranes 1480 or other robotic arm 1486 operations. Still further, consideration of transit schedules to limit machine operation during higher pedestrian traffic times are seen as further enhancing the safety of operations of the station 1400.

Referring specifically to FIG. 16*b*, there is provided is a side view of an AV 1420 and cargo bike 1410 materials delivery vehicle loading and unloading area 1417 of a TULIPS station 1400 in accordance with an aspect and embodiment of the disclosure and having an automated gantry crane materials, packages or containers loading and unloading system 1680 having an electromagnetic attachment gripper 1687, where AVs and cargo bikes may be automatically loaded and/or unloaded by the gantry crane for enabling traditional last-mile delivery.

Referring to FIGS. 20-23, and as used in these Figures, the following terms are defined as follows: XFR (transfer from one vehicle to another—in the same sense as you would use the terms "transfer" on a bus—and also allowing the changing of direction of travel of materials or passengers), D2MT (distributor to mass transit—i.e., a new convenient method of shipping for a manufacturer, or alternatively as a "firewall" to keep distributor truck traffic out of more congested city confines), T2LM (transfer to last mile delivery—as in a materials delivery-enabled transit vehicle to a last-mile materials delivery vehicle such as a cargo bike 1410, an AV 1420, or a crowdsourced delivery vehicle 1430). Referring specifically to FIGS. 20-21, there is shown a shorter-haul, more local, end-to-end product order and delivery diagram (FIG. 20) and material delivery enabled transit vehicle transit map (FIG. 21), showing end-to-end delivery of a product/materials from a fulfillment center 2030, through a plurality TULIPS stations and transit legs within, say, a metropolitan area, such as for example Portland, Oregon, USA. Thus, in FIG. 20, there is shown a buyer 2010 placing an order for a purse 2015 (e.g., in a package 1474) via Internet, telephone, or other means 2020 to a local fulfillment center 2030. Since the product 2015 is going to be delivered in a package 1474 via mass transit in accordance with the disclosure, the fulfillment center 2030 delivers the product 2015 (e.g., the package 1474 may be packed into a container 1470*a-d*) to a first mass transit station D2MT 1900. Thus, D2MT 1900 may comprise the embodiment of TULIPS transit station 1900 shown in greater detail in FIG. 19. The means for delivering from the fulfillment center 2030 to D2MT 1900 may comprise a semi-truck, a delivery van, or other suitable delivery vehicle. At D2MT 1900, the product 2015 (likely or preferably containerized at the fulfillment center 2030 for delivery with other products to a given area) is transferred likely to a commuter bus 1450 for delivery via an AGT transit system in a city 2040 near the fulfillment center 2030. Then, at the city 2040, the product 2015 (e.g., in a container 1470*a-d*) is transferred to another commuter bus 1450 servicing a route destined for a local community 2050 and thereafter it may be transferred at T2LM 2060 (e.g., a Transit to Last Mile (T2LM) TULIPS station 1400 similar to that shown in FIG. 10*a*) from the mass transit commuter bus 1450 to a last-mile delivery vehicle 1410 (e.g., a cargo bike) to the buyer's home 2025. If a return is required, the reverse path and transfers could be used to return an item to the seller. Referring to FIG. 21, it may be seen that the previously described locally-fulfilled product order may be correlated with locations on a city map, and therefore correlated with a standard mass transit route map, such that the data from the transit system may be correlated with delivery data for effective delivery of materials 1470*a-d*. 1474 along the various transit routes of the city depending on the location within the city where each material/product is destined to arrive.

Referring specifically to FIGS. 22-23, there is shown a longer-haul, interstate-type, end-to-end product order and delivery diagram (FIG. 22) and material delivery enabled transit vehicle map (FIG. 23), showing end-to-end delivery of materials 2015 from a fulfillment center 2030, through a plurality TULIPS stations and transit legs spread across several states in the United States of America. Thus, in FIG. 22, there is shown a buyer 2010 in Lake Oswego, OR placing an order for a purse 2015 (e.g., a package 1474) via Internet, telephone, or other means 2020 to a remote fulfillment center 2030. Since the product 2015 (package 1474) is going to be delivered via mass transit in accordance with the disclosure, the fulfillment center 2030 delivers the product 2015 (e.g., package 1474 may be contained in a container 1470a-d) to a first mass transit station D2MT 1900 in the state where the fulfillment center is located (e.g., Colorado). Thus, D2MT 1900 may comprise the embodiment of TULIPS transit station 1900 shown in greater detail in FIG. 19. The means for delivering from the fulfillment center 2030 to D2MT 1900 may comprise a semi-truck, a delivery van, or other suitable delivery vehicle. At D2MT 1900, the product 2015 (likely or preferably containerized at the fulfillment center 2030 for delivery with other products to a given area) is transferred likely to a long-haul type bus 1210, 1220 for delivery via an AGT interstate transit system to a first city 2034 (e.g., Denver, CO) near the fulfillment center 2030. Then, at the city 2034, the product 2015 (e.g., in a package 1474 contained in a container 1470a-d) is transferred at a TULIPS station 1400 to another long-haul type bus 1220 (a combination delivery flat bed and long-haul transit bus 1220) servicing a route destined for another city 2036 (e.g., Salt Lake City). Then, at the city 2036, the product 2015 (e.g., in container 1470a-d) is transferred at another TULIPS station 1400 to another long-haul transit bus 1210 to another city 2040 (e.g., Portland, OR). Then at city 2040, the product 2015 (e.g., in container 1470a-d) is transferred at a TULIPS station to a commuter bus 1450 destined for delivery to a local community 2050 and thereafter it may be transferred at T2LM 2060 (e.g., a Transit to Last Mile (T2LM) TULIPS station 1400 similar to that shown in FIG. 10a) from the mass transit commuter bus 1450 to a last mile delivery vehicle 1410 (e.g., a cargo bike) to the buyer's home 2025. If a return is required, the reverse path and transfers could be used to return an item to the seller. Referring to FIG. 23, it may be seen that the previously described interstate-fulfilled product order may be correlated with locations on an interstate (or country) map, and therefore correlated with a standard mass transit route map, such that the data from the transit system may be correlated with delivery data for effective delivery of materials 1470a-d. 1474 along the various transit routes of the various states and cities depending on the locations where each material/product is destined to pass through and arrive.

Referring further to FIG. 17, the station's subsystem 1032 for determining positioning of vehicles 1210, 1220, 1450, 1456, 1458 in relation to the structure 1409 further comprises computer controlled steps 1032 initiated by an approaching vehicle communicating with the positioning subsystem 1032, as follows: step 1720 vehicle begins by sending the vehicle's unique ID, type of siding 1405 required and siding space availability to service the vehicle (the subsystem 1032 may determine the direction of the vehicle 1210, 1220, 1450, 1456, 1458 in any of a number of ways, such as, for example, by considering from public transit data the vehicle's ID and the direction it is heading on its route—or alternatively, coordinate (x, y, z) information, or map orientation direction information and even elevation, together with a centerline and end points of the vehicle, may be beneficially used to establish bearing and position of the vehicle relative to the station 1400. Adjustments may be made for road banking, road crown position, and/or snow or ice accumulation. Thus, a three-dimensional vehicle position is loaded into a position system map that incorporates the roadway, ruts and all. To allow dynamic changing of such data input, cameras or other sensors may be employed.

In step 1725 the TULIPS station server 1030 acknowledges receipt of the vehicle request and prepares the siding 1405 for unloading and loading processes: in step 1730 the server determines whether the appropriate siding 1405 is available: step 1735, if the appropriate siding 1405 is not available, the vehicle 1210, 1220, 1450, 1456, 1458 is sent to/maintained in a holding area to wait for the siding area: step 1740, the vehicle acknowledges receipt of the move/maintain instruction and moves/stays in the specified holding area until the siding is available as determined at step 1730. Once the siding area 1405 is available, the subsystem 1032 continues the process at step 1745 by sending siding 1405 location and availability to the vehicle 1210, 1220, 1450, 1456, 1458, whereupon at step 1750 the vehicle acknowledges receipt, moves to the specified siding service area 1405, and at step 1755 acknowledges the vehicle has stopped and is parked and ready for service to accommodate unloading and loading mechanisms to safely and accurately access materials 1470a-d, 1474 on the vehicle, and thus the positioning subsystem 1032 communicates with the vehicle 1210, 1220, 1450, 1456, 1458 about its position relative to the structure 1409. Then, at step 1760, the subsystem 1032 acknowledges that the vehicle 1210, 1220, 1450, 1456, 1458 is ready and at step 1765 starts the unloading/loading process. Positioning is preferably aided with data received from the vehicle to be positioned, but it may be further augmented with sensing capabilities of the station without departing from the system as claimed.

As part of the determining the type of vehicle steps 1720, 1725, the positioning subsystem 1032 determines not only the type of vehicle approaching the station 1400, but also whether the approaching vehicle is capable of being loaded with materials 1470a-d, 1474 internally, externally, on top thereof, or at a side thereof, and whether the vehicle is non-autonomous, autonomous, or partially autonomous. As used herein, the term partially autonomous may also mean conditionally autonomous or highly autonomous, so that part of the determining subsystem is to classify the vehicle 1210, 1220, 1450, 1456, 1458 in terms of its capabilities relating to such things as autosteering, autobraking, collision avoidance, etc.

The server 1030 communicates specific materials 1470a-d. 1474 location within the vehicles 1210, 1220, 1450, 1456, 1458 to facilitate unloading and loading of materials 1470a-d, 1474 using unloading and loading subsystem 1033. While such specific materials 1470a-d, 1474 location information may further comprise materials size and weight information, at a minimum it entails communication of space available for standard sized containers. Thus, for example, rack 1460 on top of the vehicle may be adapted for holding standardized containers of materials 1470a-d, 1474, or hatch, or hatches, 1462 in an upper hatch area 1459 of the vehicle, as shown in FIGS. 11a and 11b, may likewise be adapted to allow passage of standardized containers of materials 1470a-d, 1474.

Referring also to FIGS. 18a-b, in accordance with an embodiment of this aspect of the disclosure, the station's subsystem 1033 for unloading and loading materials further comprises a computer-controlled robotic materials 1470a-d,

1474 unloading and loading system, such as gantry 1080 and gripper 1081 (or suction or electromagnetic retention devices) for unloading and loading of materials between the vehicles 1210, 1220, 1450, 1456, 1458 and the structure 1409) during regular transit stops of the materials delivery/transit vehicles without interfering with normal passenger 1498 movement.

Referring specifically to the flowchart in FIGS. 18*a* and 18*b*, the subsystem 1033 comprises a plurality of steps for unloading and loading of materials 1470*a-d*, 1474 as follows (wherein steps and commands performed by the station (designated as 1801) via its server 1030 are located on the left-hand side of the Figure, and steps and acknowledgments on the right-hand side of the Figure are performed by a vehicle 1210, 1220, 1450, 1456, 1458 (as further designated 1802): step 1805, start the unload load process: step 1810 the station directs the vehicle to secure itself in the siding area 1405: step 1812 the vehicle acknowledges that it is secure: step 1814, the station directs securing of the siding area from pedestrians (as with robotic cones and/or automated gates and signals): step 1816, the station acknowledges the area is secure: step 1818, the station directs the vehicle to opens access doors: step 1820, the vehicle acknowledges the doors are open: step 1822, the station directs the vehicle to release materials restraints: step 1824, the vehicle acknowledges materials released: step 1825, the station unloads the materials: step 1826 the station relays information about materials to be loaded onto the vehicle and therefore directs the vehicle to reconfigure itself (i.e., reconfigure passenger seats and or stanchions, as needed, close off passenger access as to any parts of the vehicle needed for materials transport) if necessary: step 1828, the vehicle acknowledges that reconfiguration is completed and acknowledges readiness for loading: step 1830, the station loads outbound materials from temporary siding storage onto vehicle: step 1832, the station acknowledges that loading is completed: step 1834, the station directs the vehicle to engage materials restraints against movement: step 1836, the vehicle acknowledges the materials are locked: step 1840, the station retracts loading equipment and directs the vehicle to close access doors: step 1842, the vehicle acknowledges the access doors are closed: step 1844, the station opens the loading area to pedestrian traffic: step 1846, the vehicle acknowledges it is ready for passenger transit: step 1848, the station releases the vehicle to remove to a transit loading area 1416; and step 1850, the unloading/loading subsystem/process ends.

Thus, in summary, the unloading/loading subsystem/process 1033 communicates with a vehicle 1210, 1220, 1450, 1456, 1458 to open the vehicle for materials access (assuming a materials boarding hatch of some kind to allow access to within the vehicle, typically from above or a side of the vehicle, for the robotic system 1480, 1486), deactivates container locking mechanisms to allow unloading of the material/package/container from the vehicle, unloads and loads materials from and to the vehicle, activates locking mechanisms to secure loaded materials to the vehicle, communicates with the vehicle to close the vehicle for materials access, and signals to the vehicle that it is free to leave the station and/or for passenger boarding. Preferably, the robotic unloading and loading of materials in connection with an embodiment of the station of this aspect of the disclosure comprises a computer-controlled gantry crane 1480 (with grippers 1481—e.g., friction, air suction, electromagnetic) or a robotic arm 1486. Unloading and loading is preferably aided with data received from the vehicle to be unloaded/ loaded, but the process may be further augmented with sensing capabilities of the station without departing from the system as claimed.

Referring to FIG. 19, there is provided an alternative embodiment TULIPS station 1900 which serves as an interface between larger materials delivery companies (E.g., UPS, FEDEX, DHL), retailers (both online and brick-and-mortar), the US Postal Service, air freight, and the transit companies. Such a TULIPS station 1900, which may be located outside of more populated areas of a municipality, and closer to major distribution centers such as an airport, a marine port, or a train depot, and may be adopted by a municipality, for example, a city or a state, which may compel integration of mass transit alternatives, such as common carrier bus or train transit systems, with the distribution centers and other parties involved with materials delivery. Such a TULIPS station 1900 may be configured as shown in a round—about-type fashion, with a central automated warehouse 1950, and transit loading and unloading siding areas each with one or more gantry cranes 1980. Thus, for example, as shown in FIG. 19, there are shown four gantry cranes 1980, one each for servicing materials 1470*a-d*. 1474 movement to and from the central warehouse 1950 to and from vehicles 1450 (or 1456, 1458, not shown), conventional materials delivery trucks 1440, or even cargo trains 1550 (not shown). AV forklift vehicles 1940 may also be used in and around the TULIPS station 1900 to help stage, retrieve, and deliver materials 1470*a-d*, 1474 to appropriate locations within the TULIP station confines. A TULIPS station 1900 may be implemented in a situation where a particular city or municipality wishes to avoid having excess large delivery truck traffic within the city/municipality limits. A TULIPS station 1900 used in this way may be thought of as a "firewall" in the sense that it keeps such large delivery truck traffic out of the city, therefore saving wear and tear on roads, excess pollution (such as brake pad dust or combustion byproducts) from being introduced into residential or more densely populated environments. Such environmental and public benefit enhancements could be mandated by law by controlling government entities.

Stations in accordance with the foregoing aspects and embodiments of the disclosure enable seamless materials delivery to intermediate locations along predetermined public mass transit routes using the previously described associated adapted transit station stops. Such stations may be abbreviated TULIPS stations, signifying seamless Transferring of people and materials/packages, Unloading, Loading, Interconnecting (with package carriers, AVs, transit vehicles, etc.) via Internet-of-Things communication, Positioning (of transit vehicles at stations for efficient unloading and unloading), and Storing of materials/packages/containers at the station, wherein the accessing, unloading, loading, and storage of materials/packages/containers is accomplished without interference of passenger movement or delay of traffic of mass transit systems.

The TULIPS stations described also may be integrated into a transit stop station providing for unloading and loading of platooned vehicles, such as transit lead vehicles having a follower vehicle, wherein the transit vehicle may have top, side, or interior loading capability, a long-distance transit vehicle with compartments for other people or materials/packages, a combination transit vehicle with a fixed flatbed space for materials (which could be top-loaded), or a freight vehicle (box truck or flatbed) without passengers. Such incorporation of platooning further lends to the ability of the station and system of intermodal transfer of people and materials to do so without interfering with passenger traffic.

Such stations will greatly reduce the amount of commuter and truck traffic for materials delivery on the roads associated with current burgeoning materials delivery practice unduly employing much larger trucks than needed on roadways not well-suited for such. This, in turn, will save costs in materials delivery, and it will encourage increased transit usage-still further encouraging utilization of otherwise under-utilized transit vehicles, whether bus, train, or subway transit vehicles. Such will help preserve existing road infrastructure and reduce pollution and waste, since much of delivery truck traffic on residential roadways entails travel of nearly empty trucks along such roadways (after deliveries have been made), wherein the trucks themselves used for such deliveries, as opposed to the packages carried, comprise the overwhelming portion of weight on the roads. Thus, by integrating materials delivery more seamlessly onto existing modes of public transit, great efficiencies are won, and utilization of public transportation systems is encouraged. In other words, while currently there is a duplication of movement, and wear and tear to roads, since transit vehicles are currently moving along the same routes as delivery vehicles (which is multiplied by having a variety of large delivery trucks), with the present disclosure there is provided a consolidation of traffic, wear, and tear with reduced vehicle miles (or kilometers) traveled (VMT/VKT). Thus, just as carpooling reduces VMT/VKT, the present system and stations introduces cargo pooling efficiencies using the same rationale. Looked at from yet another angle, one does not typically think about the fact that packages leaving a warehouse are tethered to one vehicle throughout the day, but analysis shows that a last package to be delivered may be carried to perhaps 100 different addresses before arriving at its destination, whereas by separating these into smaller containers and more effectively routing them using known routing systems enhanced with the present system and stations, out-of-direction travel of packages may be significantly reduced.

By facilitating integration with last-mile materials delivery solutions, including lightweight cargo bikes, lightweight AVs, and by encouraging of passenger pickup of materials on transit vehicles or at transit vehicle stops, the methods, systems and stations of the present disclosure encourage greater cost savings and environmental efficiencies than existing systems, all in a way that will encourage governmental, and quasi-governmental, systems to get involved to collaborate to overcome existing congestion and infrastructure wear and tear problems. By enabling integration of materials delivery with passenger public transit, the system and methods described will lead not only to much greater efficiency, savings, and cost reductions, both in terms of materials delivery and transit costs, but also savings in terms of environmental and infrastructure development and maintenance. This is achieved in part since, whereas before there would have been several large materials delivery carriers with their trucks running over residential surface roads for example, competing with that resource at the same time as transit carriers and other delivery carriers, delivery by way of the present disclosure envisions a vast reduction in the need for such multiple large carriers' trucks on the roads, since no AGT (Already-Going-There) transit vehicles would pick up the load of materials delivery, and cargo bikes, AVs and other smaller delivery vehicles would be enabled in making last mile deliveries.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and sub-combinations of the various elements, features, functions, and/or properties disclosed herein. The following claims particularly point out certain combinations and sub-combinations regarded as novel and nonobvious. Invention(s) embodied in other combinations and sub-combinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A materials storage, movement, transfer, and transit station system adapted for use at a transit stop for facilitating simultaneous movement and transfer of passengers and materials on any of a plurality of materials enabled transit and delivery vehicles, comprising:

a transit stop structure comprising a plurality of sensor arrays;

a warehouse for storage of materials adjacent said transit stop structure;

an unloading and loading system comprising at least one robotic manipulator attached to at least one of said transit stop structure and said warehouse for unloading and loading of materials between the vehicles and said warehouse during transit stops of the vehicles; and a station computer system with a processor configured to:

receive materials delivery data of materials on any of the vehicles from a materials delivery computer system;

receive transit routing and schedule information of each of the vehicles from a mass transit computer system;

receive materials presence and accessibility data comprising at least one of presence of vehicles, position of vehicles, space on vehicles for materials, and materials to be unloaded and loaded via said transit stop structure and said station computer system;

receive human movement data comprising at least one of pedestrian movement, passenger movement, and passenger count via said transit stop structure and said station computer system;

receive vehicle-specific data comprising at least one of GPS data, vehicle type data, direction-of-travel data, position data, material retaining capability data, energy type and usage data, platooning data, autonomous capability data, load position data, locking mechanism data, and materials location within vehicle data via said transit stop structure and said station computer system;

process the materials delivery data, the transit routing and schedule information, the materials presence and accessibility data, the human movement data, and the vehicle-specific data to:

determine vehicle locations and positioning of the vehicles relative to said transit stop structure;

allocate resources related to unloading and loading by:

storing materials or grouping materials at pre-positioned locations for accessing, unloading, loading and storing materials into said ware-house without interference of at least one of passenger movement and vehicle traffic;

guiding the vehicles to available lanes and loca-tions to accommodate said unloading and load-ing system to safely and accurately access mate-rials; and predicting where and when a transit/delivery ratio should shift to alter types, number, and fre-quency of the vehicles employed using at least one of goods/people ratio, time, anticipated ridership changes;

control said unloading and loading system for unload-ing and loading;

track and communicate routing of materials onboard the vehicles; and facilitate accuracy and efficiency of unloading and loading of the materials by avoiding interfering with pedestrian and passenger movement on the vehicles at said transit stop structure.

2. The transit station system of claim 1, wherein said station computer system further comprises:

a. a determining system to determine types of approach-ing vehicles, whether the vehicles are internal or exter-nal loaded, top loaded or side loaded, autonomous, or partially autonomous, and the availability of space on the vehicles for materials; and b. a guidance system for guiding the vehicles to available lanes and locations to accommodate said unloading and loading system to access materials, wherein said guid-ance system further comprises communicating signals for the vehicles to come to a complete stop at desig-nated spots relative to said transit stop structure.

3. The transit station system of claim 2, wherein the at least one robotic manipulator of said unloading and loading system communicates with the vehicles to open the vehicles for materials access aided by the materials delivery data, the transit routing and schedule information, the mate-rials presence and accessibility data, the human move-ment data, and the vehicle-specific data to avoid inter-fering with passenger movement on the vehicles and at said transit stop structure, and deactivates materials locking mechanisms to allow unloading of the materials from the vehicles, wherein the at least one robotic manipulator unloads and loads materials from and to the vehicles, wherein said station computer system activates locking mechanisms to secure loaded materials to the vehicles, wherein said station computer system communicates with the vehicles to close the vehicles for materials access, wherein said station computer system signals to the vehicles that they are free to leave said transit stop structure, wherein said station computer system is adapted for using the materials delivery data, the transit routing and schedule information, the materials pres-ence and accessibility data, the human movement data, and the vehicle-specific data to facilitate movement and transfer of materials on the vehicles and avoiding interfering with transport of passengers on the vehicles and at said transit stop structure.

4. The transit station system of claim 3, wherein said unloading and loading system further comprises a gantry crane unloading and loading system to unload and load materials from the vehicles.

5. The transit station system of claim 3, further compris-ing a siding area adjacent said transit stop structure for picking up, dropping off, and parking of platooned materials transport vehicles that are data communications enabled transit and materials delivery vehicles to facilitate move-ment and transfer of materials on the platooned materials transport vehicles and avoiding interfering with transport of passengers on the vehicles and at said transit stop structure.

6. The transit station system of claim 2, further compris-ing a siding area adjacent said transit stop structure for picking up, dropping off, and parking of platooned materials transport vehicles that are data communications enabled transit and materials delivery vehicles, and wherein said station computer system is adapted for using the materials delivery data, the transit routing and schedule information, the materials presence and accessibility data, the human movement data, and the vehicle-specific data to facilitate movement and transfer of materials on the platooned mate-rials transport vehicles and avoiding interfering with trans-port of passengers on the vehicles and at said transit stop structure.

7. The transit station system of claim 1, wherein said transit stop structure is one of an existing transit stop structure of an existing transit station, and a constructed transit stop structure, wherein the existing transit sta-tion has one of a plurality of lanes and a siding area, wherein the existing transit station has at least one sidewalk for passengers walking to, from, or by said transit stop structure, wherein the existing transit sta-tion is provided with said station computer system for tracking and communicating routing of materials traffic relative to the existing transit station and with estab-lished transit routing and schedule information, wherein said warehouse for storage of materials adjacent said transit stop structure is provided to the existing transit station, wherein said station computer system is also used for determining positioning of the vehicles relative to said transit stop structure based upon sensor feedback from the vehicles to facilitate movement of materials between said transit stop structure and the vehicles aided by the materials delivery data the transit routing and schedule information, the materials presence and accessibility data, the human movement data, and the vehicle-specific data and wherein said unloading and loading system is provided to said transit stop structure to facilitate unloading and loading of materials between said warehouse and the vehicles while avoiding interfering with passenger movement on the vehicles and at said transit stop structure.

8. The transit station system of claim 1, further compris-ing at least one delivery cycling route for cargo delivery cycles further comprising and adapted for receiving data communications from the vehicles via said station computer system for facilitating movement and transfer of materials and passengers on the vehicles and the cargo delivery cycles and to avoid interfering with passenger movement on the vehicles and at said transit stop structure.

9. The transit station system of claim 1, further compris-ing at least one autonomous delivery vehicle unloading and loading area for last-mile autonomous vehicles, wherein said station computer system is adapted for using the materials delivery data, the transit routing and schedule information, the materials presence and accessibility data, the human movement data, and the vehicle-specific data to facilitate simultaneous movement and transfer of materials and passengers on the transit vehicles and materials on the autonomous delivery vehicles while avoiding interfering with passenger movement on the vehicles or at said transit stop structure.

10. The transit station system of claim 1, further comprising at least one crossing for pedestrian, cycle delivery, and autonomous vehicle delivery traffic access to transit and materials delivery and pickup, further comprising a signal to the vehicles that they are free to leave said transit stop structure, adapted for avoiding interference with movement and transfer of materials and passengers on the vehicles and at said transit stop structure.

11. The transit station system of claim 1, further comprising a plurality of lanes, at least one sidewalk for passengers walking to, from, or by said transit stop structure, and at least one crossing for pedestrian, cycle delivery, and autonomous vehicle delivery traffic for facilitating movement and transfer of materials on any of a plurality of materials enabled transit and delivery vehicles, said transit stop structure, said warehouse, and last mile delivery solutions for materials, said station computer system being adapted for using the materials delivery data, the transit routing and schedule information, the materials presence and accessibility data, the human movement data, and the vehicle-specific data for unloading and loading of materials from and on the vehicles and while being adapted for avoiding interference with passenger traffic on the vehicles and at the transit stop structure.

12. The station system of claim 11, further comprising a materials access bank adjacent said transit stop structure and for enabling picking up of individual materials accessible to pedestrians, cyclists, and crowd-sourced delivery drivers.

* * * * *